US009194169B2

(12) United States Patent
Cardinal et al.

(10) Patent No.: US 9,194,169 B2
(45) **Date of Patent: *Nov. 24, 2015**

(54) BLAST RESISTANT SAFE

(71) Applicant: Diebold, Incorporated, North Canton, OH (US)

(72) Inventors: Mike Cardinal, Highton (AU); Joe Munnecke, Mooroolbark (AU)

(73) Assignee: Diebold, Incorporated, North Canton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/606,699

(22) Filed: Jan. 27, 2015

(65) Prior Publication Data

US 2015/0267458 A1 Sep. 24, 2015

Related U.S. Application Data

(63) Continuation of application No. 13/602,178, filed on Sep. 2, 2012, now Pat. No. 8,939,358, which is a continuation-in-part of application No. PCT/AU2011/000241, filed on Mar. 3, 2011.

(51) Int. Cl.

| | |
|---|---|
| ***G06Q 40/00*** | (2012.01) |
| ***E05G 1/024*** | (2006.01) |
| ***E05G 1/026*** | (2006.01) |
| ***E05G 1/04*** | (2006.01) |
| ***E05G 1/06*** | (2006.01) |

(52) U.S. Cl.

CPC ................ *E05G 1/024* (2013.01); *E05G 1/026* (2013.01); *E05G 1/04* (2013.01); *E05G 1/06* (2013.01)

(58) Field of Classification Search

CPC ................ B01J 19/0006; B01J 19/126; B01J 2219/00058; B01J 2219/00065; B01J 2219/002; B01J 2219/00202; B01J 2219/00218; B01J 2219/0024; B01J 2219/1218; B25C 1/08; B25C 1/008

USPC ................................ 235/375, 379, 486, 487

See application file for complete search history.

(56) References Cited

U.S. PATENT DOCUMENTS

| | | | | | |
|---|---|---|---|---|---|
| 4,009,240 | A * | 2/1977 | Koenig | B01D 53/34 | 266/147 |
| 4,483,256 | A * | 11/1984 | Brashear | C10J 3/20 | 110/101 CD |
| 5,656,170 | A * | 8/1997 | Henderson | G01N 30/30 | 210/198.2 |
| 5,669,957 | A * | 9/1997 | Roth | C22B 7/004 | 266/227 |
| 5,788,918 | A * | 8/1998 | Bramley | C22B 7/004 | 266/158 |
| 5,937,104 | A * | 8/1999 | Henderson | H04N 9/75 | 348/586 |
| 8,490,614 | B1 * | 7/2013 | Gregory | A47J 37/0754 | 126/1 R |

* cited by examiner

*Primary Examiner* — Thien M Le

(74) *Attorney, Agent, or Firm* — Black McCuskey Souers & Arbaugh, LPA

(57) ABSTRACT

One or more of the embodiments described herein may include features related to the protection of chests, safes and other security enclosures and in particular to improvements to safes/chests and automatic banking machines which are subject to gas attack and similar assault which are perpetrated with a view to blowing up a chest to gain unauthorized access.

25 Claims, 60 Drawing Sheets

BLAST RESISTANT SAFE

CROSS REFERENCE TO RELATED APPLICATIONS

This application is a continuation of U.S. application Ser. No. 13/602,178 filed on Sep. 2, 2012, now U.S. Pat. No. 8,939,358, that is a continuation-in-part application of International Application No. PCT/AU2011/000241 filed 3 Mar. 2011, the disclosures of which is incorporated herein by reference in their entirety.

TECHNICAL FIELD

This invention relates to machines that operate responsive to data read from data bearing records such as user cards to cause financial transfers, and which may be classified in U.S. Class 235, Subclass 379

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an automated teller machine shall be deemed to include any machine that may be used to electronically carry out transactions involving transfers of value.

Automated banking machines may benefit from improvements.

Overview of Example Embodiments

One or more of the embodiments described herein may include features related to the protection of chests, safes and other security enclosures and in particular to improvements to safes/chests and automatic banking machines which are subject to gas attack and similar assault which are perpetrated with a view to blowing up a chest to gain unauthorized access.

A vulnerability of chests, automated banking machines and the like to unauthorized entry and attack is a constant problem where the security of such chests is compromised by their physical exposure and position in the public domain. In addition to an array of physical attack, including drilling, angle grinders and the like, a recent development is an attack based on explosives where a combustible gas is injected into the interior of the chest or automated banking machine and the gas filled interior is subsequently ignited by remote electrical activation or other types of fusing. The generally sealed or air tight nature of such chests results in an explosive build-up of pressure from the ignition and the weakest point in the chest generally blows away giving access to the chest contents.

The incident of gas attack has become prevalent due to the relative ease of injecting LPG or other forms of volatile explosive gas including oxygen and acetylene into the card dispenser or insert slot of the automated banking machine. The slot also provides access for inserting a fuse or other ignition device and the closed, sealed nature of the automated banking machine provides a favorable environment to effect a substantial blast resulting in the destruction, of the chest or at least, the blowing off of the door or other component of the chest, thereby providing access to the contents thereof to the perpetrator.

In order to address the incident of gas attack, protective panels may be added including surround cages and the like to prevent the doors from being completely blasted off. In another protection strategy, inert gas may be provided to off-set and counteract the provision of combustible gas. In yet another attempt to counteract gas attack, exhaust gas fans and the like may be incorporated into automated banking machines with a view to drawing away a potentially combustible gas from the interior of a chest prior to ignition.

In another example embodiment a blast resistant and disbursement accessory may be mounted to a chest of an automated banking machine when the machine is manufactured or via retro-fitting to an existing chest of an automated banking machine or other security device. The accessory may comprise an auxiliary casing formed of blast resistant materials adapted for mounting to the body of a chest. The auxiliary casing may include an interior chamber to receive the explosive gasses generated by a blast. The auxiliary casing may also include one or a plurality of vent holes communicating with the interior chamber. In addition the auxiliary casing may include a sacrificial exterior vent door, adapted to deploy open and to dissipate explosive gasses applied to the interior of the chest. In addition the accessory may include a conduit to the interior chamber so that the exterior vent door is positioned remote from the vent holes so as to prevent direct access to the chest upon deployment.

The interior of the auxiliary casing may include one or a plurality of baffles. Also, the sacrificial vent door may be secured and lockable with the lock being adapted to open in response to the blast. In addition, vent holes may incorporate a fan, adapted to draw gasses from the interior of the chest to the interior chamber of said auxiliary casing. In a further example embodiment, an explosive gas detector may be positioned within the chest and an ignition device may be positioned within the interior chamber. Also, a spark arresting filter may be incorporated between the chest and the auxiliary casing to prevent flashback.

The lock may include a burst gate positioned between the interior chamber and the door to act as a throw bolt in the event of a blast conduited to the chamber. The blast gate may move between a resting closed position blocking the pathway between the chamber and the vent door to an open position providing a pathway between the chamber and the vent door. The vent door may also be held in a closed position by a sliding bolt. The sliding bolt may be moved by the blast gate responsive to a blast.

DESCRIPTION OF EXAMPLE EMBODIMENTS

Figure 1:
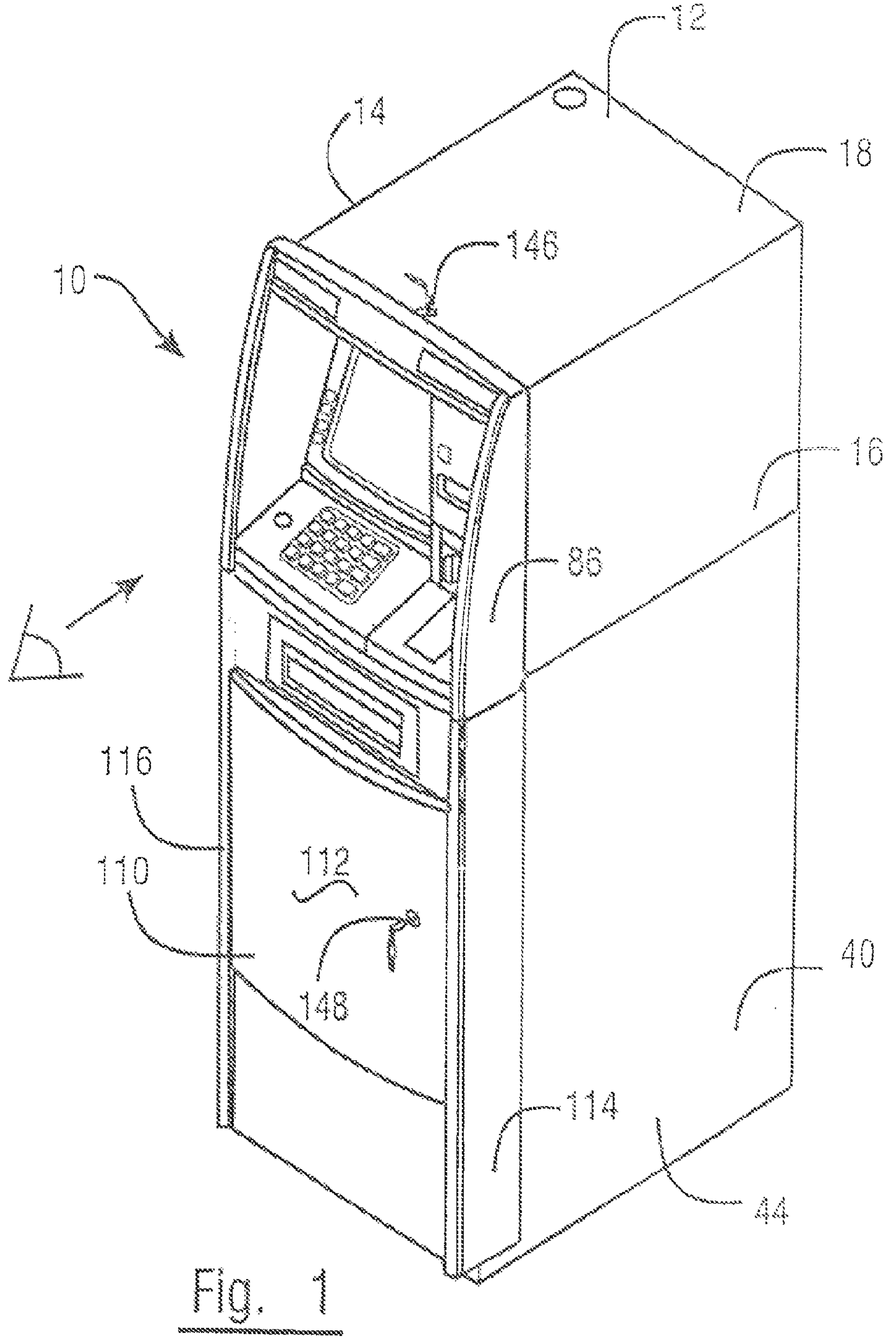
FIG. 1 is an isometric view of an automated banking machine of an exemplary embodiment.
Figure 2:
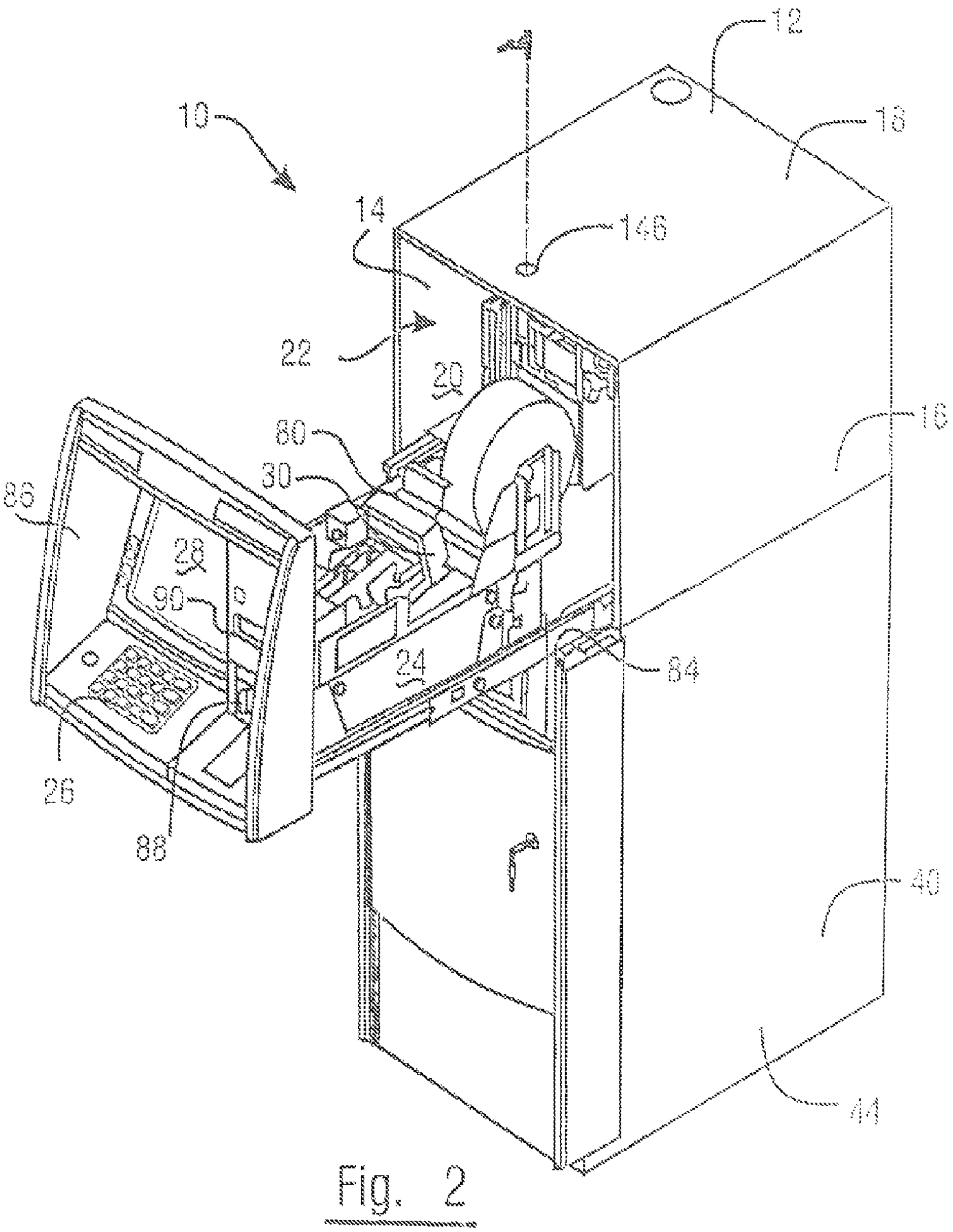
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated teller machine. Automated banking machine 10 includes a top housing 12 having side walls 14 and 16, and top wall 18. Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device. Top housing 12 is used to house certain banking machine components such as input and output devices.

Figure 3:
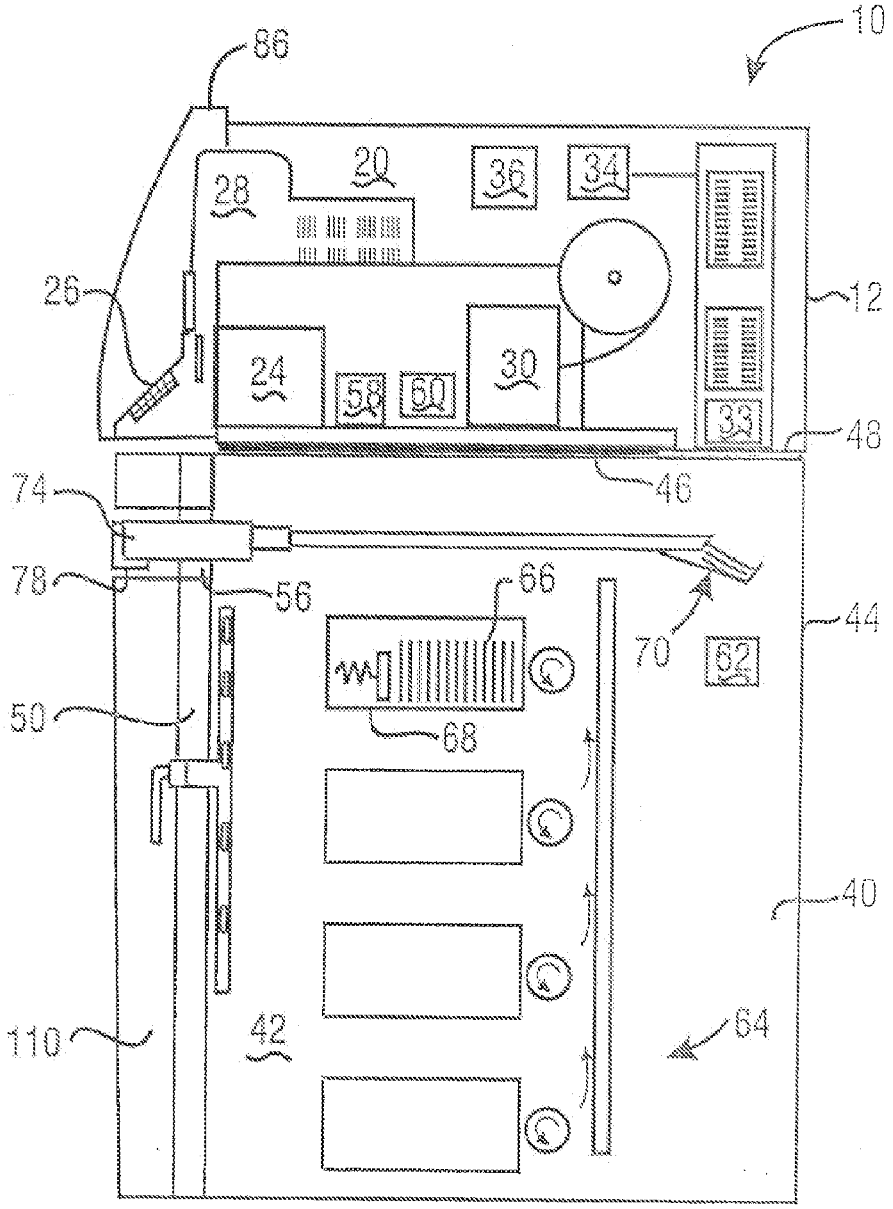
FIG. 3 is a side schematic view of an automated banking machine illustrating various banking machine components.

With reference to FIG. 3, in this exemplary embodiment the input devices include a card reader schematically indicated 24. Card reader 24 is operative to read a customer's card which includes indicia thereon. The indicia may correspond to information about the customer and/or information about a customer's financial account, such as the customer's account number. In some embodiments the card reader 24 may be a card reader adapted for reading magnetic stripe cards and/or so called "smart cards" which include a programmable memory. Other embodiments may read data from cards wirelessly such as radio frequency identification (RFID) cards. Exemplary embodiments may include features of the type discussed in U.S. Pat. No. 7,118,031 the disclosure of which is incorporated herein by reference in its entirety. Another input device in the exemplary embodiment includes input keys 26. Input keys 26 may in some embodiments, be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, infrared (IR) type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments output devices may include devices such as audio speakers, radio frequency (RF) transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 30. The receipt printer is operative to print receipts for users reflecting transactions conducted at the machine. Embodiments may also include other types of printing mechanisms such as statement printer mechanisms, ticket printing mechanisms, check printing mechanisms and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers or other devices suitable to enable communication between the machine 10 and other computers and systems. Exemplary embodiments may include features like those disclosed in U.S. Pat. No. 7,266,526 the disclosure of which is incorporated herein by reference in its entirety.

Automated banking machine 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526 the disclosures of each of which are incorporated herein by reference in their entirety. Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is moveably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Exemplary automated banking machine 10 further includes a plurality of actuators schematically indicated 60 and 62. The actuators may comprise a plurality of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of note or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result the user is enabled to receive the sheets from the machine. After a user is sensed as having removed the stack from the opening, the controller may operate to close the gate 78 so as to minimize the risk of tampering with the machine.

With reference to FIG. 2, in this exemplary embodiment, automated banking machine 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular automated banking machine 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of automated banking machine 10, the rollout tray 80 is retracted into the interior area 20 of the housing 12. Upper fascia 86 operates to close front opening 22 and provide an attractive appearance for automated banking machine 10, while allowing a customer to input information and receive outputs from automated banking machine 10.

Figure 6:
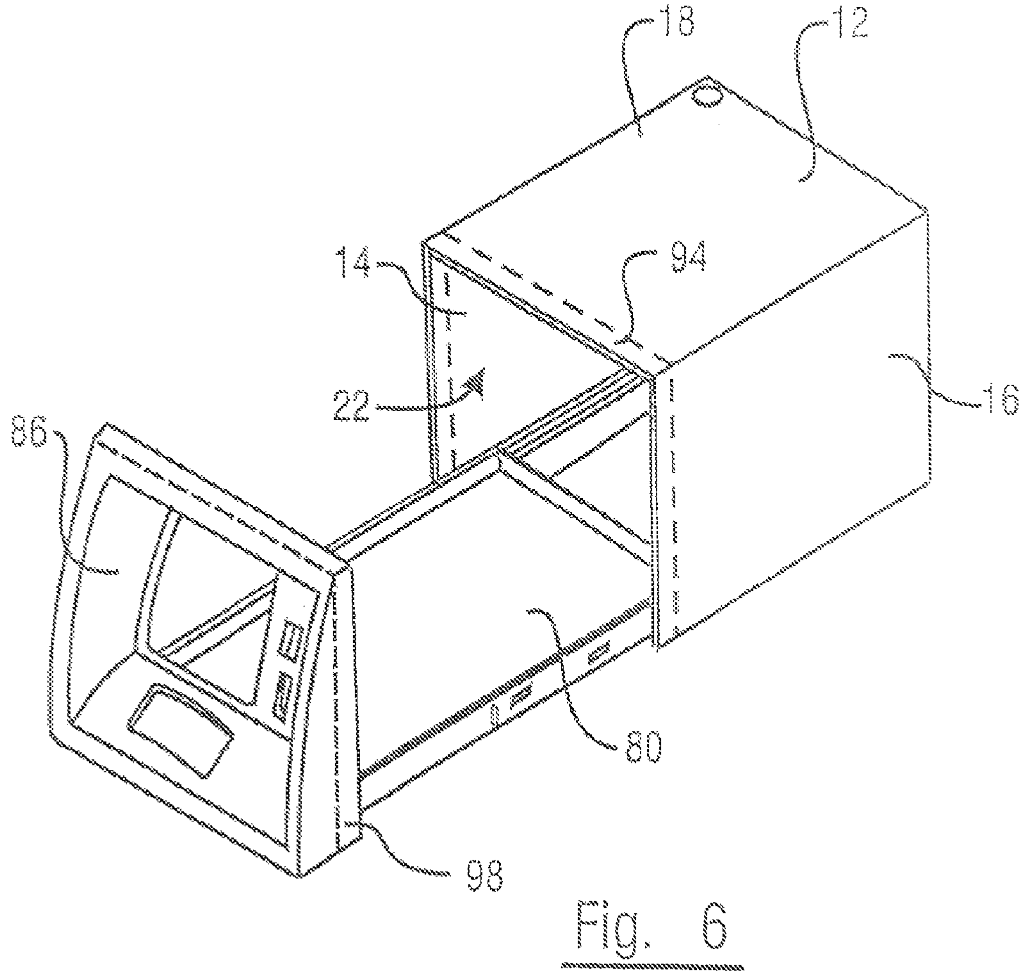
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments the rearwardly extending portion may be contoured or tapered so as to extend further inwardly with increasing proximity to the front of the fascia. Such tapered control may engage and help to close and/or align the fascia and the top housing 12.

Figure 7:
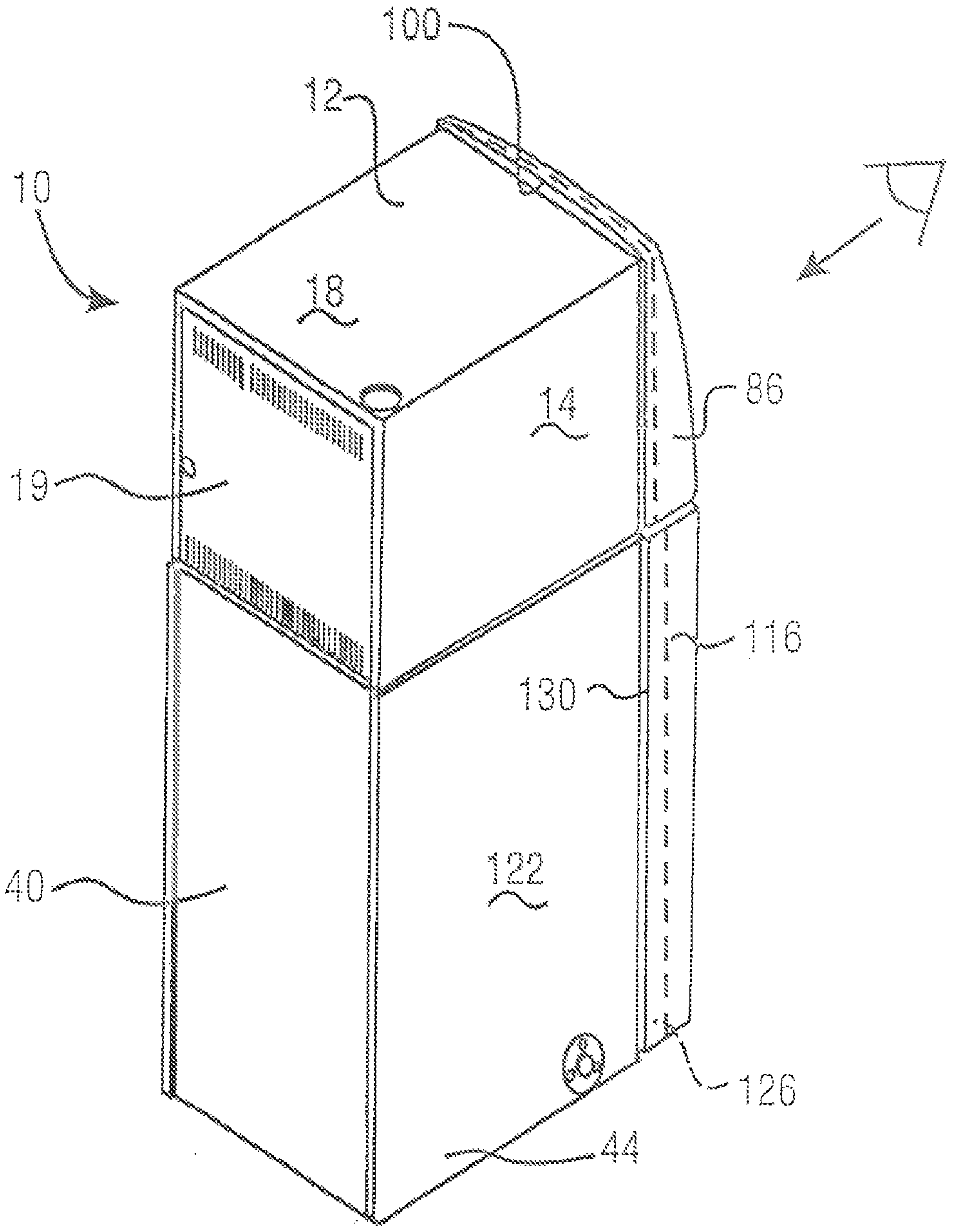
FIG. 7 is an isometric rear view of the automated banking machine of FIG. 1.

With reference to FIG. 7, when automated banking machine 10 is viewed from the rear, there may be a first gap 100 separating the rearwardly extending portion 98 of upper fascia 86 from the top housing 12. In some embodiments it may be desirable that first gap 100 be minimal to prevent unauthorized access to interior area 20. First gap 100 in the exemplary embodiment is not visible when automated banking machine 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
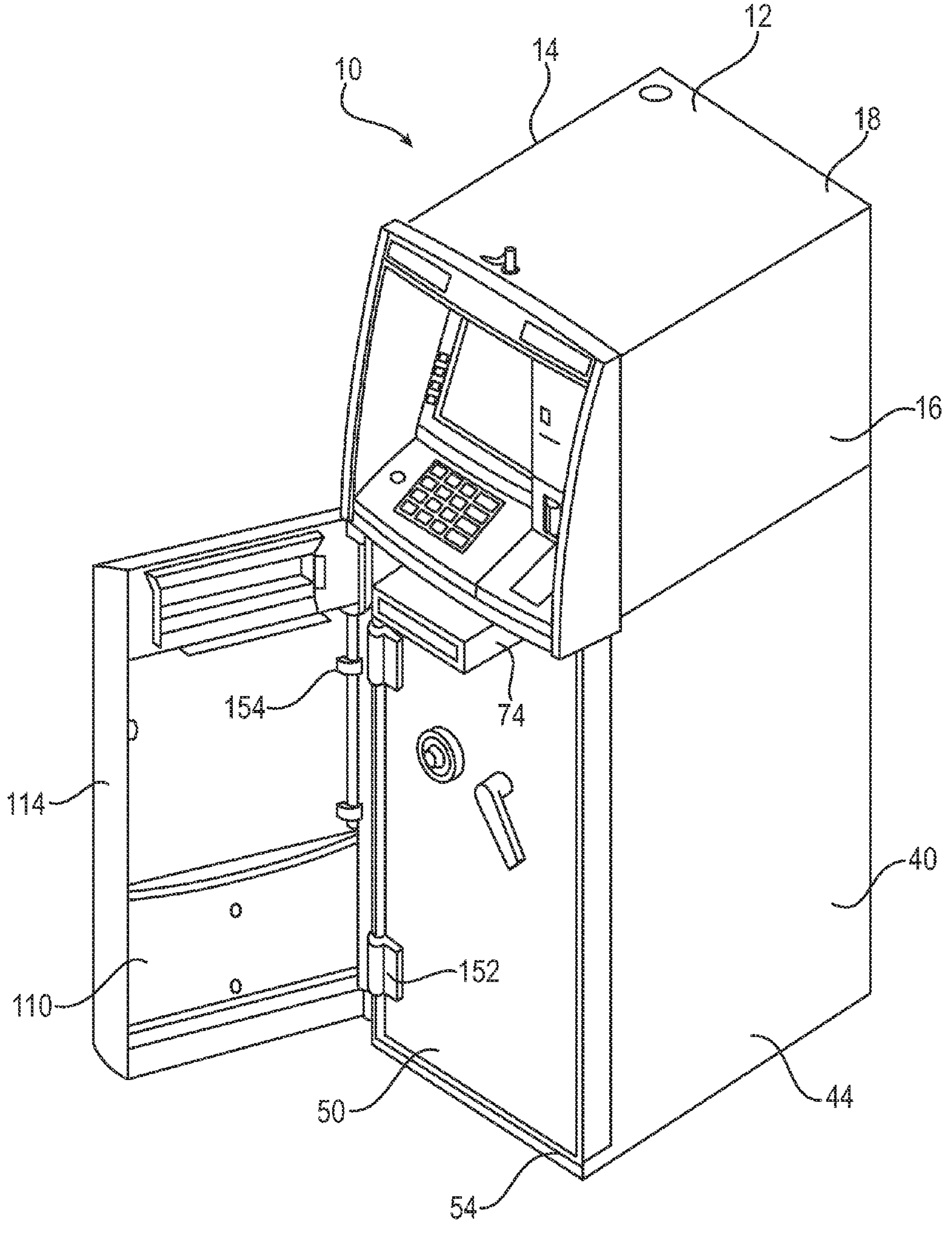
FIG. 4 is an isometric view of the automated banking machine of FIG. 1 with a lower fascia in an accessible position.
Figure 5:
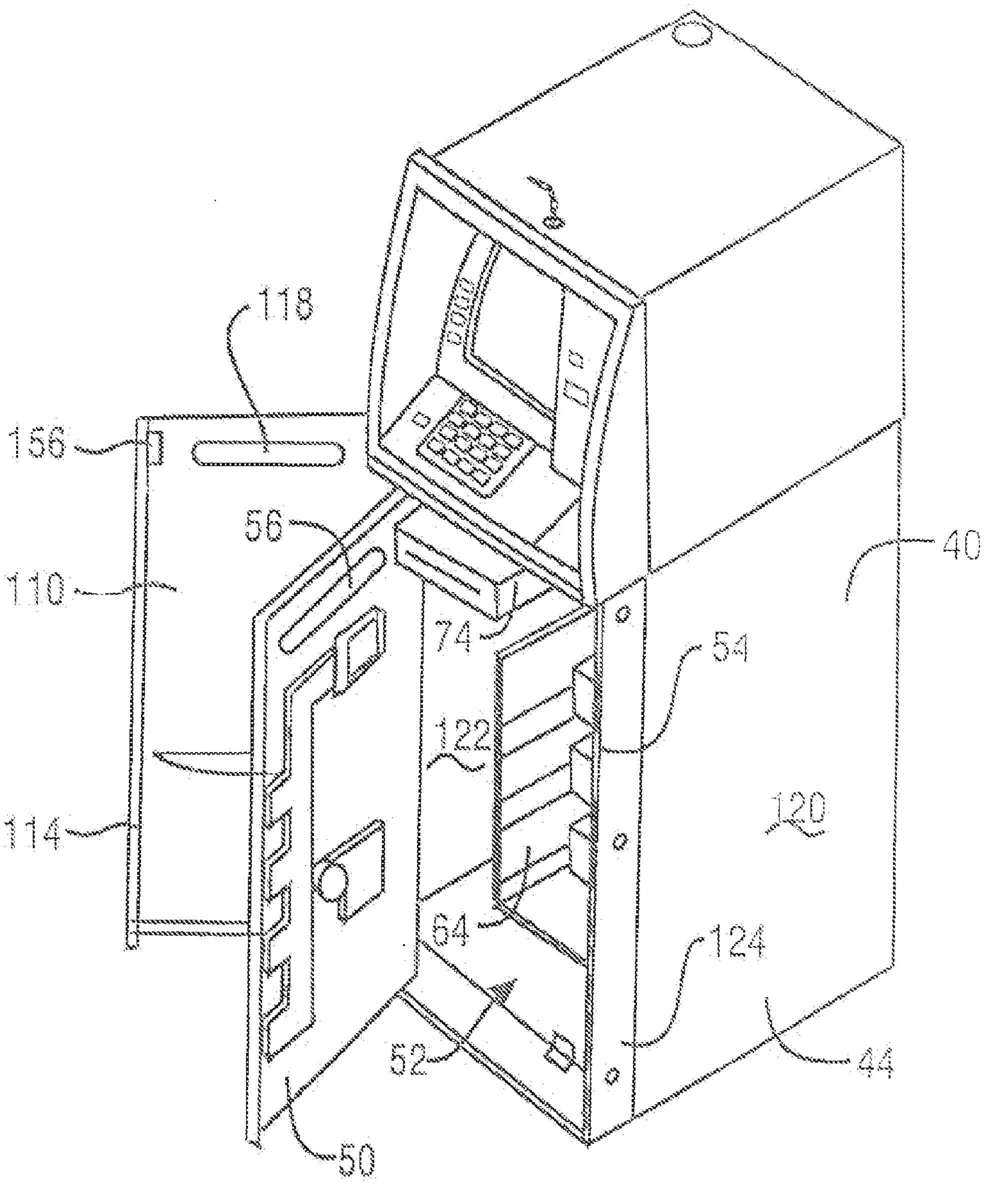
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 moveably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to automated banking machine 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when automated banking machine 10 is viewed from the front (see FIG. 1), the lower fascia 110 covers the chest 40 from side to side. When automated banking machine 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of automated banking machine 10. In some applications, it may be desirable to minimize the lower gaps 130.

Figure 8:
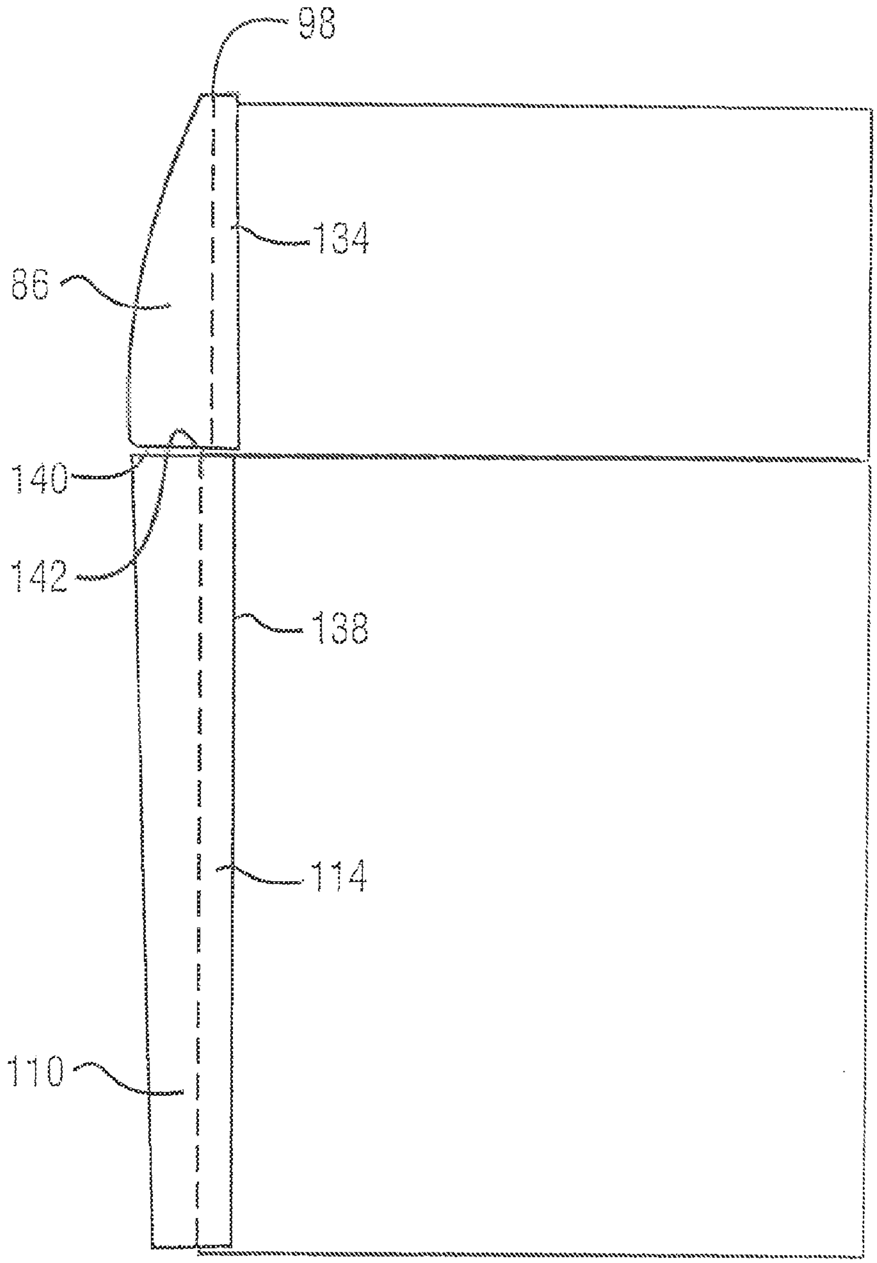
FIG. 8 is a side schematic view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of automated banking machine 10, in the exemplary embodiment, end edge 134 of upper fascia 86 and end edge 138 of lower fascia 110 are substantially vertically aligned along a first side of automated banking machine 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to automated banking machine 10.

In this exemplary embodiment, the rearwardly extending portion 98 further operates to simplify the manufacture and assembly of the automated banking machine 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1 and 2, in this exemplary embodiment, automated banking machine 10 includes a first locking mechanism 146 for selectively retaining the rollout tray 80 in the retracted position when upper fascia 86 covers the front opening 22. The first locking mechanism may be of the type described in U.S. Pat. No. 6,082,616 the disclosure of which is incorporated herein by reference in its entirety.

In the exemplary embodiment, automated banking machine 10 also includes a second locking mechanism 148 for selectively securing lower fascia 110 in the covering position.

Figure 9:
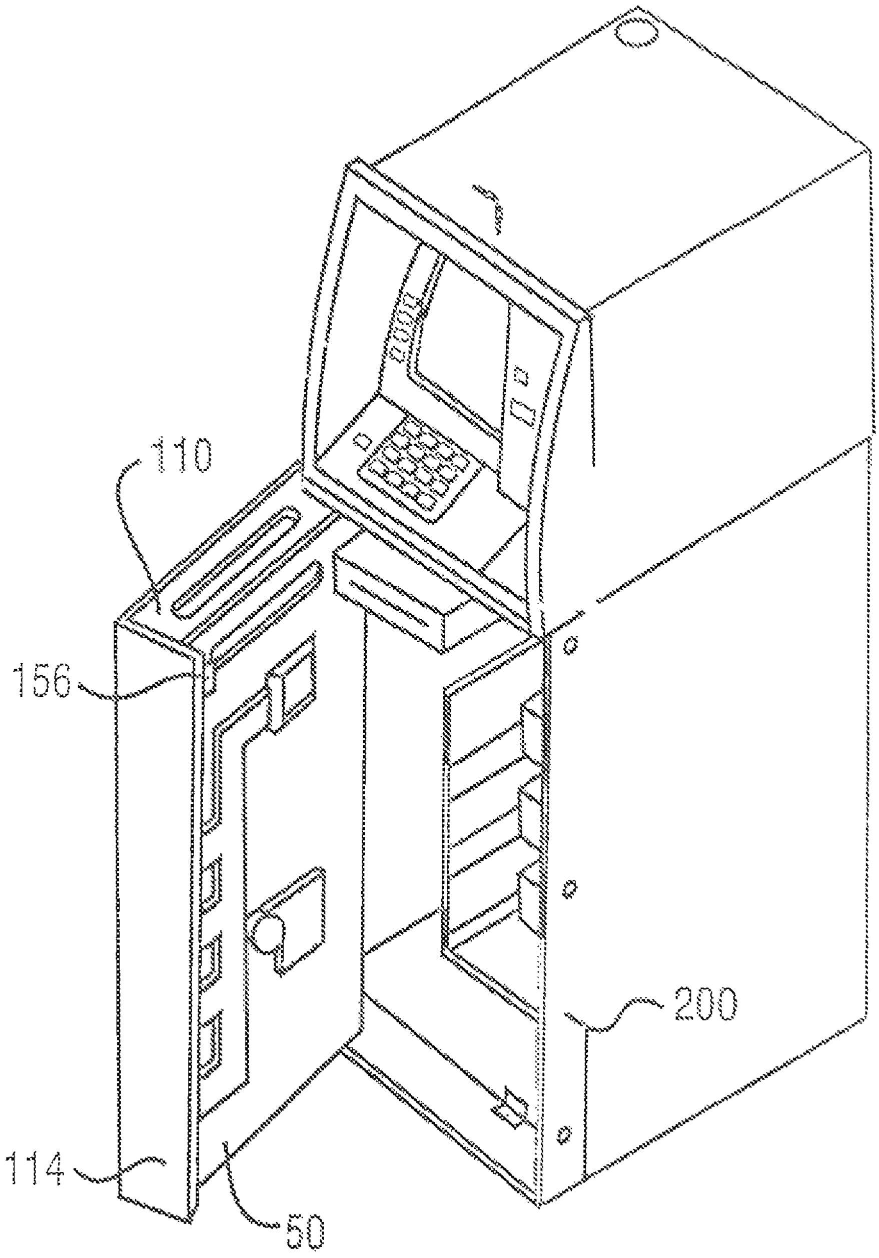
FIG. 9 is an isometric view of an automated banking machine similar to FIG. 5 showing the chest door selectively engaged with the lower fascia.

With particular reference to FIGS. 4, 5 and 9, in another exemplary embodiment automated banking machine 10 may include a top housing 12 as previously described. Automated banking machine 10 further includes chest 40 having chest door 50 mounted to the housing 44 by one or more chest door hinge assemblies 152. Lower fascia 110 is moveably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156. Exemplary embodiments may include features of the type discussed in U.S. Pat. Nos. 7,159,767; 7,152,784; 7,000,830; and 6,871,602 the disclosures of each of which are incorporated herein by reference in their entirety.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus a currency dispenser mechanism or other components may be accessed. Servicing the currency dispenser may include adding or removing currency sheets from operative engagement with the currency dispenser mechanism.

The method may further include engaging the chest door with an inwardly directed flange that is mounted in supporting connection with the lower fascia.

To return the automated banking machine to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
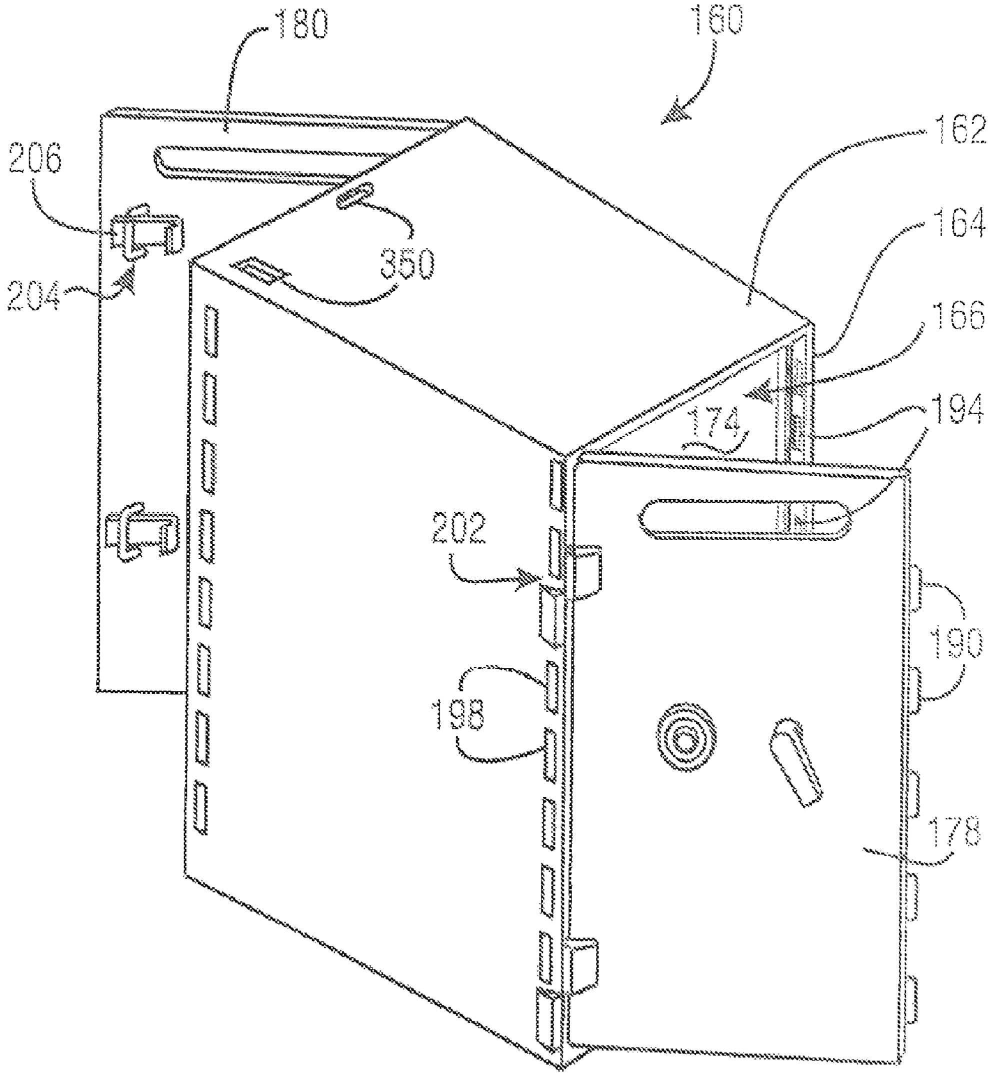
FIG. 10 is a schematic view of an alternate embodiment of a chest for an automated banking machine, as viewed from the front.
Figure 11:
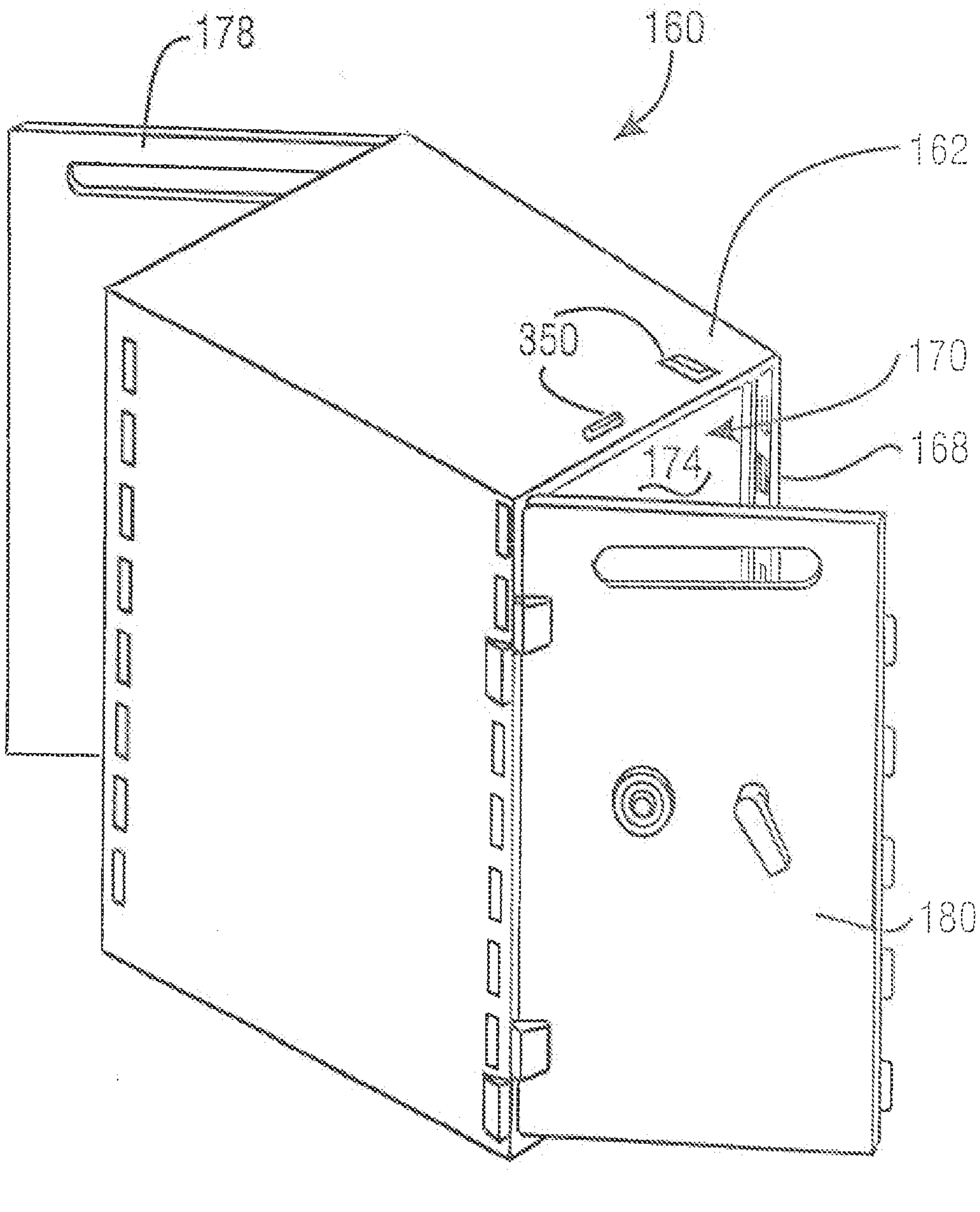
FIG. 11 is a schematic view of the alternate embodiment of the chest shown in FIG. 10, as viewed from the rear.

Some automated banking machines may be equipped with another exemplary embodiment of a chest or safe 160, as best seen in FIGS. 10-11. Chest 160 includes a chest housing 162 having first end 164 defining a first opening 166 therein and second end 168 defining a second opening 170 therein. The chest of this exemplary embodiment is particularly adapted for applications wherein a common chest housing can be utilized in either "front-load" automated banking machines or "rear-load" automated banking machines. By "front-load" automated banking machine it is meant that access to a secure area 174 in an operable machine may be selectively attained from the front of the automated banking machine, which is the same side that customers use to provide input to the machine. By "rear-load" automated banking machine it is meant that access to the secure area 174 in an operable machine may be selectively attained from the rear of the automated banking machine, while customer inputs are provided at the front of the automated banking machine.

In this exemplary embodiment, chest 160 includes a first chest door 178 moveably mounted adjacent a first end 164 of chest housing 162 to selectively close the first opening 166. Chest 160 further includes a second chest door 180 moveably mounted adjacent the second end 168 to selectively close the second opening 170.

In the exemplary embodiment illustrated in FIG. 10, chest 160 is adapted for use in a front load automated banking machine wherein under usual operating conditions, first chest door 178 is selectively movable to open or close first opening 166 to allow access to secure area 174. In this exemplary embodiment, second chest door 180 is adapted to remain closed during usual operation of the automated banking machine, including those times when access to secure area 174 is desired. For purposes of this disclosure, the term "semi-permanently" closed is used to describe a condition of a chest door that closes an opening in the chest housing in a manner that does not readily permit access to the secure area. In this way, a "semi-permanently" closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load automated banking machines, it may be desirable to utilize chest 160 as illustrated in FIG. 11 where the second chest door 180 is the operable door while first chest door 178 is adapted to be semi-permanently closed.

Figure 12:
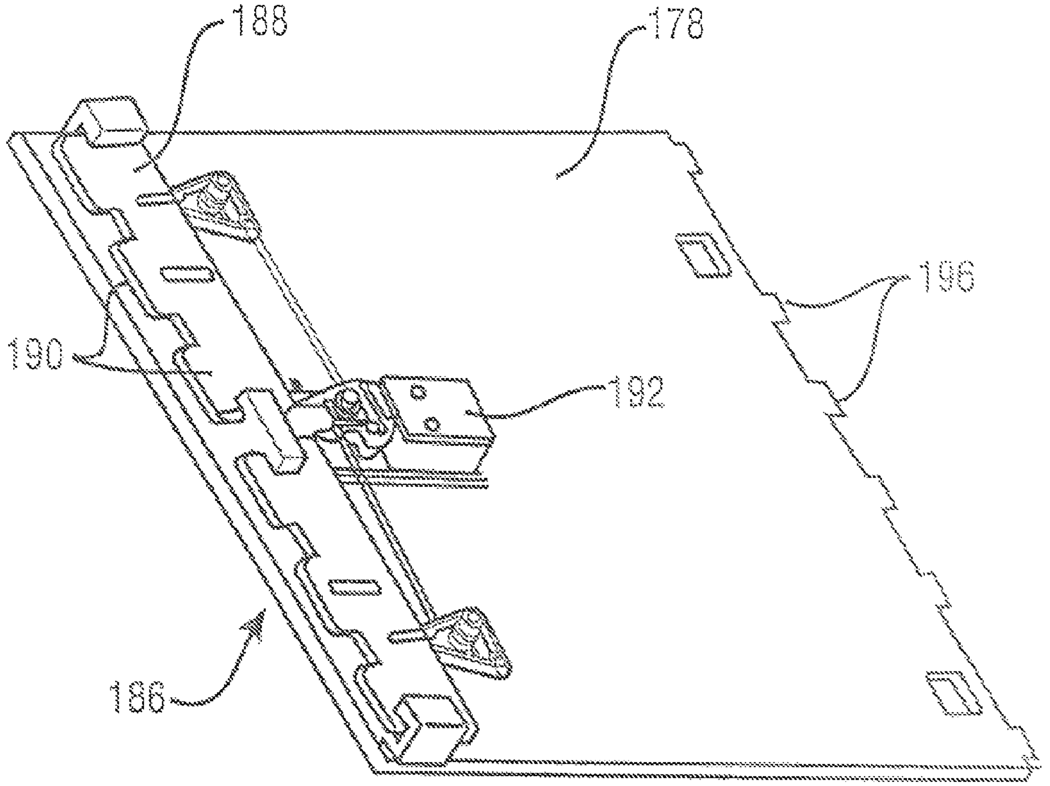
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186. Locking bolt mechanism 186 is operative to selectively enable securing first chest door 178 in a locked condition. Locking bolt mechanism 186 may be of the type described in U.S. Pat. No. 6,089,168 which is incorporated by reference in its entirety as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted in operatively supported connection with an interior surface of first chest door 178 so as to be slideably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190.

It will be appreciated by those skilled in the art that the locking bolt mechanism because it provides multiple places for engagement with the chest housing, achieves more secure locking of the door in the closed position than a locking bolt mechanism providing a single place for engagement with the chest housing.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. Nos. 6,089,168 and/or 7,156,297, the disclosures of which are incorporated herein in their entirety. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the automated banking machine. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary automated banking machine may be simplified by use of chest 160. A common chest housing may be utilized in applications requiring a front-load automated banking machine or a rear-load automated banking machine. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that automated banking machines incorporating this exemplary embodiment of chest 160 may include any of the other features described elsewhere.

An exemplary embodiment includes a method for utilizing an automated banking machine that is equipped with a chest having two opposed openings. The chest housing includes a first opening at a first end thereof and a second opening at a second opposed end. The first door is moveably mounted in supporting connection with the chest housing so that the first chest door is operative to selectively close the first opening. A second chest door is moveably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of an automated banking machine through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The exemplary automated banking machine may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism. The exemplary method includes servicing the currency dispenser mechanism after the at least one lower banking machine component is accessed. This may include for example features included in U.S. Pat. Nos. 7,195,237 and/or 7,111,776 the disclosures of each of which are incorporated herein by reference in their entirety.

The at least one lower banking machine component may comprise a currency stacker. The exemplary method includes servicing the currency stacker.

Figure 13:
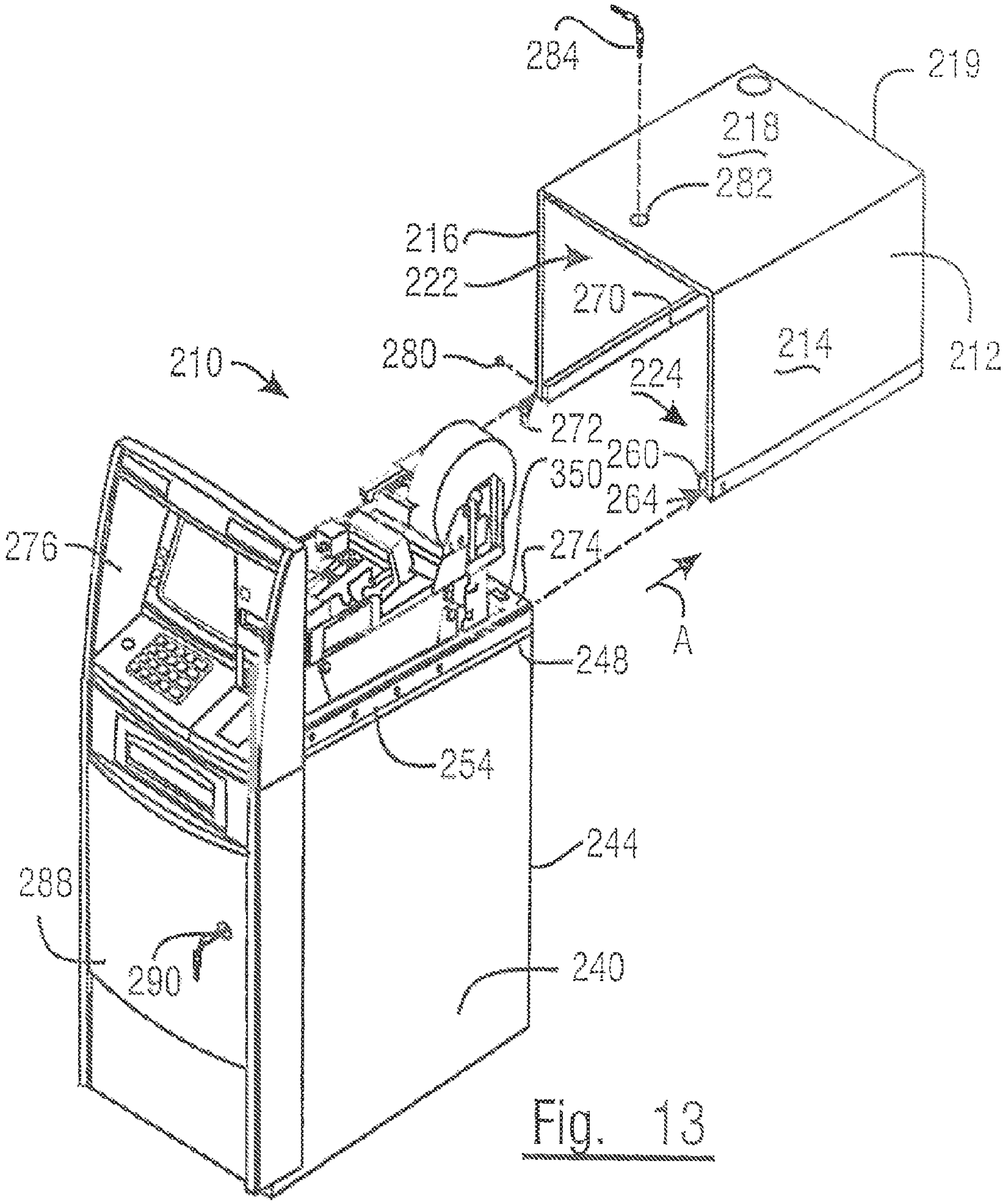
FIG. 13 is an isometric exploded view of an alternate embodiment of an automated banking machine.
Figure 14:
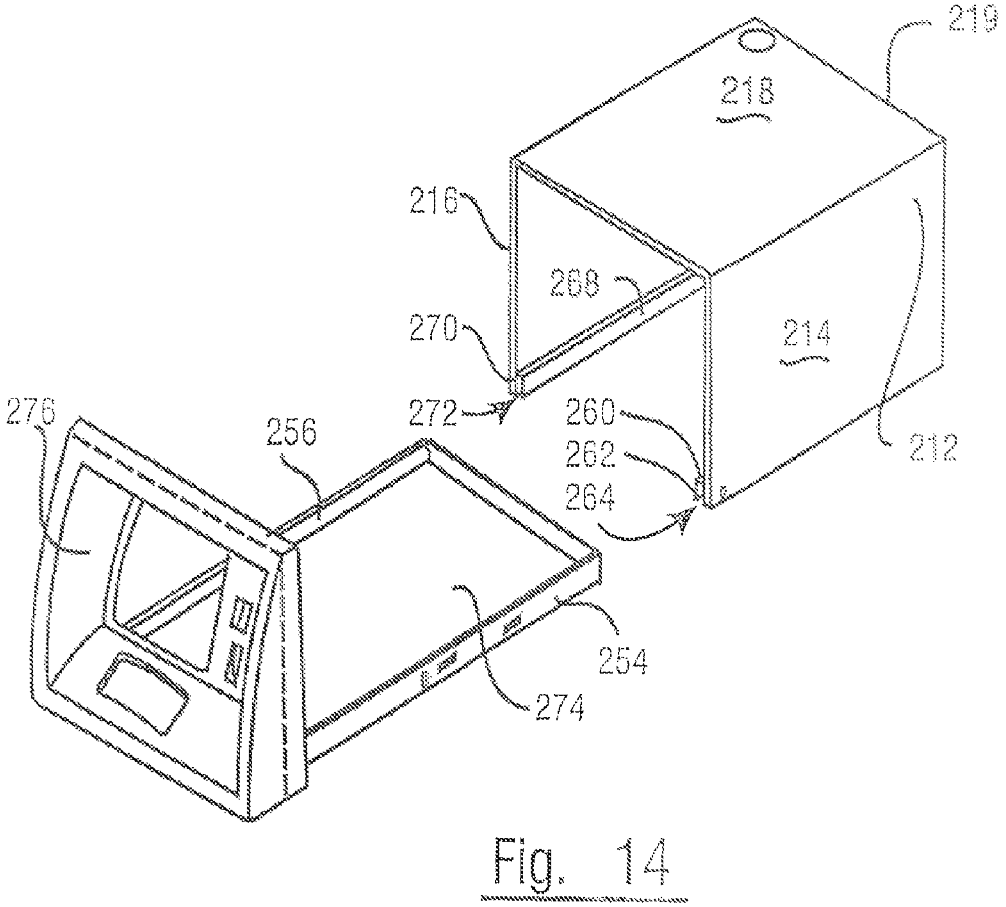
FIG. 14 is an isometric view of a top housing cover, a mounting tray and an upper fascia of an automated banking machine.
Figure 15:
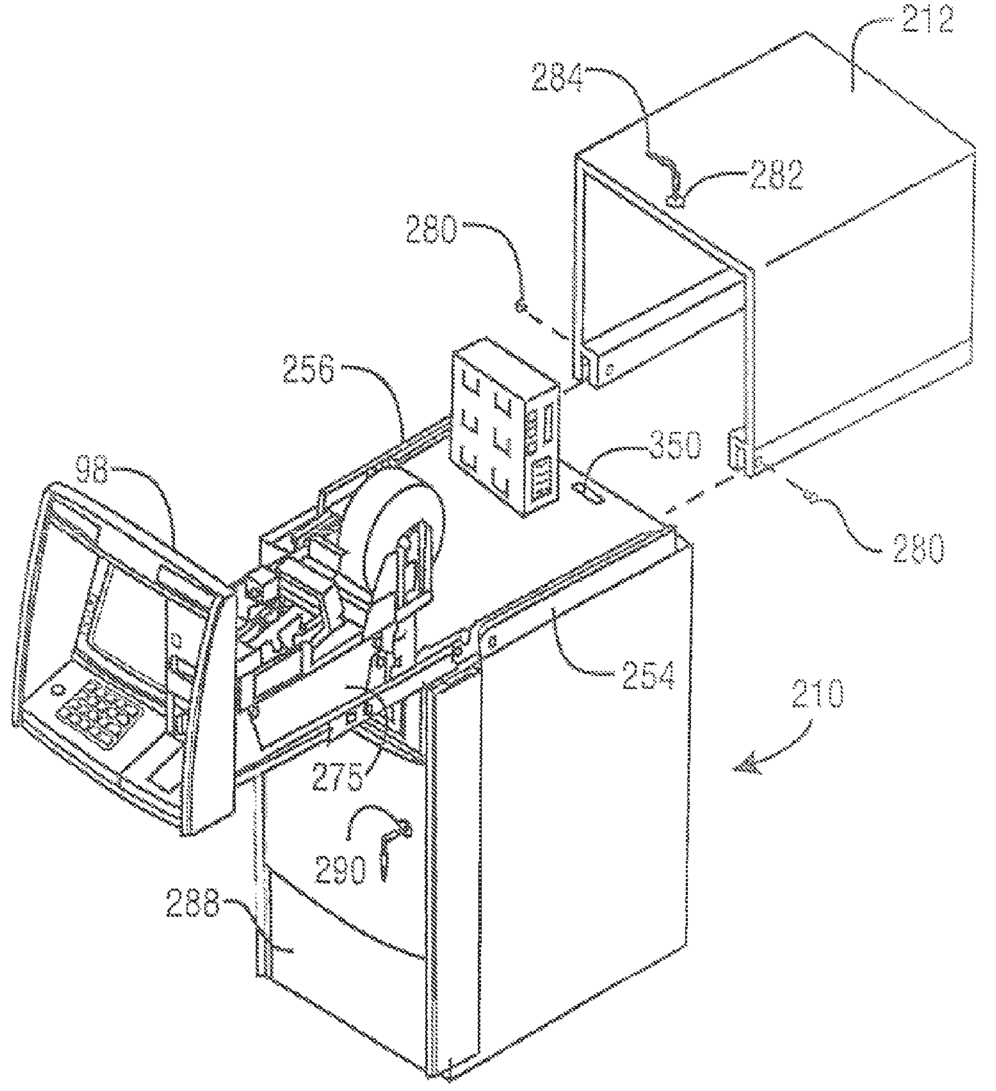
FIG. 15 is an isometric view of an alternate embodiment of an automated banking machine.

Yet another exemplary embodiment of an automated banking machine 210 is illustrated in FIGS. 13-15. Automated banking machine 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, automated banking machine 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, automated banking machine 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary automated banking machine 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate exemplary embodiment, illustrated in FIG. 15, automated banking machine 210 may include a rollout tray 275 similar to rollout tray 80 as previously described. Flange members 254,256 may be mounted in supporting connection with rollout tray 275. Thus, upper banking machine components may be accessed by rearwardly sliding the top housing cover 212, extending the rollout tray 275, or a combination of both.

Automated banking machine 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

Automated banking machine 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the automated banking machine until first locking mechanism 282 has been operated to release upper fascia 276 so that the upper fascia 276 can be moved away from top housing cover 212.

In the exemplary embodiment, automated banking machine 210 may include a lower fascia 288 with features similar to a lower fascia previously described. Lower fascia 288 may be secured in the covering position by a second locking mechanism 290.

This exemplary embodiment provides ready access to the upper banking machine components, for example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of an automated banking machine. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the automated banking machine includes side flange members mounted in supporting connection with a top wall of a chest housing and cooperative channel members mounted in supporting connection with the top housing cover. In this exemplary embodiment, the method further includes slideably engaging a first flange member with a first channel of a first channel member.

Figure 16:
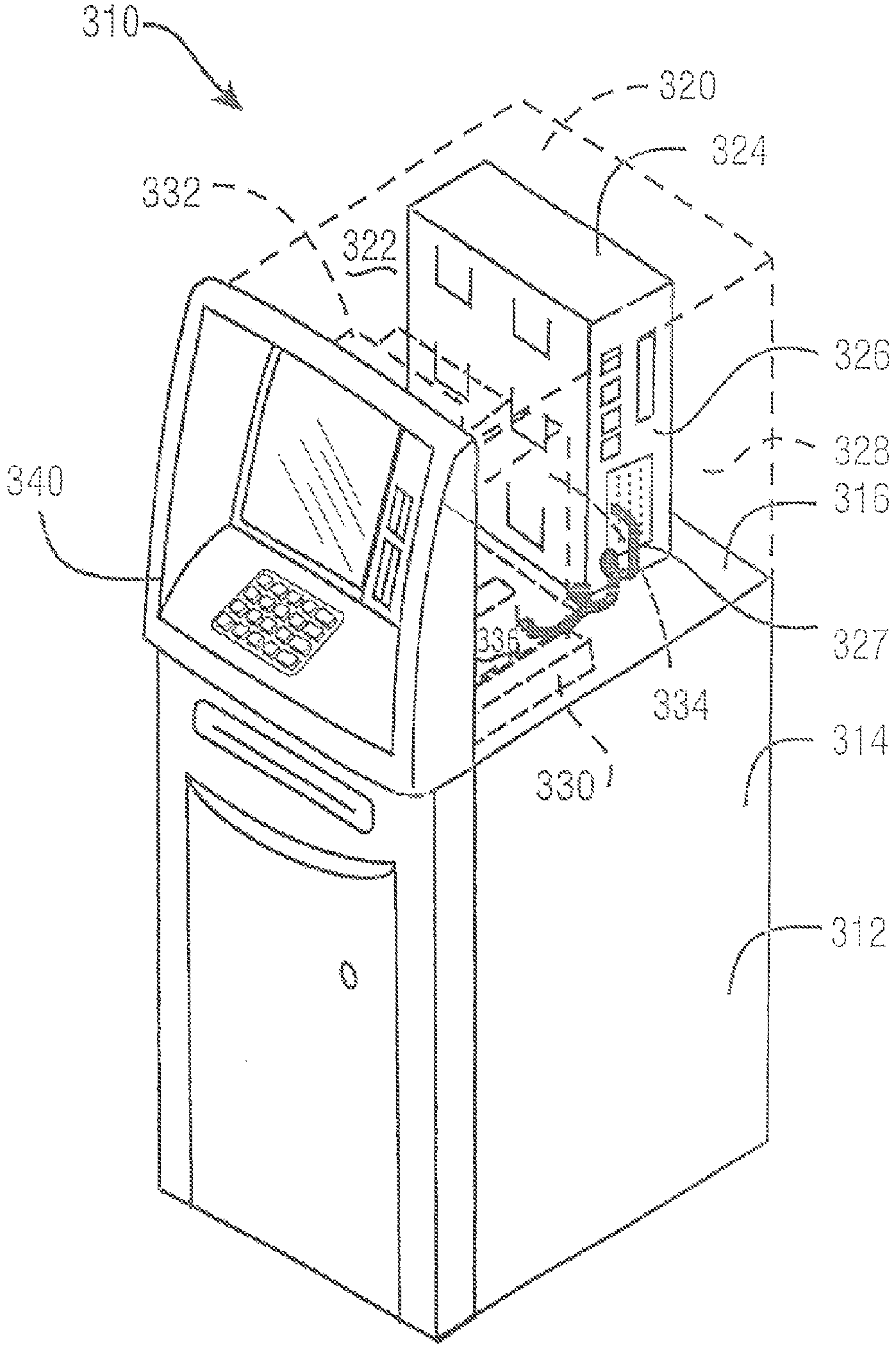
FIG. 16 is an isometric view, partly in phantom, of an alternate exemplary embodiment of an automated banking machine in an operational condition.
Figure 17:
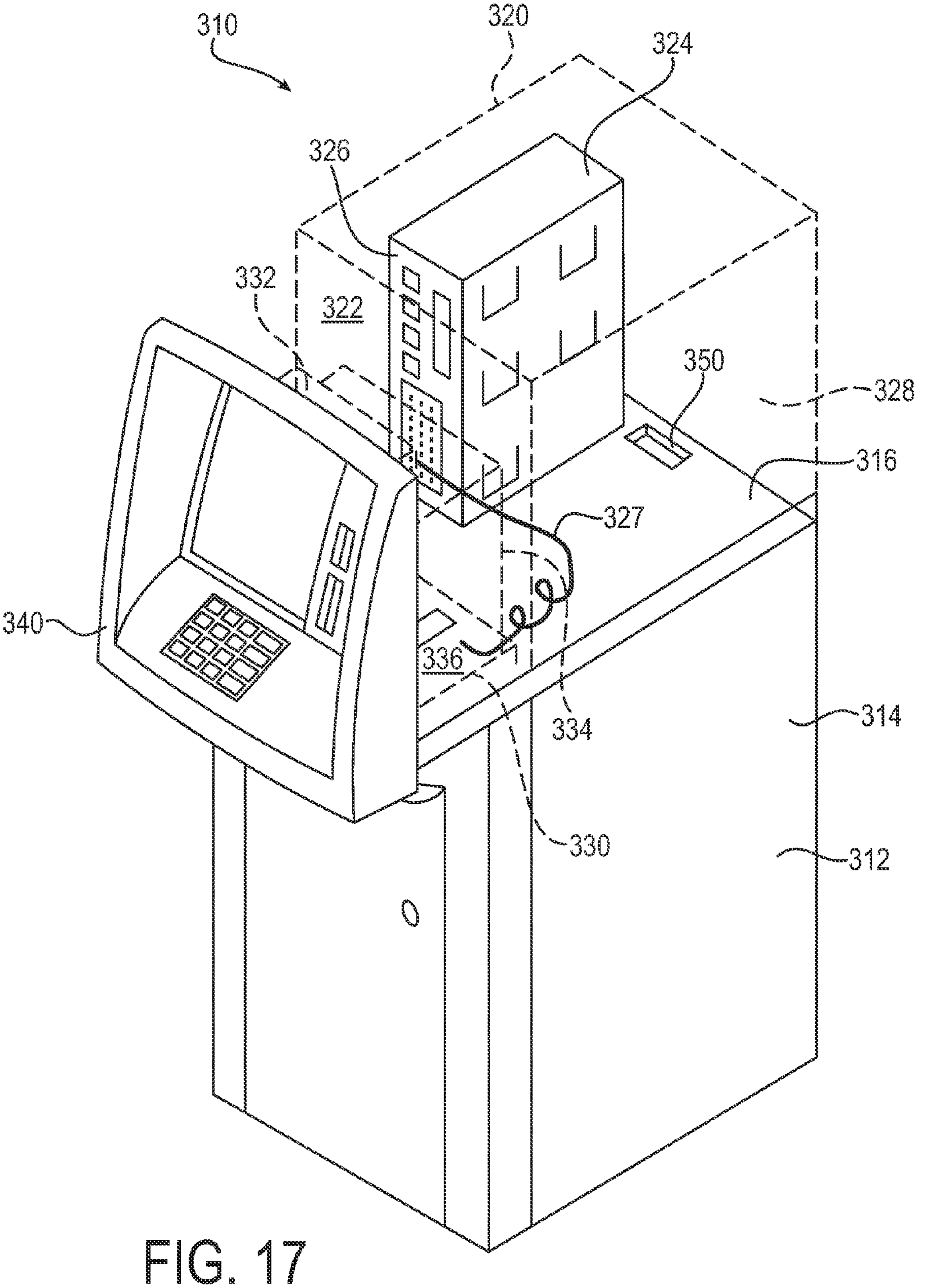
FIG. 17 is an isometric view, partly in phantom, of the automated banking machine of FIG. 16, in a serviceable condition.

In another exemplary embodiment, illustrated in FIGS. 16 and 17, automated banking machine 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. Automated banking machine 310 further includes a top housing 320 (shown in phantom) bounding an interior area 322.

In this exemplary embodiment, automated banking machine 310 includes a processor case 324 that houses the primary automated banking machine processor. The processor may be an Intel Pentium (PL type) processor. Of course, in some embodiments the case may house multiple processor or no processors at all. The automated banking machine processor causes operation of the various devices and mechanisms in the automated banking machine.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by automated banking machine 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the automated banking machine. In order to accomplish both these purposes, the processor case 324 of the exemplary embodiment is rotationally supported in connection with the top wall 316 of the chest housing 314. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of an automated banking machine, a rollout tray 80 mounted in supporting connection with a top housing 320 is extended from a retracted position so that the rollout tray extends through a front opening in the top housing 320. The method includes disengaging any locking mechanisms that operate to retain the rollout tray 80 in the retracted position.

A processor case 324 disposed in an interior area 322 bounded by the top housing 320 may be rotated from an operational position to a service position. At least one processor component mounted in supporting connection with the processor case 324 may be accessed for servicing. After servicing of the processor component is complete, the processor case 324 may be rotationally returned to the operational position from the service position. Thereafter, the rollout tray 80 may be repositioned into the retracted position.

The step of servicing the processor component may include connecting or disconnecting cables or connections, adding or replacing components such as circuit cards, performing diagnostic tests and other functions to facilitate operation of the automated banking machine.

Prior to repositioning the rollout tray 80, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The automated banking machine may include a slidable top housing cover 212 as earlier described. The service method includes the step of rearwardly sliding the top housing cover 212. After the servicing of banking machine components is completed, the method includes returning the top housing cover 212 to an operational position.

During servicing of the automated banking machine, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine components, such as currency stacker, currency dispenser mechanism, and currency delivery mechanism (as shown in FIG. 3).

An exemplary service method includes performing routine maintenance, replenishing currency, removing sheets, disengaging sheets from the currency dispenser mechanism, replacing components and the like.

The automated banking machine can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing an automated banking machine apparatus is provided. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the automated banking machine.

In an exemplary method, a second chest door is moveably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, at least one upper banking machine component is mounted in supporting connection with a rollout tray which is mounted in movable supporting connection with the chest housing, wherein the rollout tray is selectively movable between a retracted position wherein the rollout tray is within an interior area, and an extended position wherein the rollout tray extends outwardly from the interior area through the front opening in the top housing.

The exemplary method includes selectively placing the rollout tray in the extended position, selectively rotating the processor case into the service position, and establishing an operable connection between the at least one upper banking machine component and the at least one processor.

In an exemplary method, the lower fascia is equipped with an inwardly extending flange operative to selectively engage the chest door when the lower fascia is in the accessible position and the chest door is in the open position.

Figure 18:
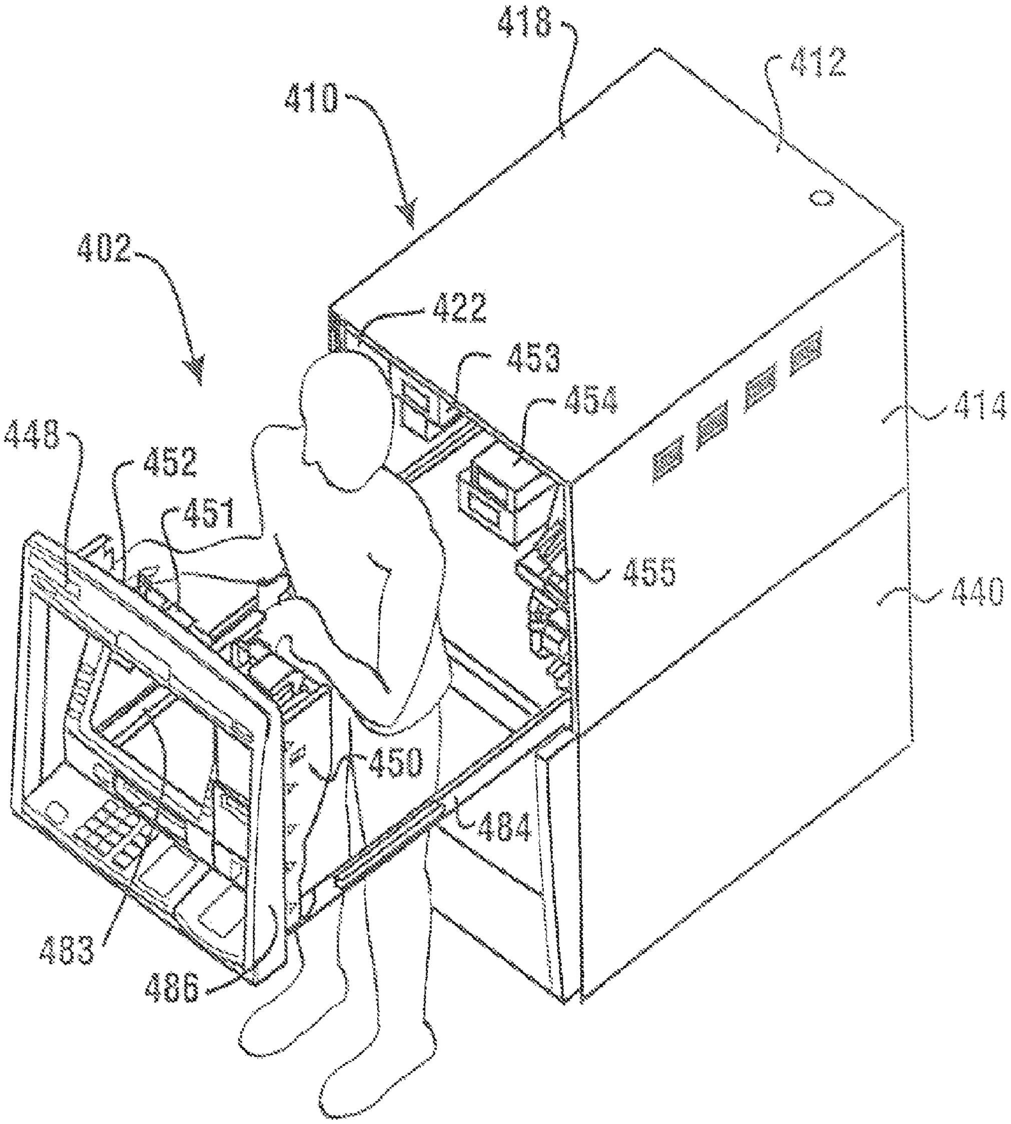
FIG. 18 is an isometric view of an automated banking machine of an exemplary embodiment.

With reference to FIG. 18, in this exemplary embodiment there is shown therein an automated banking machine, generally indicated as 410. In this exemplary embodiment, the automated banking machine 410 is an automated teller machine. The automated banking machine 410 includes a housing 412 mounted atop a chest 440. The housing 412 includes a first side wall 414, a second side wall 416 (FIG. 19), a rear wall or panel 419, and a top wall 418, and defines a front opening 422. A fascia 486 is adapted to cover the front opening 422 of the housing 412 and may be secured to the housing 412 with a lock 448. The fascia 486 is in operatively supported connection with the housing 412 and is operatively supported by the housing 412 through two horizontally disposed members 483, 484. As will be appreciated by those skilled in the art, the fascia 486 may additionally or alternatively be secured to the chest 440. In an exemplary embodiment, the two horizontally disposed members 483, 484 are slideable members adapted to enable the fascia 486 to be moved away from the front opening 422 of the housing 412. Further, the fascia 486, when moved away from the front opening 422, cooperates with the housing 412 and the two horizontally disposed members 483, 484 to define a space which may be at least partially occupied by a servicer 402 while servicing the automated banking machine 410. Various serviceable components, generally identified in FIG. 18 as components 450-455, may be supported by the fascia 486, the housing 412, the chest 440, or combinations thereof.

Figure 19:
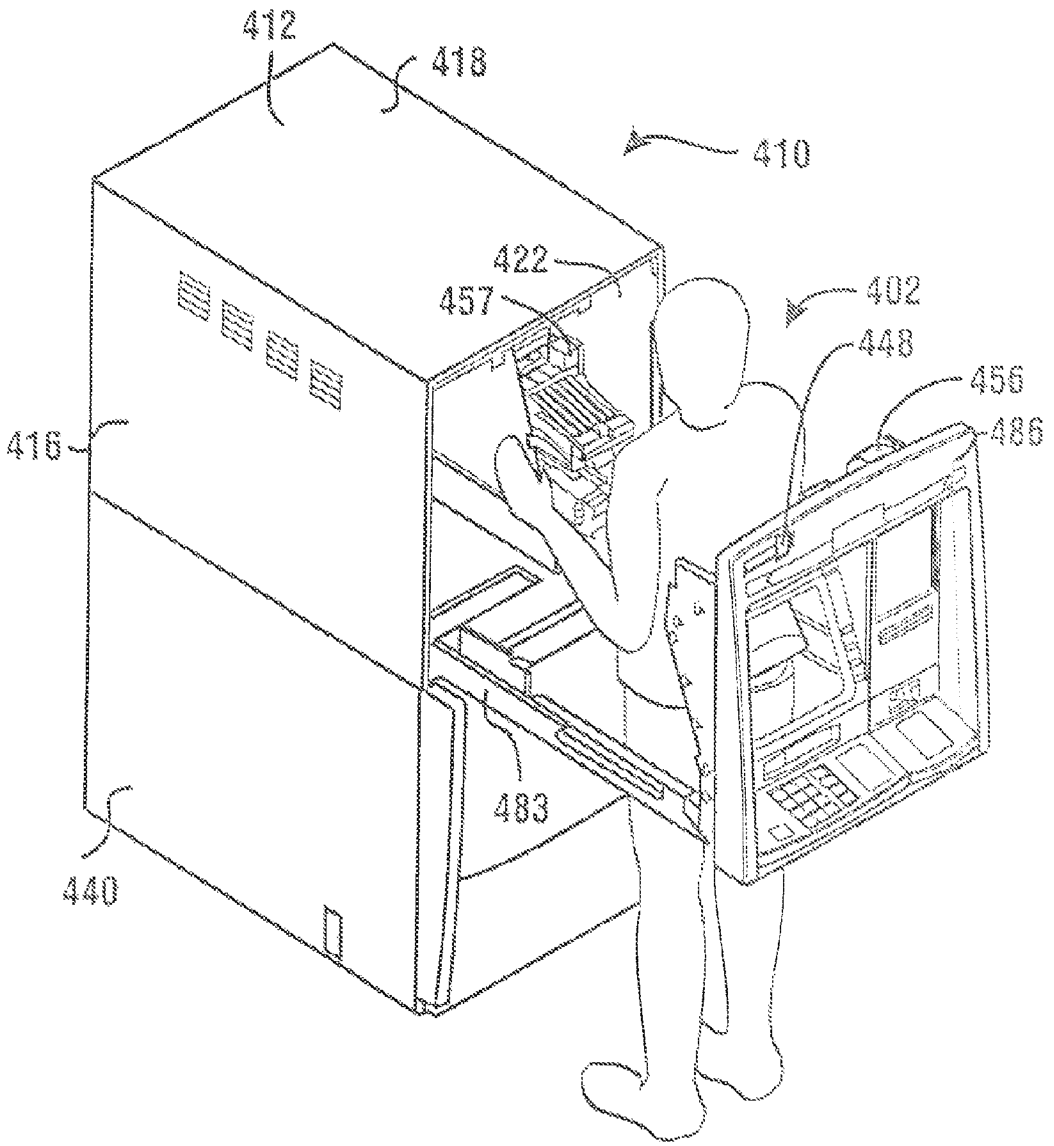
FIG. 19 is a further isometric view of the automated banking machine of the exemplary embodiment shown in FIG. 18.

With reference to FIG. 19, there is shown a further view of the exemplary embodiment of the automated banking machine 410 described under FIG. 18. Shown is the servicer

402 at least partially occupying the space defined by the fascia 486, the housing 412, and the two horizontally disposed members 483, 484.

Figure 20:
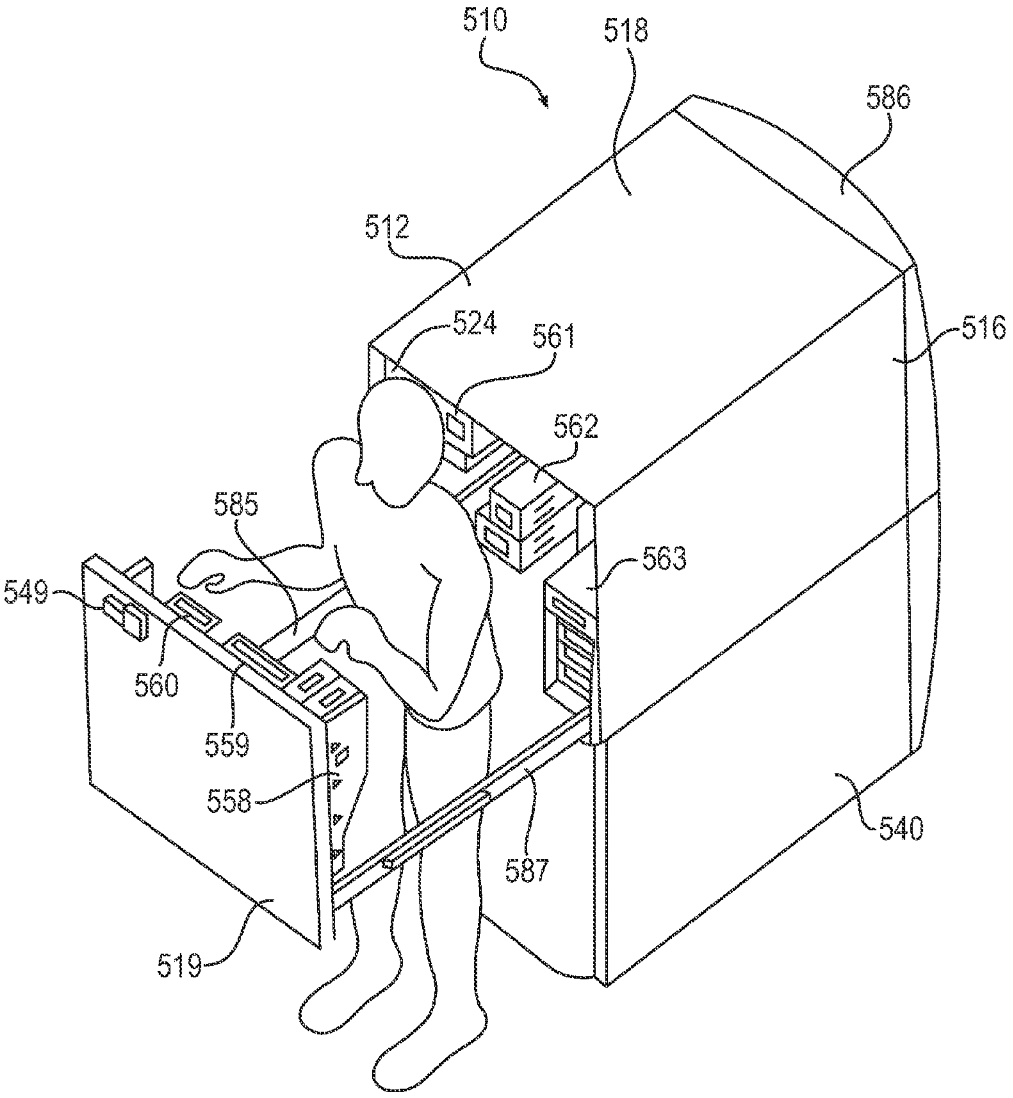
FIG. 20 is an isometric view of an automated banking machine of an exemplary embodiment.

With reference to FIG. 20, in this exemplary embodiment there is shown therein an automated banking machine, generally indicated as 510. In this exemplary embodiment, the automated banking machine 510 is an automated teller machine. The automated banking machine 510 includes a housing 512 mounted atop a chest 540. The housing 512 includes a first side wall 514 (not shown), a second side wall 516, and a top wall 518, and defines a rear opening 524. A rear panel 519 is adapted to cover the rear opening 524 of the housing 512 and may be secured to the housing 512 with a lock 549. The rear panel 519 is in operatively supported connection with the housing 512 and is operatively supported by the housing 512 through two-horizontally disposed members 585, 587. In an exemplary embodiment, the two horizontally disposed members 585, 587 are slideable members adapted to enable the rear panel 519 to be moved away from the rear opening 524 of the housing 512. Further, the rear panel 519, when moved away from the rear opening 524, cooperates with the housing 512 and the two horizontally disposed members 585, 587 to define a space which may be at least partially occupied by the servicer 402 while servicing the automated banking machine 510. Various serviceable components, generally identified in FIG. 20 as components 558-563, may be supported by the rear panel 519, the housing 512, the chest 540, or combinations thereof.

Figure 21:
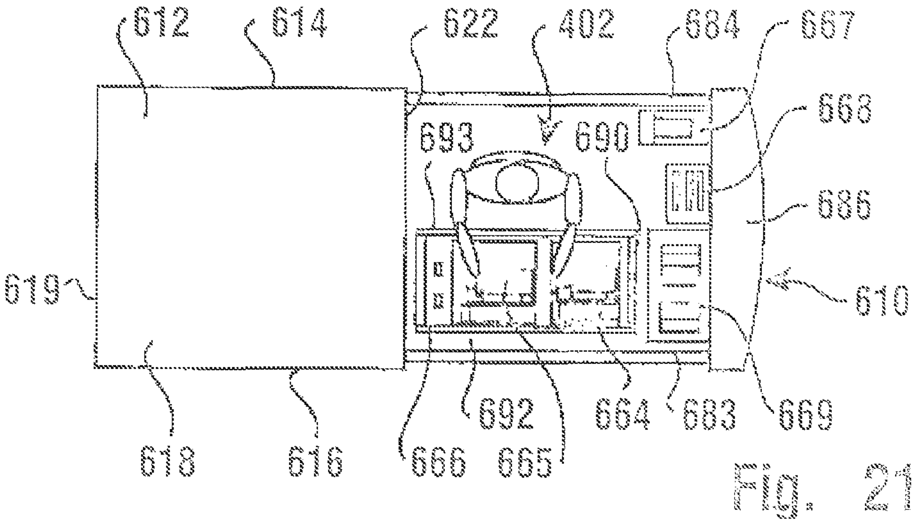
FIG. 21 is a plan view of an automated banking machine of an exemplary embodiment.

With reference to FIG. 21, in this exemplary embodiment there is shown therein an automated banking machine, generally indicated as 610. In this exemplary embodiment, the automated banking machine 610 is an automated transaction machine. The automated banking machine 610 includes a housing 612 mounted atop a chest (not shown). The housing 612 includes a first side wall 614, a second side wall 616, a rear wall 619, and a top wall 618, and defines a front opening 622. A fascia 686 is adapted to cover the front opening 622 of the housing 612 and may be secured to the housing 612 with a lock (not shown). The fascia 686 is in operatively supported connection with the housing 612 and is operatively supported by the housing 612 through two horizontally disposed members 683, 684. In an exemplary embodiment, the two horizontally disposed members 683, 684 are slideable members adapted to enable the fascia 686 to be moved away from the front opening 622 of the housing 612. Further, the fascia 686, when moved away from the front opening, 622, cooperates with the housing 612 and the two horizontally disposed members 683, 684 to define a space which may be at least partially occupied by the servicer 402 while servicing the automated banking machine 610. Various serviceable components, generally identified in FIG. 21 as components 664-669, may be supported by the fascia 686, the housing 612, the chest (not shown), or combinations thereof.

Also shown in FIG. 21, is an exemplary embodiment of a moveable component tray 690. The moveable component tray 690 may support one or more components, generally 664-666. The tray 690 is in operatively supported connection with the housing 612 and is operatively supported by the housing 612 through two horizontally disposed members 692, 693. In an exemplary embodiment, the two horizontally disposed members 692, 693 are slideable members adapted to enable the one or more components, generally 664-669, and their support tray 690 to be moved away from the housing 612 for servicing by the servicer 402. Even when the support tray 690 is moved away from the housing 612, the housing 612, the tray 690, one of the horizontally disposed members 684, for example, and the fascia 686 cooperate to define a space which may be at least partially occupied by the servicer 402. As will be appreciated by those skilled in the relevant art, the moveable tray 690 described herein and illustrated in FIG. 21 may also or additionally be included in a rear-access housing as illustrated in exemplary fashion in FIG. 20. As will also be appreciated by those skilled in the art, the support tray 690 may be disposed in a vertical orientation.

Figure 22:
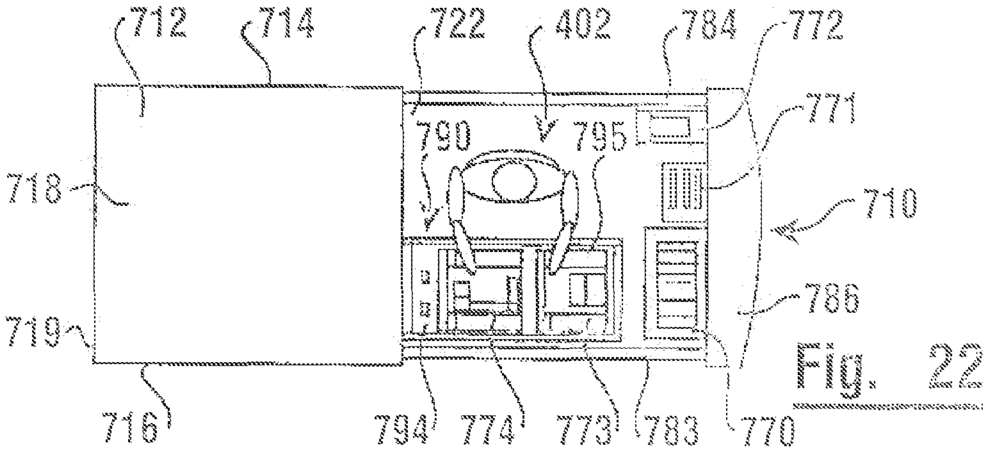
FIG. 22 is a plan view of an automated banking machine of an exemplary embodiment.

With reference to FIG. 22, in this exemplary embodiment there is shown therein an automated banking machine, generally indicated as 710. In this exemplary embodiment, the automated banking machine 710 is an automated teller machine. The automated banking machine 710 includes a housing 712 mounted atop a chest (not shown). The housing 712 includes a first side wall 714, a second side wall 716, a rear wall 719, and a top wall 718, and defines a front opening 722. A fascia 786 is adapted to cover the front opening 722 of the housing 712 and may be secured to the housing 712 with a lock (not shown). The fascia 786 is in operatively supported connection with the housing 712 and is operatively supported by the housing 712 through two horizontally disposed members 783, 784. In an exemplary embodiment, the two horizontally disposed members 783, 784 are slideable members adapted to enable the fascia 786 to be moved away from the front opening 722 of the housing 712. Further, the fascia 786, when moved away from the front opening 722, cooperates with the housing 712 and the two horizontally disposed members 783, 784 to define a space which may be at least partially occupied by the servicer 402 while servicing the automated banking machine 710. Various serviceable components, generally identified in FIG. 22 as components 770-775, may be supported by the fascia 786, the housing 712, the chest (not shown), or combinations thereof.

Also shown in FIG. 22, is an exemplary embodiment of a moveable component rack 790. The moveable component rack 790 may support one or more serviceable components, generally 773-775. The rack 790 is in operatively supported connection with the housing 712 and is operatively supported by the housing 712 through two horizontally disposed members 794, 795. In an exemplary embodiment, the two horizontally disposed members 794, 795 are slideable members adapted to enable the one or more components, generally 773-775, and their supporting rack 790 to be moved away from the housing 712 for servicing by the servicer 402. Even when the supporting rack 790 is moved away from the housing 712, the housing 712, the rack 790, one of the horizontally disposed members 784, for example, and the fascia 786 cooperate to define a space which may be at least partially occupied by the servicer 402. As will be appreciated by those skilled in the relevant art, the moveable rack 790 described herein and illustrated in FIG. 22 may also or additionally be included in a rear-access housing as illustrated in exemplary fashion in FIG. 20. As will also be appreciated by those skilled in the art, the supporting rack 790 may be disposed in a vertical direction.

Figure 23:
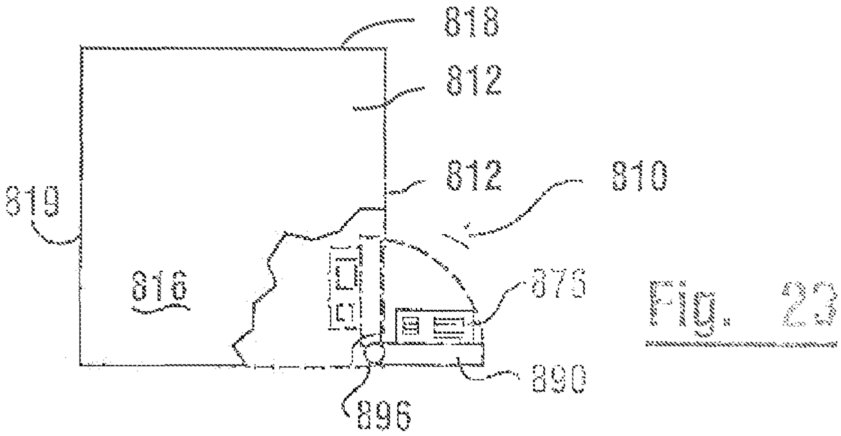
FIG. 23 is an elevation view, partly in phantom, of a portion of an automated banking machine of an exemplary embodiment.

With reference to FIG. 23, in this exemplary embodiment there is shown therein a portion of an automated banking machine, generally indicated as 810. In this exemplary embodiment, the automated banking machine 810 is an automated teller machine. The automated banking machine 810 includes a housing 812 mounted atop a chest (not shown). The housing includes a first side wall (not shown), a second side wall 816, a rear wall 819, and a top wall 818, and defines a front opening 822. Also shown in FIG. 23, is an exemplary embodiment of a pivotable component rack 890. The pivotable component rack 890 is in operatively supported connection with the housing 812 and is operatively supported by the housing 812 through a pivot 896. The pivotable component rack 890 may support one or more serviceable components, generally 876. The pivot 896 is adapted to enable the one or more components, generally 876, and their pivotable component rack 890 to be moved away from the housing 812 for servicing by the servicer 402. As will be appreciated by those skilled in the art, the pivot 896 may alternatively be disposed in a vertical orientation.

An exemplary embodiment includes a method for accessing and servicing the contents, and particularly the serviceable components, of the housing to, but not limited to, clean, repair, or replace parts, make adjustments, replenish consumables such as paper, print materials, and lubricants, or exchange components. The method includes releasing the lock holding the cover adjacent to the opening of the housing of the automated banking machine and moving the cover away from the housing, wherein the cover remains in operatively supported connection with the housing, and wherein the cover is operatively supported by the housing through two horizontally disposed members. In an exemplary embodiment, the members are slideable horizontally disposed members and the method includes the step of sliding the cover away from the housing. The method further includes standing between the two horizontally disposed members and servicing at least one serviceable component of the automated banking machine. In a further exemplary embodiment, the method includes moving out from between the two horizontally disposed members, moving the cover back toward the housing, whereby the cover is positioned adjacent the housing opening, and securing the lock.

In a further exemplary embodiment, the method further includes moving the at least one component away from the housing for servicing. In a further exemplary embodiment, the step of moving the at least one component away from the housing includes sliding the at least one component away from the housing, pivoting at least a portion of the at least one component away from the housing, sliding a tray supporting the at least one component away from the housing, and sliding a rack supporting the at least one component away from the housing while standing between the two horizontally disposed members.

In a further exemplary embodiment, the method further includes moving the at least one component back into the housing after servicing. In a further exemplary embodiment, the step of moving the at least one component back into the housing includes sliding the at least one component back into the housing, pivoting the at least one portion of the at least one component back into the housing, sliding the tray supporting the at least one component back into the housing, and sliding the rack supporting the at least one component back into the housing while standing between the two horizontally disposed members.

As will be appreciated by those skilled in the art, the at least one component may alternatively be in operatively supported connection with the cover and the method include moving the at least one component moved away from the cover for servicing, servicing the at least one component, and subsequently moving the at least one component back to the cover. As will also be appreciated by those skilled in the art, the cover may comprise a fascia or a rear panel.

Exemplary embodiments may also include features described in U.S. Pat. Nos. 7,255,266; 7,251,626; 7,249,761; 7,246,082; 7,240,829; 7,240,827; 7,234,636; 7,229,009; 7,229,012; 7,229,008; 7,222,782; 7,216,801; 7,216,800; 7,216,083; 7,207,478; 7,204,411; 7,195,153; and 7,195,237 the disclosures of each of which are incorporated herein by reference in their entirety. Exemplary embodiments may also include features described in U.S. Provisional Application 61/395,335 filed May 12, 2010, the disclosure of which is incorporated herein by reference in its entirety.

Figure 24:
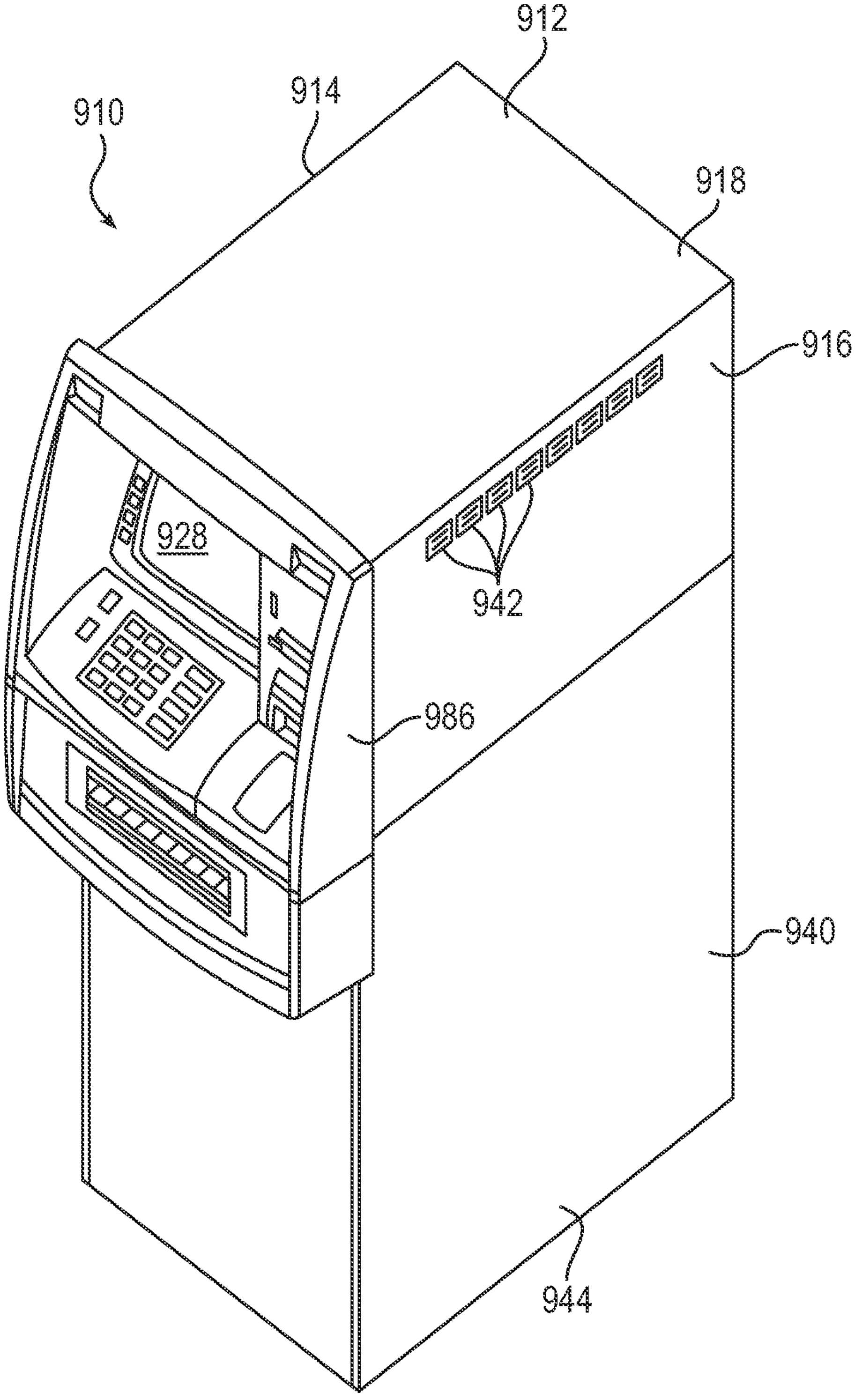
FIG. 24 is an isometric view of an automated banking machine of an exemplary embodiment.

With reference to FIG. 24, in this exemplary embodiment there is shown therein an automated banking machine, generally indicated as 910. In this exemplary embodiment, the automated banking machine 910 is an automated teller machine. The automated banking machine 910 includes a housing 912 mounted atop a secure chest 940. The chest 940 may be enclosed in a chest housing 944 or may itself comprise the exterior walls of a portion of the machine. The housing 912 bounds an interior area and includes a first sidewall 914, a second sidewall 916, and a top wall 918. The walls define an opening 22 (shown in exemplary fashion in FIG. 2) to an interior area 20 (shown in exemplary fashion in FIG. 2). The housing 912 further includes housing vents 942 formed in the sidewalls 914, 916 which provide ventilation and enable the movement of air into or out of the housing 912. In the exemplary embodiment air is moved to help cool electronic parts contained, for example, in a component case 924 (FIG. 25).

An upper fascia 986 provides an attractive appearance as well as security. The fascia 986 is in operatively supported connection with the housing 912 and moveable between a secure closed position adjacent to the housing opening 22 and a released away position. (FIGS. 1 and 2.) In the exemplary embodiment, a card reader 24 (shown in exemplary fashion in FIG. 3) is in operatively supported connection with the housing 912 and is operative to read indicia on user cards corresponding to financial accounts. Also in the exemplary embodiment, a display 928 and a cash dispenser 64 (shown in exemplary fashion in FIG. 3) are in operatively supported connection with the housing 912. The component case 924 (FIG. 25), which in the exemplary embodiment comprises a processor case, is in operatively supported connection with the housing 912 and may contain computer processors, circuit cards, memory devices and other electronic components (not shown). As shown in FIG. 26, but best seen in FIG. 27, the component case 924 further includes one or more component case vents 943 which may cooperate with one or more fans or other air movement devices (not shown) to help move air to and from the inside of the case and ventilate the interior of the component case 924.

Figure 25:
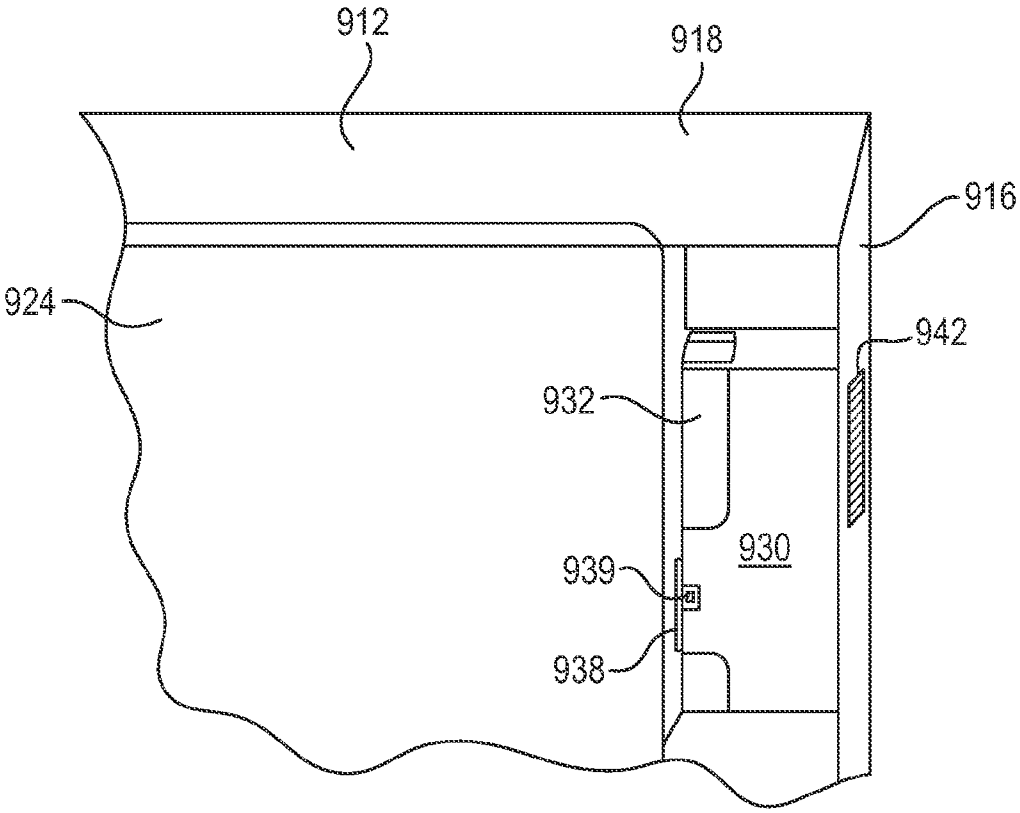
FIG. 25 is a view of a portion of an automated banking machine of an exemplary embodiment illustrating a component case assembled into a top housing.
Figure 26:
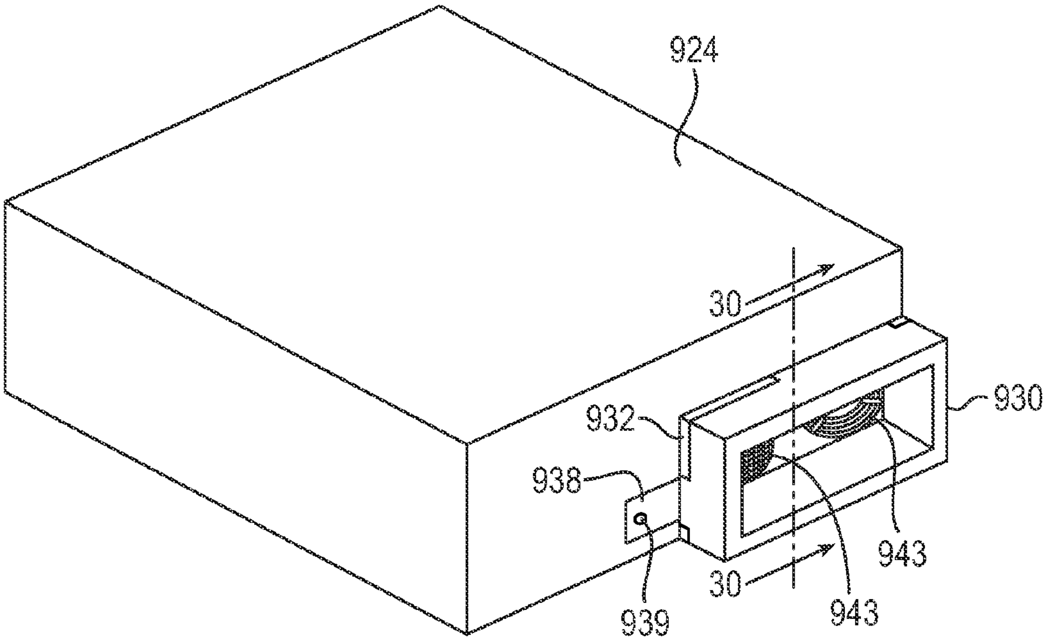
FIG. 26 is an isometric view of a portion of an automated banking machine of an exemplary embodiment illustrating a component case in combination with a duct assembly.

As will be understood from FIGS. 24 and 25, ventilation air from the interior of the component case 924 may not easily reach or be drawn from outside the housing 912 which encloses the case 924 as well as other components of the automated banking machine 910. As shown in exemplary fashion in FIG. 25, a duct 930 is operatively disposed between the component case 924 at the component case vents 943 (FIGS. 26 and 27) and the housing sidewall 916 at the at least one housing vent 942 (FIGS. 24 and 25). Air from the interior of the component case 924, by way of example only, warm air heated by the operation of processors or other components within the case 924, may then be guided within the duct to outside the housing 912. Likewise, in some embodiments and depending upon the direction of air flow, cooler air from outside the housing 912 may be guided to the interior of the component case 924. In an exemplary embodiment, the duct 930 is adhered to the component case 924 with an adhesive 936 (shown in exemplary fashion in FIG. 30). In a further exemplary embodiment, the duct 930 may be alternatively and/or in addition adhered to the inside wall of the housing 912. In a further exemplary embodiment, the adhesive 936 is releasable. In a further exemplary embodiment, the adhesive is resealable. Thus, the duct 930 may be released from its position and later resealed. This may be accomplished in exemplary embodiments by sealants which remain flexible and tacky at ambient temperatures.

Figure 27:
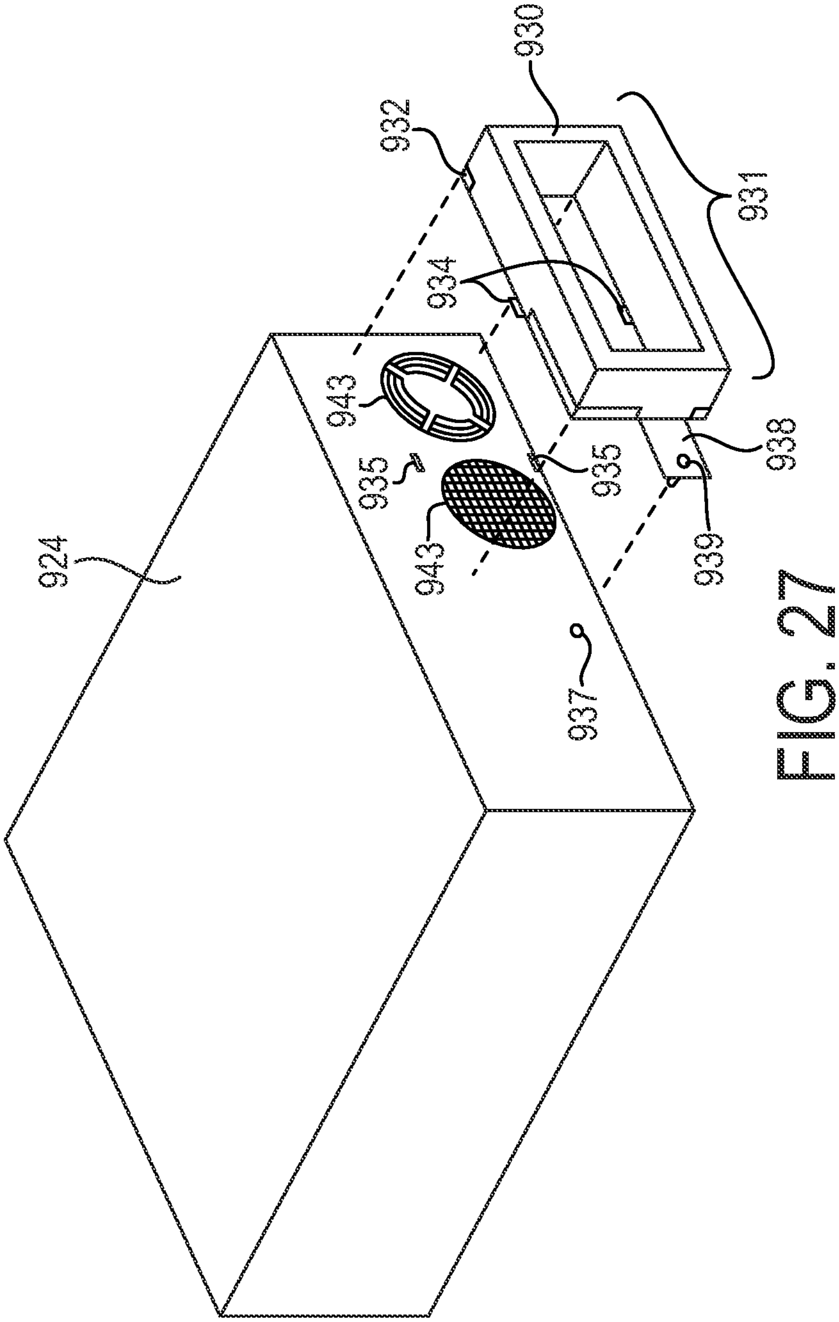
FIG. 27 is an exploded isometric view of the automated banking machine of the exemplary embodiment of FIG. 26.
Figure 28:
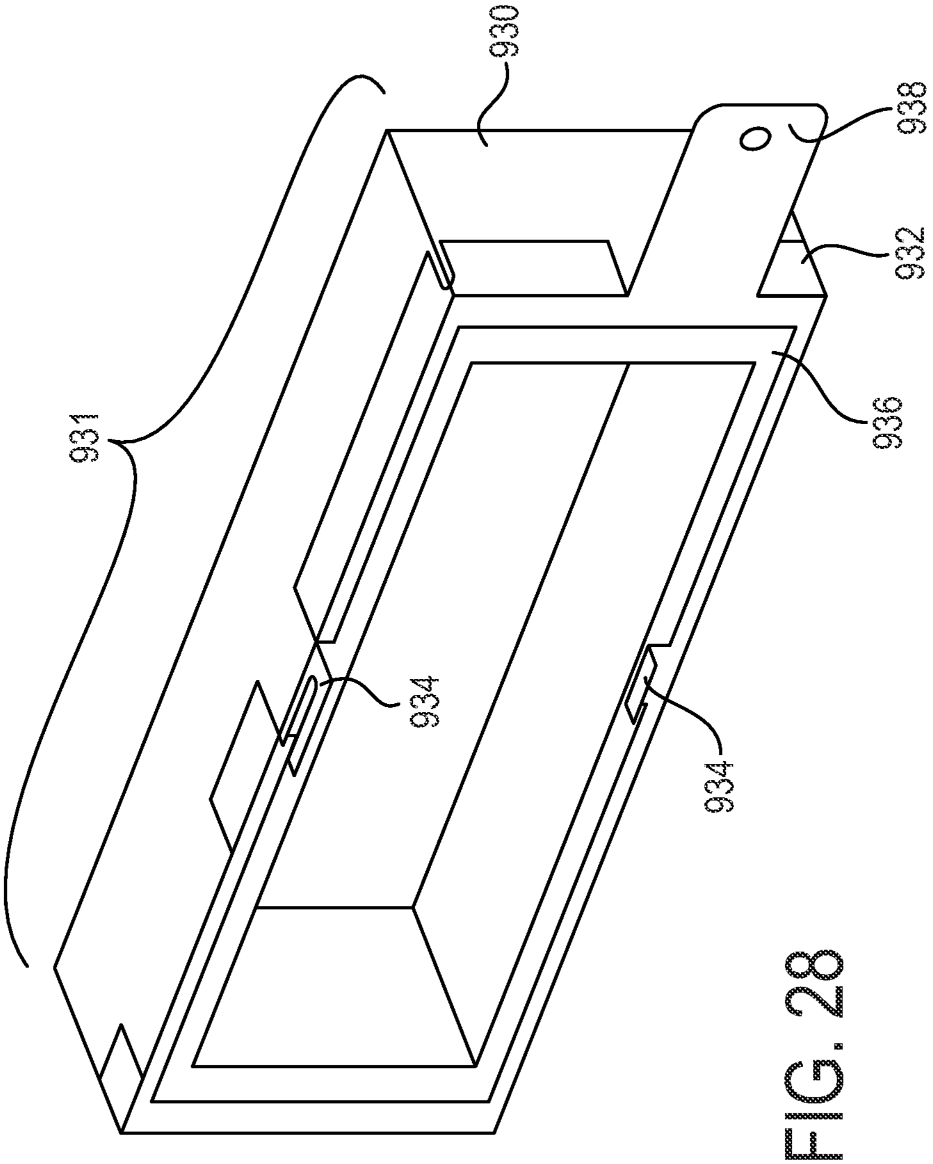
FIG. 28 is an isometric view of a duct assembly portion of an automated banking machine of an exemplary embodiment illustrating the details of the duct assembly.
Figure 29:
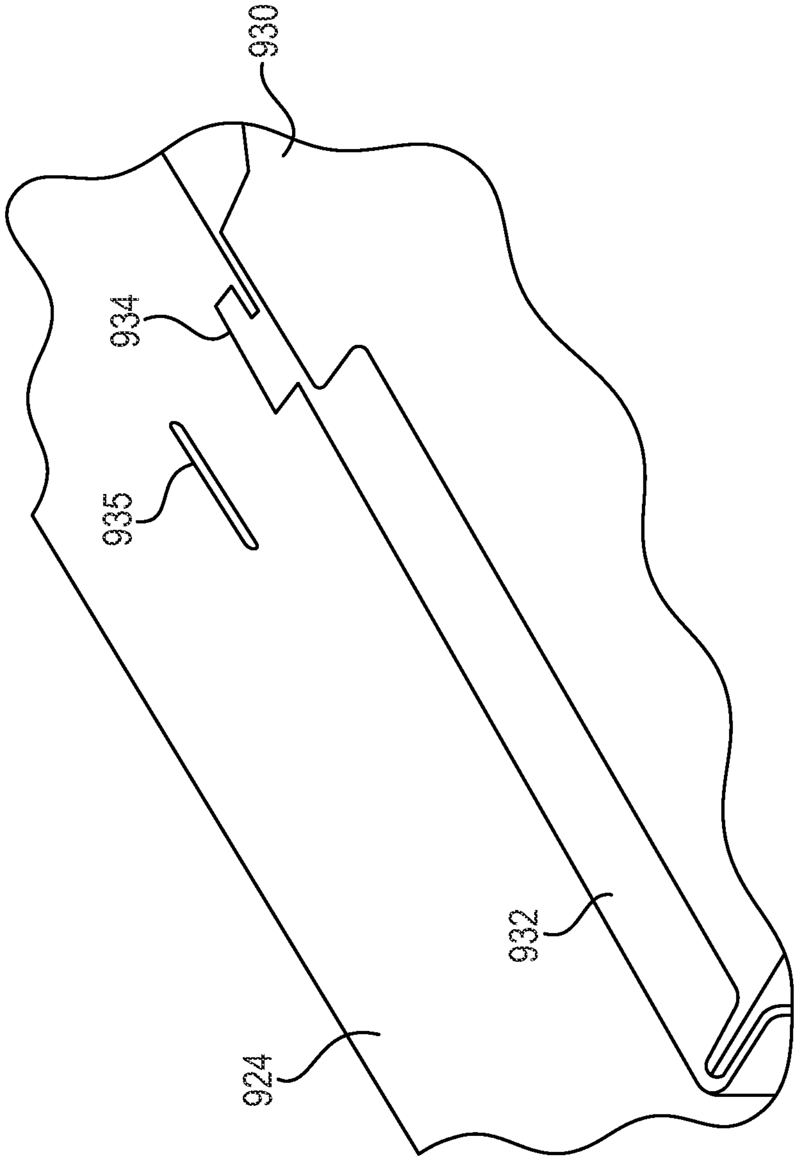
FIG. 29 is an isometric view of a portion of a duct assembly portion and a portion of a component case portion of an automated banking machine of an exemplary embodiment illustrating the details of the duct assembly and component case.
Figure 30:
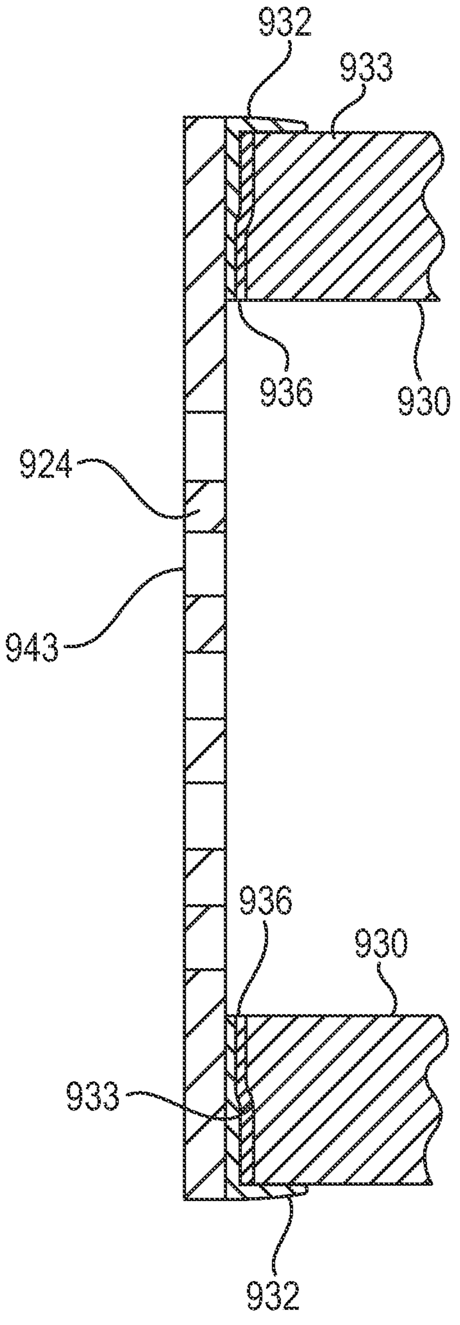
FIG. 30 is a partial section view taken along the line 30-30 of FIG. 26.

A further exemplary embodiment is shown in FIGS. 27 and 28 which generally illustrate an exemplary duct assembly 931. The duct assembly 931 may comprise a resilient deformable duct 930 to which a frame 932 has been secured. In other embodiments ducts may be comprised of other enclosed structures operative to conduct air therethrough. In a further exemplary embodiment, the frame 932 may be comprised of relatively rigid material and may include one or more tab portions 938, one or more hook portions 934, or combinations of tab portions 938 and hook portions 934. In an exemplary embodiment, the frame 932 is adhered to the duct 930 with an adhesive 936 (FIGS. 28 and 30). In a further exemplary embodiment, the one or more tab portions 938 cooperate with, for example, one or more fasteners 939 (FIGS. 25 and 27) which can extend in and engage one or more apertures 937 in the component case 924 to reliably secure the duct 930 to the component case 924. While the fastener 939 is shown as a screw, it is to be understood that other fasteners may be employed. In an exemplary embodiment, the one or more hook portions 934 are configured to cooperate with and engage one or more component case slots 935 to reasonably secure the duct 930 to the component case 924. In the secured position the duct extends in surrounding relation of one or more processor case vents. While the duct assembly 931 is shown in exemplary fashion as secured to the component case 924, the duct assembly 931 may be secured to the housing 912, for example, the housing sidewall 916, or to other cases or elements of the automated banking machine 910.

In a further exemplary embodiment, as shown in FIG. 30, the duct assembly 931 is adhered to the component case 924 with adhesive 936. The adhesive 936 is secured to an edge face 933, proximate the component case 924, and the duct assembly 931 adhered to the component case 924. As shown in FIG. 30, the adhesive 936 may secure the frame 932 to the duct 930 and the adhesive 936 may secure the duct assembly 931 to the component case 924. It is to be understood that the adhesive material used to secure the frame 932 to the duct 930 may not be the same adhesive material used to secure the duct assembly 931 to the component case 924. In a further exemplary embodiment, the frame 932 is secured to the duct 930 by other means. As can be seen from FIG. 30, forming the duct 930 from deformable resilient material, such as foam, enables the duct 930 to deform around the frame 932 thickness and contact the component case 924.

In an exemplary embodiment, a method is performed. The fascia 986 is moved from a position adjacent the opening 22 (FIG. 2) to the interior 20 of the housing 912 of the automated banking machine 910, to a position away from the opening 22. The component case 924 is moved from a position within the interior 20 of the housing 912 to a position at least partially extending through the opening 22. The duct assembly 931, at least partially secured to the component case 924 with the releasable resealable adhesive 936, is released and separated from the component case 924. A component (not shown), at least partially contained within the component case 924 is serviced. This may include replacing or adjusting a circuit card, processor board, a hard drive, a transformer or other component, for example. The duct assembly 931 is adhered to the component case 924, and the component case 924 moved from the position at least partially extending through the opening 22 to the position within the interior 20 of the housing 912. The fascia 986 is moved from the position away from the opening 22 of the housing 912 to the position adjacent the opening. In a further embodiment, the duct assembly 931, comprising the resilient deformable duct 930 with releasable resealable adhesive 936 secured thereto, the duct 930 is deformed to adhere to the component case 924. The duct 930 may also be comprised of combinations or portions of relatively rigid and other portions of resilient material. In a further embodiment, the duct assembly 931, further comprising the duct frame 932 having at least one hook portion 934 and the component case 924, further comprising the at least one slot 935, the at least one hook portion 934 is mated and engaged with the at least one slot 935. In a further embodiment, the duct assembly 931 further comprises the frame 932 having at least one tab portion 938 and an least one fastener 939 in operative connection with the at least one tab 938 and the component case 924 further includes at least one fastener hole 937. The at least one fastener 939 is mated with the at least one fastener hole 937. In some embodiments the duct 930 may be comprised of a relatively rigid material such as rigid plastic or sheet metal, for example.

In a further exemplary embodiment, a method is provided. The housing 912 is mounted in supporting connection with the chest 44 (FIG. 2). The card reader 24 (FIG. 3) is installed in operatively supported connection with the housing 912, the display 928 is installed in operatively supported connection with the housing 912, and a cash dispenser 64 (FIG. 3) is installed in operatively supported connection with the housing 912. The component case 924, having at least one component case vent 943, is installed in operatively supported connection with the housing 912. The duct assembly 931, including a duct 930 is adhered to the component case 924. In a further exemplary embodiment, the duct assembly 931 further includes a frame 932 and the method further includes securing the frame 932 to the duct 930. In a further exemplary embodiment, the frame 932 is adhered to the duct 930. In a further exemplary embodiment, the frame includes at least one hook portion 934 and the component case 924 further includes at least one slot 935, the slot 935 adapted to accept the at least one hook portion 934, the method further comprising mating the at least one hook portion 934 and the at least one slot 935. In a further exemplary embodiment, the frame 932 includes at least one tab portion 938, the duct assembly 931 further includes at least one fastener 939, and the component case 924 further includes at least one fastener hole 937. The method further comprises mating the at least one fastener 939 and the at least one fastener hole 937.

In still other embodiments a resilient duct may be positioned within the interior of the automated banking machine. The duct may extend in surrounding relation of one or more housing vents and processor case vents. The duct face at one or more ends may be secured to an adjacent wall surface with a resealable or a single use adhesive. In some embodiments the adhesive may be replenished each time the duct is reengaged.

While the exemplary embodiments include particular structures to achieve the desirable results, those having skill in the art may devise numerous other embodiments with other structures which employ the principles described herein and which are encompassed by the subject matter as claimed.

Figure 31:
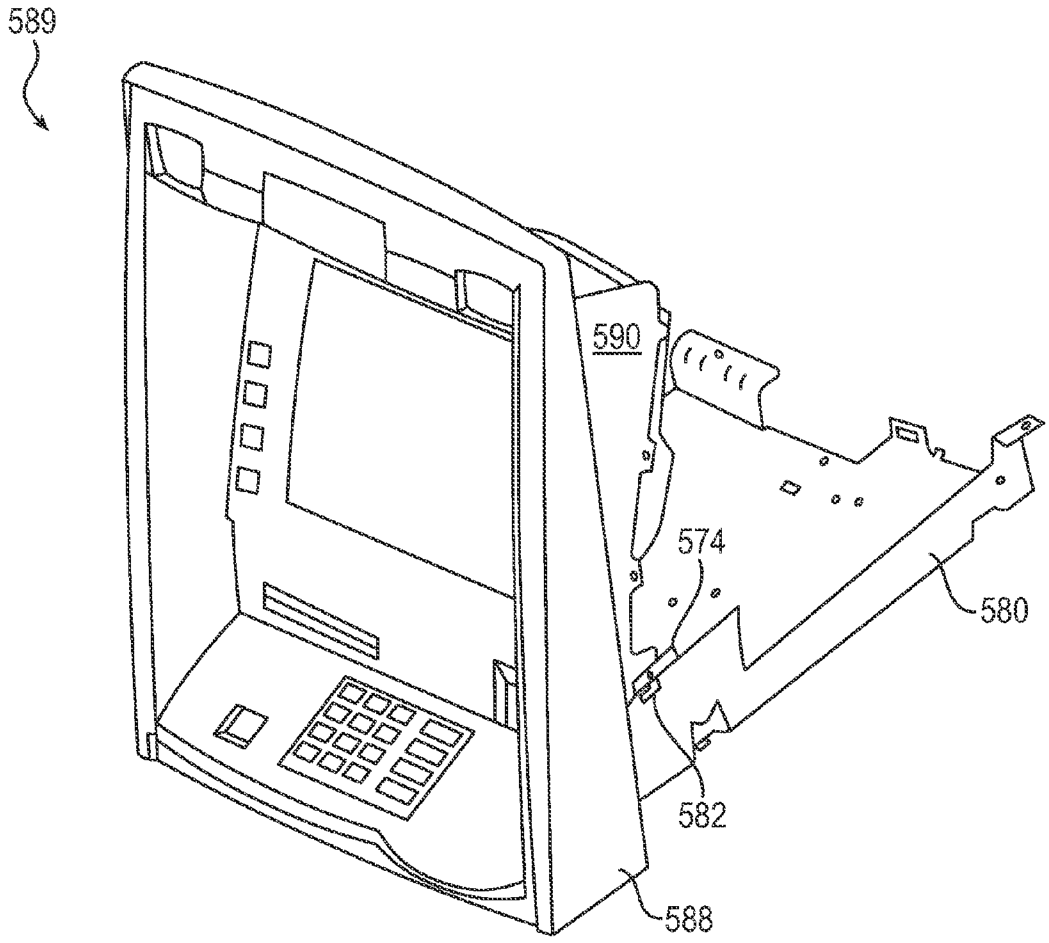
FIG. 31 is an isometric view of a portion of an exemplary automated banking machine illustrating a fascia assembly and a support.

Turning now to FIG. 31, there is shown therein a portion of an automated banking machine of a further exemplary embodiment. (See FIG. 1 for a general exemplary embodiment of an automated banking machine.) In this exemplary embodiment, a fascia assembly 589 comprises a fascia cover 588 operatively connected to a fascia frame 590. While the fascia cover 588 and fascia frame 590 may be described in the exemplary embodiment as separate elements, it is to be understood the fascia cover 588 and the fascia frame 590 may in some embodiments be of a single-piece construction. Also shown in FIG. 31 is a support 580. The support 580 may comprise a tray, which tray may further support automated banking machine components such as, by way of example only, a display 28 (e.g., FIG. 2), a card reader 24 (e.g., FIG. 2) and/or a receipt printer 30 (e.g., FIG. 2). The support 580 may comprise slides 84 (e.g., FIG. 2) either in combination with a tray or separately. The fascia assembly 586 is supported, at least in part, by the support 580. The support 580 is further supportively connected to the housing 12 (e.g., FIG. 2) and/or the chest 40 (e.g., FIG. 2).

Figure 32:
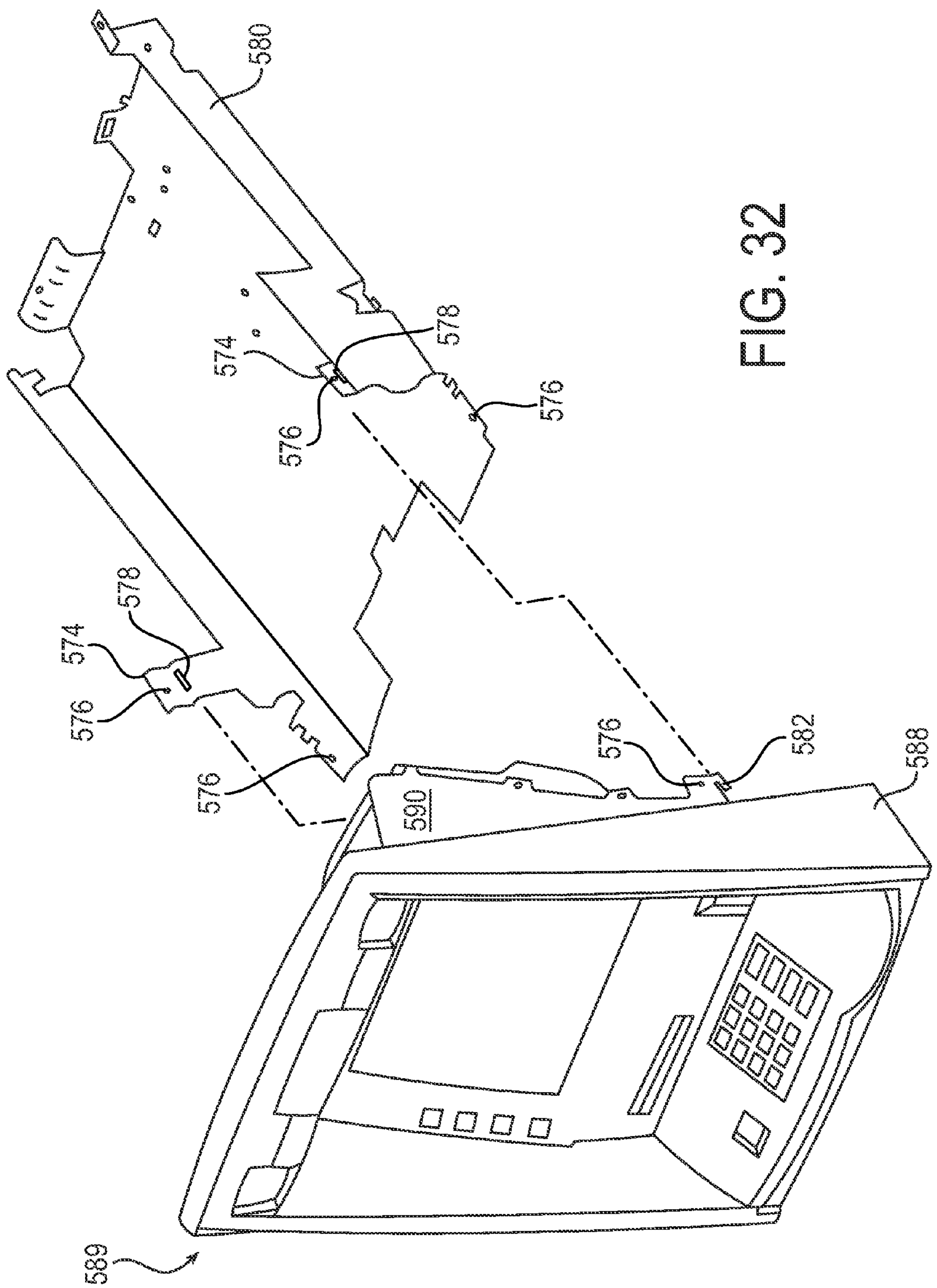
FIG. 32 is an exploded isometric view of a portion of the exemplary automated banking machine of FIG. 31 illustrating the fascia assembly and the support.

Turning now to FIG. 32, there is illustrated an exploded isometric view of the exemplary fascia assembly 586 and exemplary support 580 of FIG. 31 further illustrating the exemplary features. The fascia frame 588 comprises at least one hook 582 and may further comprise two or more hooks 582 (not shown) in spaced-apart relation. The support 580 comprises at least one slot 578 of the exemplary embodiment and may further comprise two or more slots 578. The at least one hook 582 and the at least one slot 578 are formed to enable the at least one hook 582 and the at least one slot 578 to engage and thereby at least partially secure the fascia assembly 586 to the support 580. It is to be understood that either the fascia frame 590 or the support 580 may comprise a hook 582 and the other of the fascia frame 590 or the support 580 comprise a slot 578.

Figure 33:
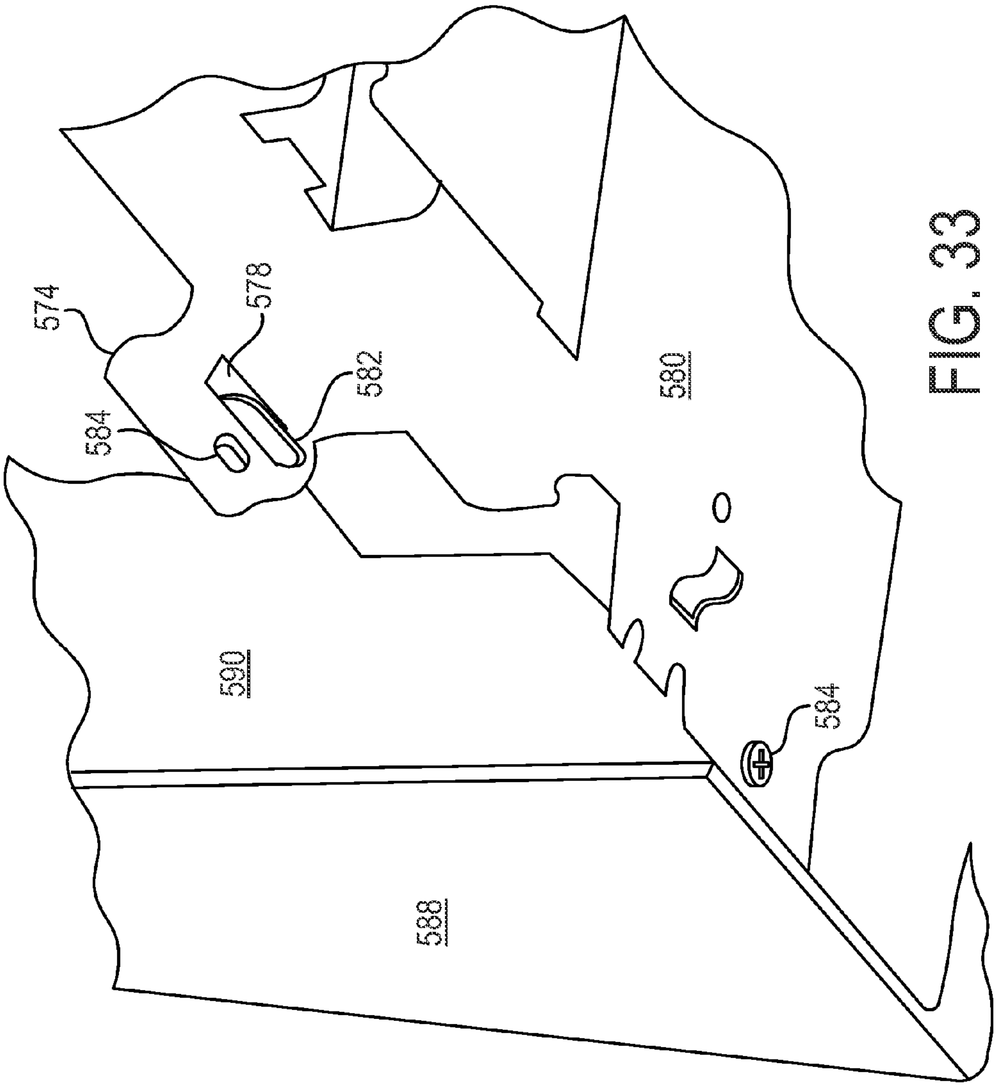
FIG. 33 is an isometric view of a portion of an exemplary automated banking machine illustrating portions of a fascia assembly and a support.
Figure 34:
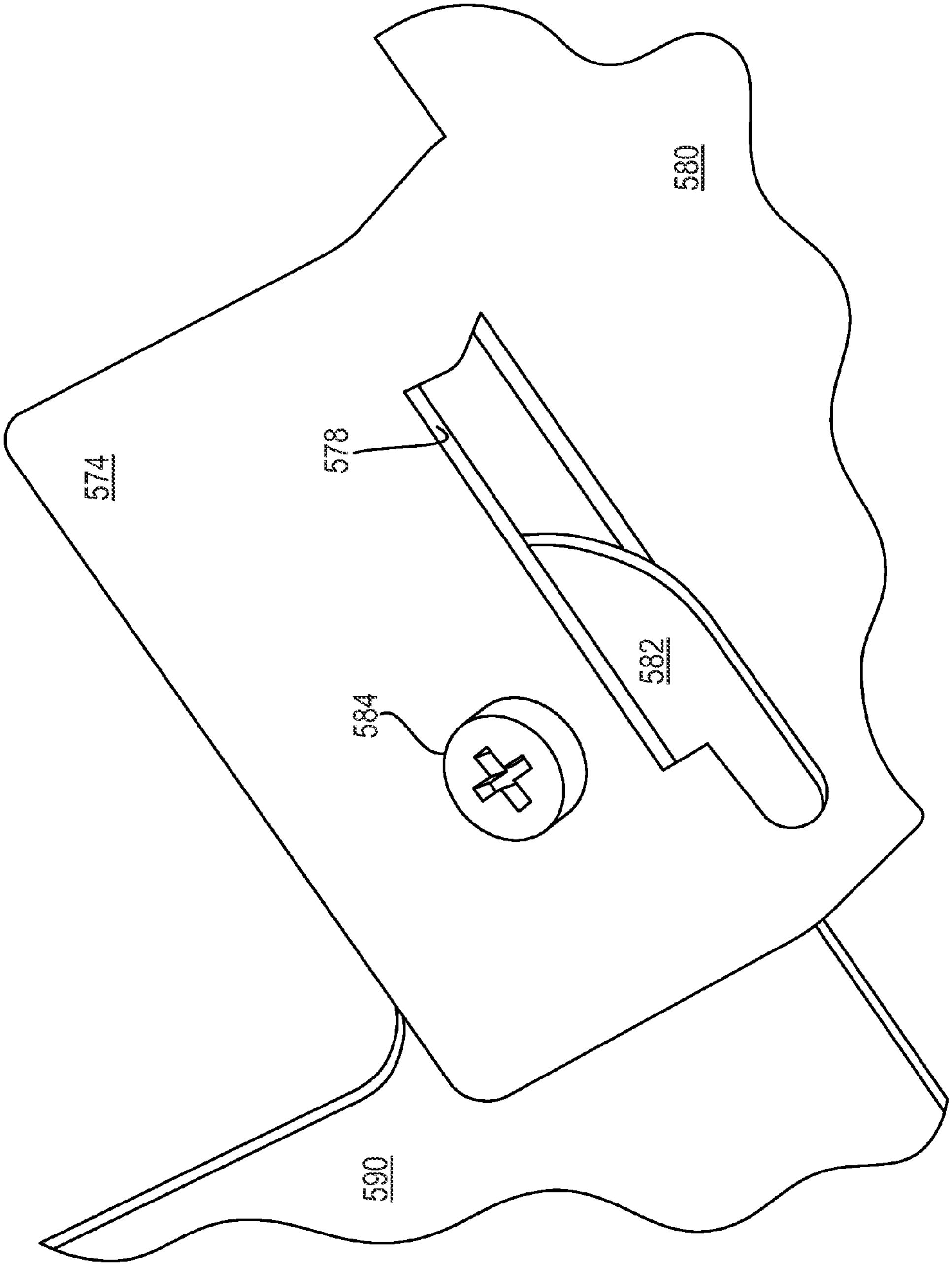
FIG. 34 is an isometric view of a portion of an exemplary automated banking machine illustrating portions of a fascia assembly and a support.
Figure 35:
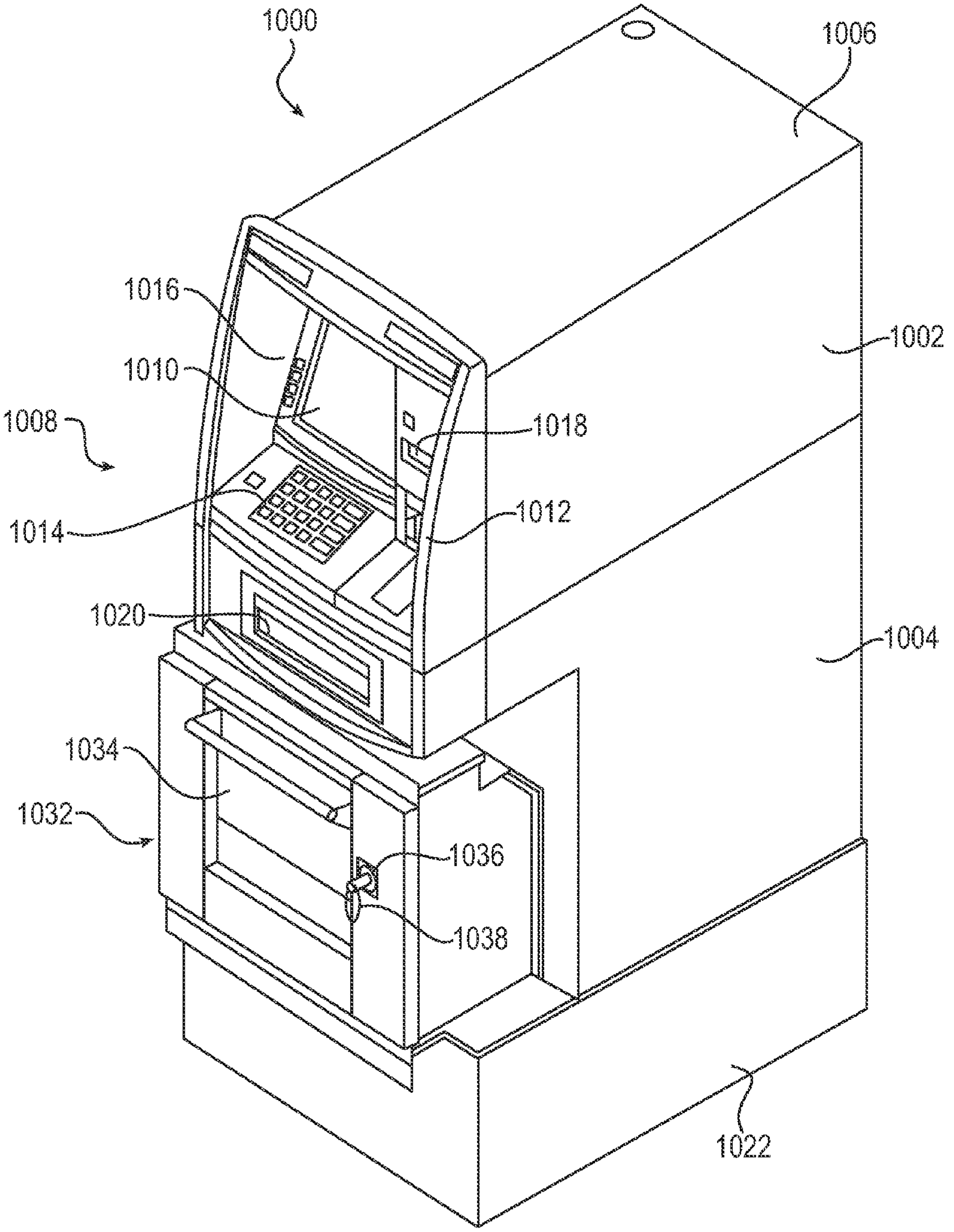
FIG. 35 is an isometric view of an exemplary alternative automated banking machine that includes a separate safe portion.

Turning now to FIGS. 33 and 34, and with reference to FIG. 32, the details of the engagement of the hook 582 and the slot 578 may be further understood. As the hook 582 is engaged with the slot 578, the fascia assembly 589 becomes at least partially supported by the support 580. As such, the fascia assembly 589 may be initially engaged and further secured by a single person. Further, the fascia assembly 589 may be unsecured and disengaged by a single person. As best seen in FIGS. 33 and 34, the hook 582 may be offset from the slot 578 and thus provide a positive engagement between the hook 582 and the slot 578. To further secure the fascia assembly 589 to the support 580, one or more fasteners 584 may be utilized. By way of example only, as shown in FIGS. 33 and 34, a screw 584 may engage screw holes 576 in the fascia frame 590 and in the support 580.

The support 580 may further comprise one or more tabs 574 which may serve to guide the one or more hooks 582 into the one or more slots 578. As with the hooks 582 and the slots 578, it is to be understood that either the fascia frame 590 or the support 580 may comprise one or more tabs 574.

In an exemplary method, referring also to FIGS. 2, 3, and 31-34, the method comprises mounting a housing 12 in supporting connection with a chest 40 adapted for use in an automated banking machine 10, the housing 12 comprising an interior 20 and at least one opening 22 into the interior 20. The method comprises installing a card reader 24 in operatively supported connection with the housing 12, wherein the card reader 24 is operative to read indicia on user cards corresponding to financial accounts. The method comprises installing a display 28 in operatively supported connection with the housing 12. The method comprises installing a cash dispenser 64 in operatively supported connection with the housing 12. The exemplary method comprises installing a printer 30 in operatively supported connection with the housing 12 and operative to print information corresponding to financial accounts and financial transactions. It is understood the card reader 24, the display 28, the cash dispenser 64, and the printer 30 may be mounted onto various elements of the automated banking machine 10, including, but not limited to, a support 580 which may comprise a tray. The method comprises installing the support 580 in operatively supported connection with the housing 12, the support 580 moveable between a position substantially within the interior area 20 of the housing 12 and a position wherein at least a portion of the support 580 is extended through the housing opening 20. (Best understood by reference to FIG. 2.) The method comprises mounting a fascia assembly 589 to the support 580, the fascia assembly 589 comprising a fascia frame 590 and a fascia cover 588 in operatively supported connection with the fascia frame 590. At least one of the fascia frame 590 and the support 580 comprises at least a first hook 582 and the other comprises at least a first slot 578, the at least first hook 582 and the at least first slot 578 formed to engage each other. The method comprises engaging the at least first hook 582 with the at least first slot 578.

The exemplary method further comprises moving the at least first hook 582 to an offset position relative to the at least first slot 578. (Best seen in FIGS. 33 and 34.)

The exemplary method further comprises securing the fascia assembly 589 to the support 580 with, for example, a fastener 584 such as a screw.

The exemplary method further comprises moving the fascia assembly 589 to a secure closed position adjacent the housing opening 22. (Best seen in FIG. 1.)

In a further exemplary method, the method comprises moving a fascia assembly 589 in operatively supported connection with a housing 12 of an automated banking machine 10 from a secure closed position adjacent an opening 22 to an interior 20 of the housing 12 to a released away position away from the opening 22. (Best seen in FIGS. 1 and 2.) The automated banking machine 10 comprises a card reader 24 in operatively supported connection with the housing 12 and operative to read indicia corresponding to financial accounts on user cards, a display 28 in operatively supported connection with the housing 12, a printer 30 in operatively supported connection with the housing 12 and operative to print information corresponding to financial accounts and financial transactions, a cash dispenser 64 in operatively supported connection with the housing 12, and a support 580 in operatively supported connection with the housing 12, the support 580 moveable between a position substantially within the interior 20 of the housing 12 and a position wherein at least a portion of the support 580 is extended through the housing opening 22. (Best seen in FIGS. 1 and 2.) The fascia assembly 589 comprises a fascia frame 590 and a fascia cover 588 in operatively supported connection with the fascia frame 590. At least one of the fascia frame 590 and the support 580 comprises at least a first hook 582 and the other comprises at least a first slot 578, the at least first hook 582 and the at least first slot 578 formed to engage each other. The method comprises disengaging the at least first hook 582 from the at least first slot 578. The method comprises servicing at least one of a serviceable automated banking machine component. Such serviceable automated banking machine components include, for example, the card reader 24, the display 28, the printer 30, and the cash dispenser 64. The method comprises engaging the at least first hook 582 with the at least first slot 578. The method comprises moving the fascia assembly 589 from the released away position from the opening 22 to the secure closed position adjacent the opening 22. (Best seen in FIGS. 1 and 2.)

The fascia assembly 589 may be secured to the support 580 with one or more fasteners 584 and the method further comprise releasing the one or more fasteners 584 securing the fascia assembly 586 to the support 580.

The exemplary method further comprises securing the one or more fasteners 584 securing the fascia assembly 586 to the support 580.

A further alternative embodiment of an automated banking machine is shown in FIGS. 35-58. This automated banking machine generally indicated 1000 may have features similar to those previously discussed herein, or similar to those discussed in the incorporated disclosures. Machine 1000 includes a housing 1002. Housing 1002 includes a chest portion 1004 and an upper housing portion 1006.

Exemplary automated banking machine 1000 includes a customer interface 1008. Customer interface 1008 is positioned on a first side of the machine. The customer interface is used by consumers to conduct transactions through operation of the machine. The exemplary customer interface includes a display 1010, card reader opening 1012 (associated with a card reader), keypad 1014, function keys 1016, and receipt printer outlet 1018. The customer interface of the exemplary embodiment further includes a cash dispenser outlet 1020. The cash dispenser output is operatively connected to a cash dispenser that operates to selectively dispense cash housed in the chest to customers at the machine. It should be understood that these features of the customer interface are exemplary, and in other embodiments other features may be included, depending on the capabilities of the particular automated banking machine. These may include, for example, check accepting openings associated with a check acceptor. Such features may also include a depository opening for accepting envelope deposits. Other features may include a bill acceptor for accepting currency notes for deposit in the machine. A bar code reader or other reading device may also be included in alternative embodiments for reading items such as utility bills, gaming code tickets, or other items which can be processed through operation of the machine. Of course these features are exemplary of many different features and devices that may be included in automated banking machines.

The exemplary automated banking machine 1010 further includes a second side opposed of the first side. The second side includes at least one upper housing access door that is suitable for accessing components of the machine that are located within the upper housing. The chest includes at least one chest door in the exemplary embodiment. The chest door can be selected opened to gain access to currency or other items that are stored in the chest. In the exemplary embodiment, each of the upper housing door and chest door are controlled by one or more locks so as to limit access to the interior areas thereof to authorized persons. This may include, for example, service personnel who service components of the machine.

Figure 36:
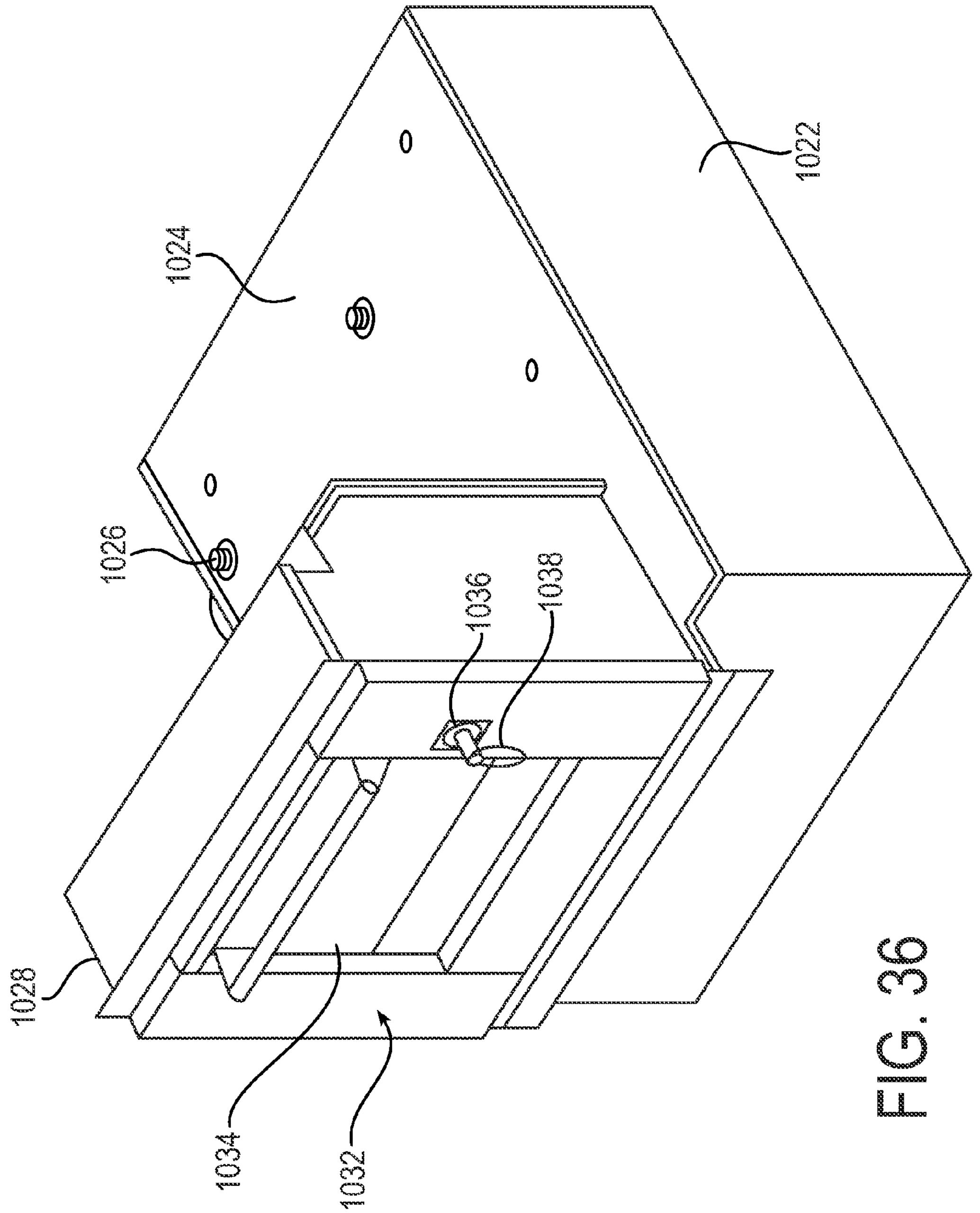
FIG. 36 is an isometric view showing the safe of the automated banking machine of FIG. 35.

In the exemplary embodiment, the automated banking machine further includes a safe 1022. The safe is separate from the chest. As shown in FIG. 36, the exemplary safe 1022 includes a top wall 1024 which supports the chest of the automated banking machine. In the exemplary embodiment, the chest can be secured to the safe by fasteners that extend through the floor of the chest and into the safe. This is represented in the exemplary embodiment by fasteners 1026.

Safe 1022 includes a depository head enclosure 1028. Depository head enclosure in the operative condition includes a depository head 1030 mounted therein. (See FIG. 47.) The depository head includes an opening 1032. A depository head door 1034 is attached to a drawer into which items may be placed when the drawer is in an unlocked position.

In the exemplary embodiment, the depository head includes a lock 1036. Head lock 1036 is selectively openable via certain authorized keys 1038. In exemplary embodiments, such keys may include physical keys, electronic keys, radio frequency keys, or other suitable keys for unlocking the lock. In some exemplary embodiments, the depository head door may be opened responsive to inputs via the customer interface of the automated banking machine. For example, a user may input a card and personal identification number (PIN) through the customer interface that corresponds to an authorized machine user. Thereafter by indicating that the user wishes to make a deposit of a type that is stored in the safe, the automated banking machine may operate to cause the head door to be openable. Operating the depository head to be controlled responsive to the customer interface may enable the separate lock for the head door to be eliminated in some embodiments. Alternatively, some embodiments may enable the head door to be opened either responsive to inputs through the customer interface of the automated banking machine or by using an authorized key. In still other embodiments, the safe may operate to accept deposits totally independent of the operation of the customer interface of the automated banking machine. This may be done, for example, in situations where there is limited wall space, and the owner of the machine wishes to combine the functions of a normal separate depository for commercial customers with a consumer operated automated banking machine. Of course these approaches are exemplary, and in other embodiments other approaches may be used.

Figure 39:
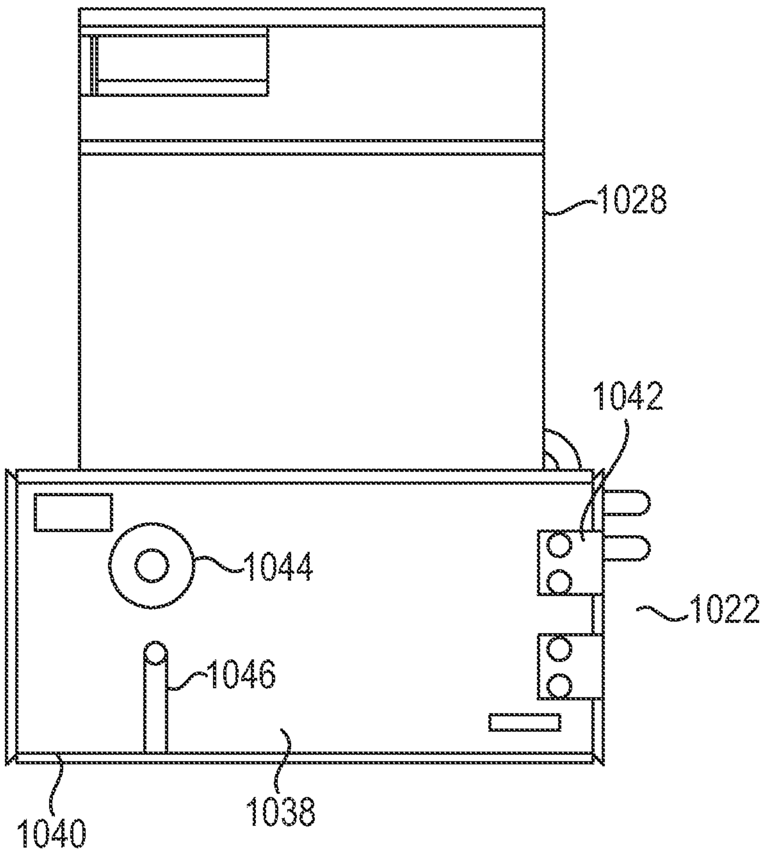
FIG. 39 is a back view of the exemplary safe.
Figure 44:
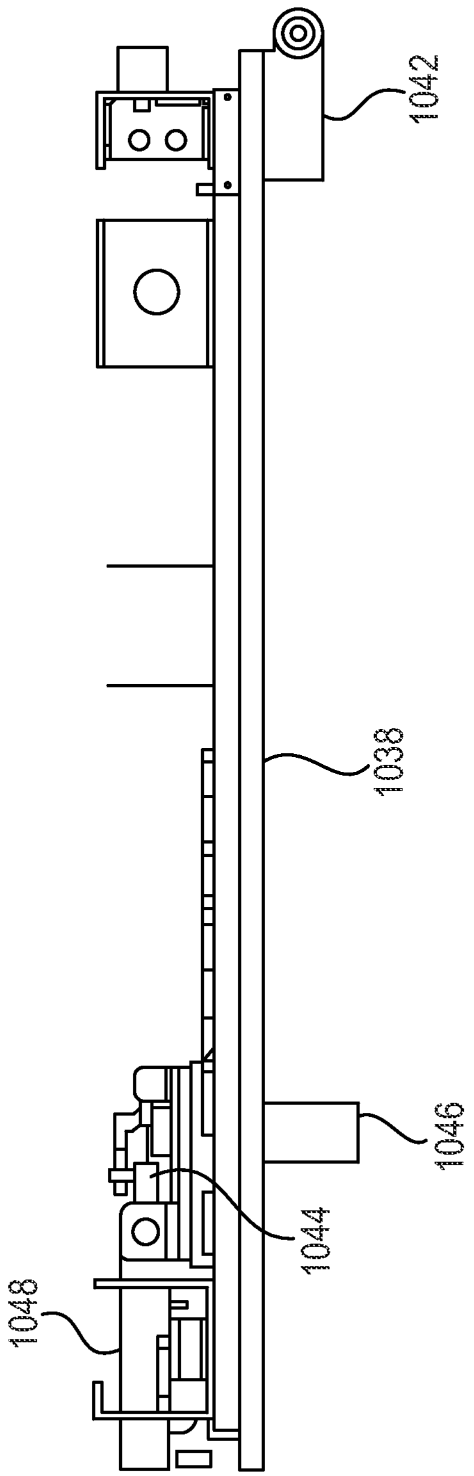
FIG. 44 is a top view showing the safe door.
Figure 45:
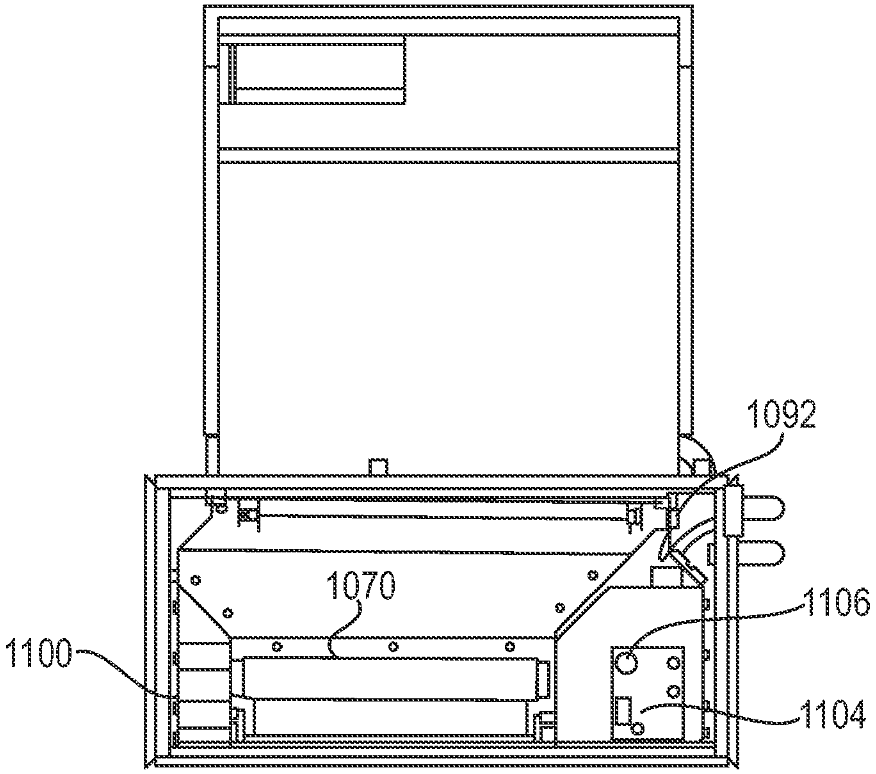
FIG. 45 is a rear view showing the safe from the back, with the door removed.

As best shown in FIG. 39, the exemplary embodiment of the safe 1022 includes at the second side thereof, a safe door 1038. Safe door 1038 is operative to selectively close a safe door opening 1040. Safe door 1038 is movably mounted to the safe through hinges 1042. (See FIG. 44.) Safe door 1038 may be held in a closed position through operation of a lock 1044, such as a combination lock. A lever 1046 enables movement of locking bolts 1048 when the safe lock 1044 is in an unlocked position. As shown in FIG. 44, when the lock 1044 is unlocked, moving the lever enables locking bolts 1048 to be retracted so as to disengage the locking bolts and a strike in operative connection with the side of the safe. This enables the safe door to be changed from a closed condition to an open condition. Likewise when the safe door is to be locked, the safe door is moved from the open condition to the closed condition, closing the safe door opening. In this closed condition, the lever 1046 can be moved to extend the locking bolts 1048 so as to hold the safe door in the closed condition. The lock may then be turned or otherwise activated so that it is in a locked condition. Of course this approach is exemplary, and in other embodiments other approaches may be used.

Figure 37:
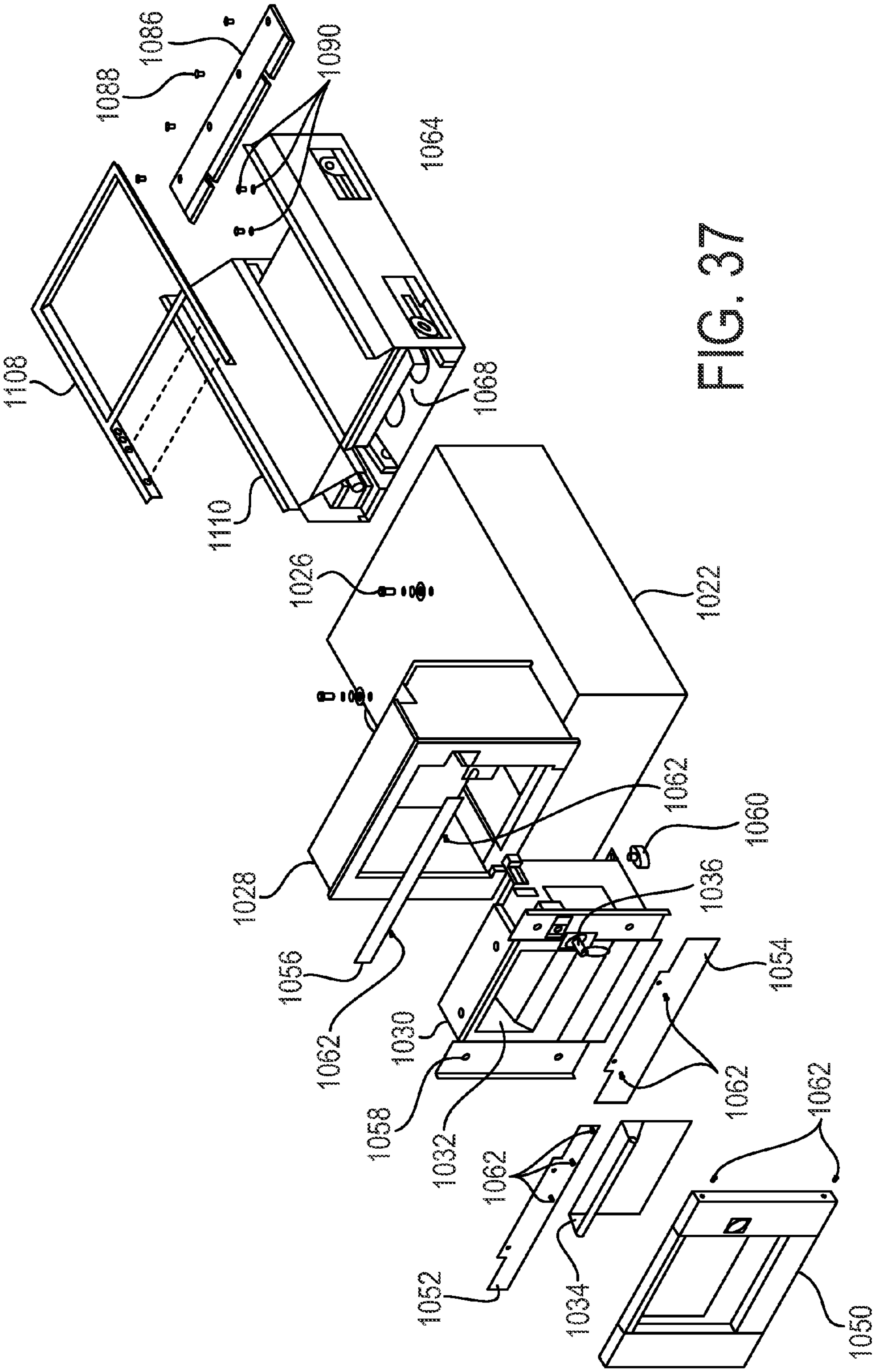
FIG. 37 is an exploded isometric view showing components of the safe.

As shown in FIG. 37, the depository head enclosure 1028 accepts the depository head 1030 therein. In the operative condition of the safe, the depository head and enclosure have their appearance enhanced in the exemplary embodiment by an overlying fascia 1050 and trim pieces 1052, 1054 and 1056. The depository head 1030 is held in fixed releasable connection with the safe through fasteners 1058 including releasable fasteners 1060, later discussed in detail, that are only accessible to be released from the inside of the safe. Other fasteners 1062 are operative to hold the fascia and trim pieces in position. Of course these approaches are exemplary, and in other embodiments other approaches may be used.

It should be understood that in the exemplary embodiment, the automated banking machine may be configured for mounting in a through-the-wall type configuration. This is shown, for example, by the wall 1078 schematically represented in FIG. 46. It should be understood that such a wall may include an interior or exterior building wall, a wall of a kiosk or other enclosure, and other suitable structural elements. Of course it should be understood that exemplary embodiments are not necessarily limited to a through-the-wall type mounting arrangement.

In the exemplary embodiment, the safe in the operative position houses a conveyor assembly 1064. Conveyor assembly 1064 in the exemplary embodiment includes a conveyor housing 1066. The conveyor housing 1066 supports a belt type conveyor 1068 therein. Conveyor 1068 includes an upper conveyor belt flight 1070 that supports deposited items thereon in a manner later discussed. The belt of conveyor 1068 is supported on rollers (not separately shown) that are journaled in bearings 1072. At least one roller that supports the belt of conveyor 1068 is selectively driven by a motor 1074. The motor 1074 is in operative connection with a controller 1076. The controller operates to selectively operate the motor 1074 so as to move the conveyor belt with deposited items thereon in a manner later discussed in detail. It should be understood, however, that although in the exemplary embodiment a belt type conveyor is used, other embodiments may include other types of conveyors. These may include, for example, roller conveyors, ball type conveyors, track type conveyors, or any suitable conveyors for moving deposited items in connection therewith.

In the exemplary embodiment, the conveyor assembly 1064 is configured to be removable from the safe. This is facilitated in the exemplary embodiment by the conveyor assembly 1064 including rollers 1080 mounted thereto. Rollers 1080 in the exemplary embodiment extend through apertures 1082 in the lower plate of the conveyor housing. When positioned in the chest, the rollers 1080 are supported on the upper surface of a lower wall 1084 of the safe.

In an exemplary embodiment, a door jamb 1086 is releasably fastened to the lower wall of the safe 1084 through removable fasteners 1088. In the operative position, the door jamb is positioned inwardly of the safe door when the safe door is in the closed position. The conveyor housing 1062 is releasably fastened to the door jamb 1086 through fasteners 1090. The fastening of the conveyor housing to the door jamb, which in turn is fastened to the bottom wall of the safe, is operative to effectively hold the conveyor housing in the operative position.

When it is desired to remove the conveyor from the safe, such as for servicing, the service technician is enabled to readily do so in the exemplary embodiment. This is accomplished by opening the safe door such that the fasteners 1088 that operatively hold the door jamb 1086 can be removed. The fasteners 1090 holding the conveyor housing to the door jamb are also removed. When the fasteners are removed, the door jamb may be disengaged from the conveyor housing and the lower wall of the safe. Thereafter, an electrical connector 1092 (See FIG. 45) may be disconnected from the conveyor housing, and the conveyor housing moved outward through the safe door opening. In exemplary methods, a servicer may include wood sheeting or other material outside the safe door so as to support the conveyor assembly thereon at the same level as the lower wall of the safe. This will support the rollers 1080 at the same level as the lower wall, to facilitate removal and reinsertion of the conveyor and housing assembly.

With the conveyor assembly moved outward through the safe door opening, portions thereof are accessible for servicing. This may include, for example, servicing the motor, conveyor belt, or other components of the conveyor assembly that become accessible upon extension through the safe door opening or removal from the interior of the safe. Removal of the conveyor may also facilitate retrieving deposit items that have become jammed or lodged in a position where they are stuck in the conveyor assembly and cannot be accessed without removal thereof. Also, as further discussed, removal of the conveyor assembly from the safe enables accessing fasteners that hold the depository head in a secured position in engagement with the safe. Of course other service activities relating to adjusting, repairing or replacing items included in the conveyor assembly may be accomplished by extending the conveyor out of the safe or completely removing the conveyor assembly therefrom.

When the activities related to repair of the conveyor assembly or adjustment or access of components thereof is completed, a service technician may return the conveyor assembly into the safe. This is done by sliding the conveyor assembly supported on the rollers 1080 inward into the safe so that the rollers are engaged with the lower wall. The conveyor assembly is then moved inward until the conveyor is in the operative position. The jamb 1086 is then resecured to the lower wall of the safe by placing the jamb back in the safe and attaching fasteners 1088. Fasteners 1090 are then resecured to place the conveyor assembly in fixed relation relative to the jamb. When secured in position, the electrical connector 1092 is reconnected, the safe door may be closed, and the safe placed back in service. Of course this approach is exemplary, and in other embodiments other approaches may be used.

Figure 46:
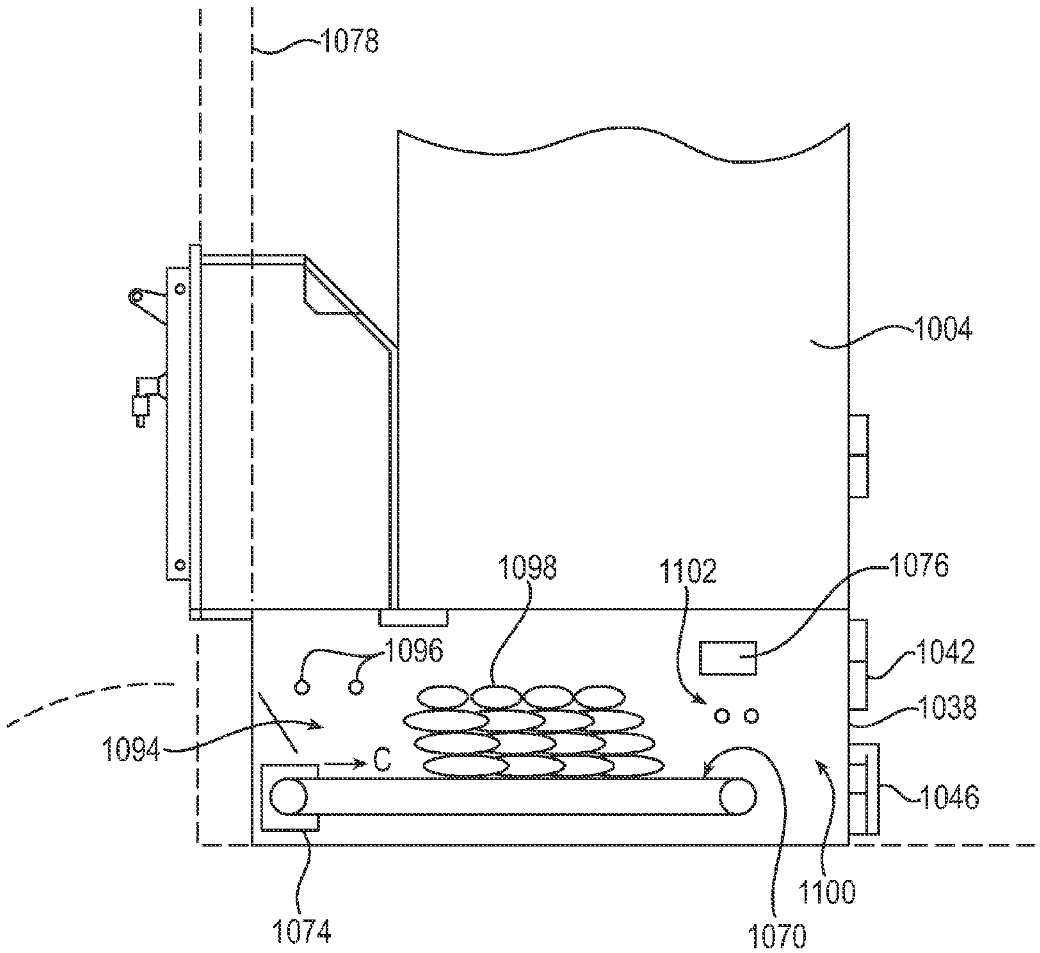
FIG. 46 is a partially transparent side view showing the safe with deposited items therein.

As represented in FIG. 46, in the exemplary embodiment, deposit items that have been deposited into the safe through the depository head fall onto the upper conveyor belt flight in an input area generally indicated 1094. Input area 1094 extends above the conveyor belt flight 1070 and below the depository head. In the exemplary embodiment, deposited items accumulate in the input area 1094 as deposits are made to the safe. Deposited items build up in the input area until they are sensed by sensors 1096. Sensors 1096 may include photo sensors or other sensors of a suitable type to detect the vertical buildup of deposited items in the input area. These deposited items may include in exemplary embodiments deposit bags, deposit envelopes, stacks of sheets or other items, individual sheets, or other suitable items to be accepted by the depository. Deposited items are represented by items 1098 in FIG. 46. The depository and/or deposit items of some example embodiments may include features described in U.S. patent application Ser. No. 12/928,711 filed Dec. 17, 2010 and/or Ser. No. 12/151,731 filed May 8, 2008 the disclosures of each of which are incorporated herein in their entirety.

When the deposited items accumulate in the input area 1094 to the point where an accumulation is sensed through operation the sensors 1096, the controller 1076 which is in operative connection with the sensors, operates to cause the motor 1074 to move the conveyor. In the exemplary embodiment, when the deposited items build up to the point where they are sensed by the sensors, the controller operates to move the conveyor a distance sufficient to move the deposited items away from the input area, and to provide space in the input area for additional deposited items to accumulate. This is done by the conveyor moving in the direction of Arrow C in FIG. 46. As represented in FIG. 46, with accumulated deposited items moved from the input area, additional deposited items can accumulate therein. This process is repeated in the exemplary embodiment until deposited items again build up in the input area to the level where they are sensed by the sensors 1096, and the controller again causes movement of the conveyor so as to move the accumulated deposit items away from the input area.

It should be understood that in the exemplary embodiment, a plurality of sensors are used for determining the height of accumulated deposited items. This is done in the exemplary embodiment to reduce the risk that one or more deposited items extending in a vertical orientation does not falsely indicate a large accumulation of such items in the input area. Thus all of the plurality of sensors have to indicate that the accumulated level of deposits is at a particular level before the controller operates to move the conveyor. Of course this approach is exemplary, and in other embodiments other approaches may be used.

In the exemplary embodiment, accumulated deposit items are moved on the conveyor toward an output area generally indicated 1100. In the exemplary embodiment, the output area is positioned on an opposed end of the conveyor from the input area, and adjacent to the safe door. When deposited items reach the output area, the deposited items are sensed through operation of sensors schematically indicated 1102. Sensors 1102 are in operative connection with the controller 1076. In the exemplary embodiment, sensors 1102 may be photo sensors or other sensors for detecting the presence of deposited items adjacent the output area.

In the exemplary embodiment, when accumulated deposited items are sensed as having reached the output area, the at least one controller operates to cause the conveyor to cease moving deposited items in response to accumulated items in the input area 1094 being detected by the sensors 1096. This avoids the conveyor operating to attempt to move deposited items rearward when the conveyor is full. This avoids causing possible damage to the deposited items. Further, in the exemplary embodiment, when the accumulated deposited items are sensed in the output area, the controller 1096 is operative to cause at least one message to be sent from the automated banking machine to at least one remote computer. This may include, for example, a status message or other message indicating that the safe is full. In response to receiving such a message, the bank or entity responsible for operating the automated banking machine can dispatch a servicer or other person to the machine for purposes of emptying deposited items from the safe. Of course these approaches are exemplary, and in other embodiments other approaches may be used.

In the exemplary embodiment, a servicer who wishes to remove deposited items from the safe may do so by opening the safe lock 1044 and moving the lever 1046 so as to enable the safe door 1038 to be opened. This exposes the output area 1100 and makes it manually accessible, as represented in the rear view of the safe shown in FIG. 45. It should be understood that in FIG. 45 the safe has been shown without the door, to facilitate understanding.

The exemplary embodiment of the conveyor assembly includes thereon at least one manually actuatable input device. In the exemplary embodiment, a first manually actuated input device 1104 comprises a light switch. The light switch is operative to turn at least one light inside the safe on and off. The light enables a servicer to see the deposited items in the safe. Preferably, the lighting included in the safe includes suitable lighting to illuminate the area entirely along conveyor belt 1070 so that the servicer can see generally all of the deposited items within the safe.

Another manually actuatable input device that is accessible inside the safe includes a jog button 1106. Jog button 1106 enables the servicer to operate the motor 1074 which drives the conveyor intermittently, a the servicer presses the jog button. The jog button enables the servicer to move the deposited items supported on the conveyor rearwardly toward the output area. Thus in the exemplary embodiment the servicer may remove those deposited items in the immediate vicinity of the output area, and then press the jog button to continue moving deposited items supported on the conveyor belt flight toward the output area. The servicer may repeat this process until all of the deposited items have been moved on the conveyor belt flight to the output area and are removed from the safe by the servicer.

Once all the deposited items have been removed, the servicer may turn off the light using switch 1104. The servicer may thereafter close the safe door, move the lever 1046 to extend the bolt, and relock the safe lock 1044. Of course this method is exemplary, and in other embodiments other approaches may be used.

Figure 40:
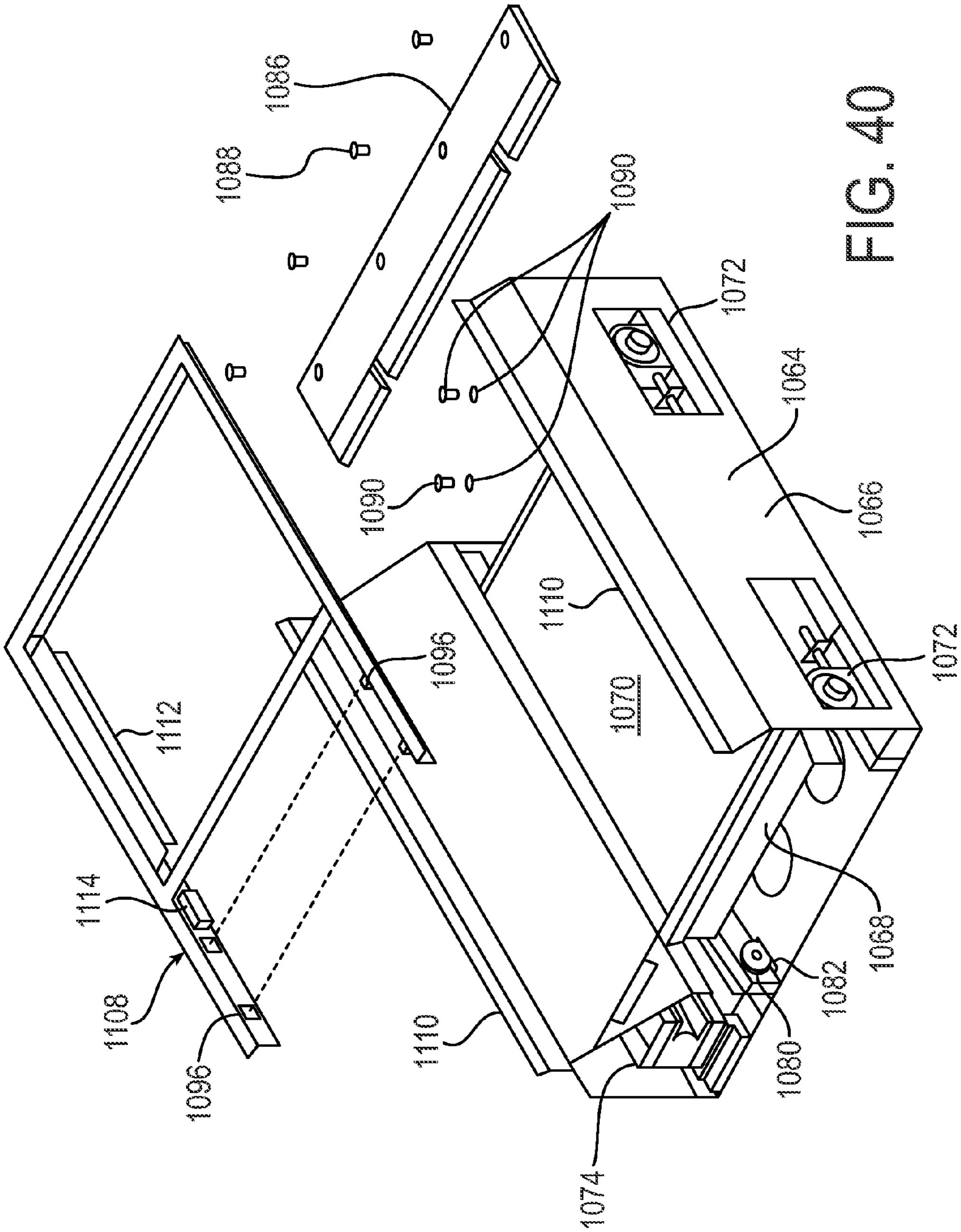
FIG. 40 is an exploded view of the conveyor assembly included in the safe.
Figure 41:
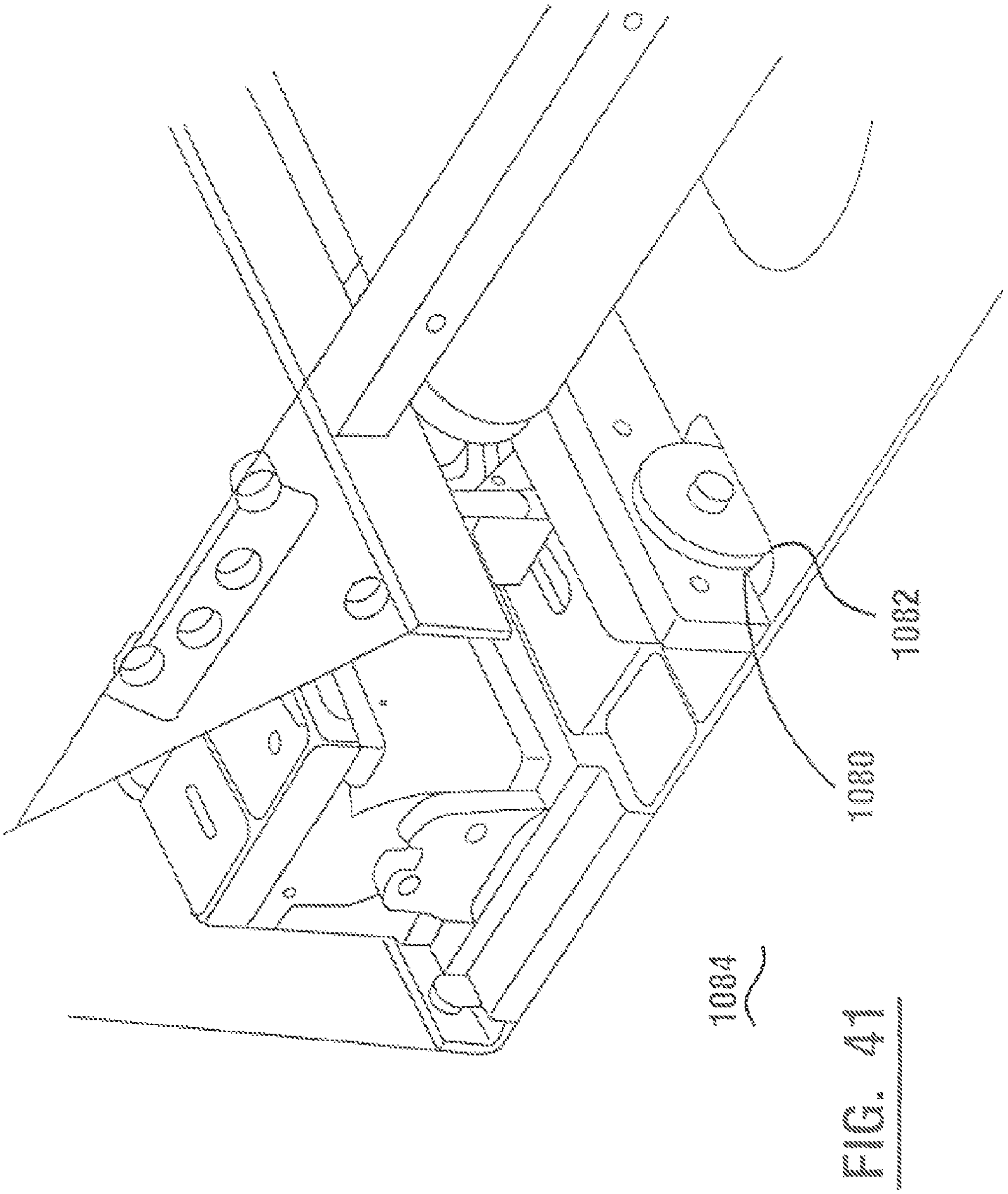
FIG. 41 is an enlarged isometric view showing the roller supports of the conveyor assembly.
Figure 42:
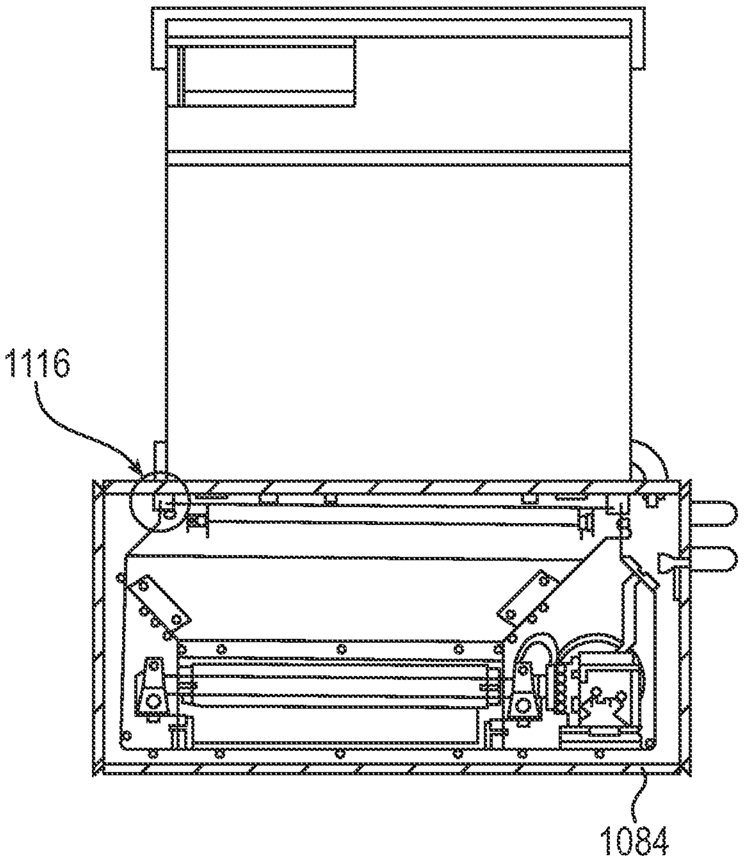
FIG. 42 is a sectional view of the safe showing internal components thereof.
Figure 43:
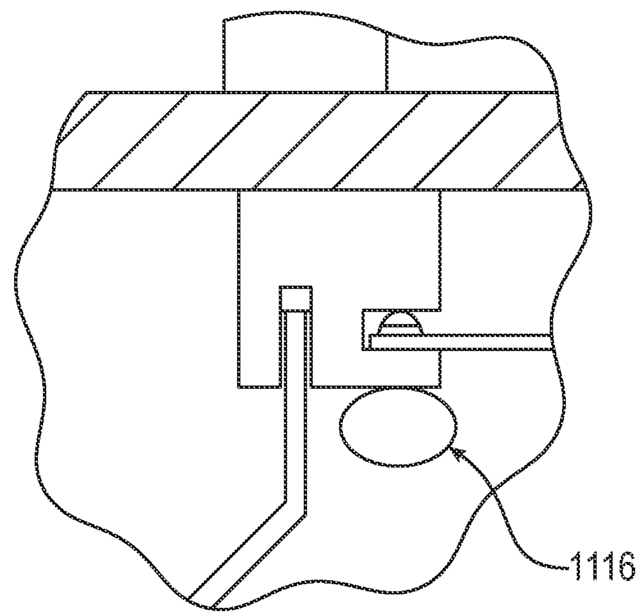
FIG. 43 is an enlarged view showing the frame locking releasable fastener operative to hold a sensor support frame.

In the exemplary embodiment, a frame 1108 is operative to support the sensors 1096 that are used to detect the accumulation of deposited items in the input area. As best shown in FIG. 40, frame 1108 is a generally rectangular frame that in the operative position extends generally horizontally. When in the operative position, the frame is mounted in supporting connection with a pair of opposed tracks 1110. In the exemplary embodiment, the opposed tracks are mounted in operatively supporting connection with the conveyor housing 1062. The frame 1108 can be moved horizontally inward and outward in engagement with the tracks. Further in the exemplary embodiment, the frame is in supporting connection with one or more lights 1112. Lights 1112 may be one or more fluorescent, LED, or other suitable lights for illuminating the area inside the safe. Frame 1108 further includes one or more quick-disconnect electrical couplings. Coupling 1114 enables operative connection between the sensors, lights, or other items supported on the frame and the controller.

In the exemplary embodiment, the frame is enabled to be releasably locked in connection with the tracks 1110. This is accomplished through the use of a frame locking releasable fastener 1116. In the exemplary embodiment, the frame locking releasable fastener includes a manually releasable fastener such as a thumb screw. The frame includes one or more apertures through which the thumb screw may be extended. An aperture in the frame is positioned so as to have the thumb screw extend therethrough when the frame is in the proper operative position. In the exemplary embodiment, the thumb screw is positioned where it can be manually accessed by a servicer outside the safe when the safe door is open.

Thus in situations where there is a need to repair or replace components supported on the frame, a servicer may unlock the safe door to gain access to the interior of the safe. With the safe door in the open position, the servicer may access the frame locking releasable fastener 1116 and loosen it or remove it to the extent that the frame can be moved. The frame may then be moved horizontally outward through the safe door opening. Once the frame has been moved outward a sufficient distance, the electrical connector may be disconnected. This enables the frame to be moved horizontally outward through the safe door opening. Once the frame has been removed, components on the frame can be adjusted, replaced, or otherwise serviced as appropriate. Further, movement of the frame may also be appropriate where deposit items may have been caught on the frame, and moving the frame only partially may be sufficient to release those items so that they can be retrieved from the safe.

When servicing is done on components connected to the frame, the frame may then be reengaged with the tracks. The frame is then moved horizontally inward in operatively supportive connection with the tracks until the aperture in the frame is aligned with the fastener. The fastener is then tightened so as to extend through the aperture or otherwise lock the frame in position. As a result, the frame is then held in the operative position. The servicer may then close the safe door, extend the bolt, and lock the safe. Of course it should be understood that these approaches are exemplary, and in other embodiments other approaches may be used.

The depository head of the exemplary embodiment as shown in FIGS. 47-53 is of the rotating drawer type. The drawer opening can be extended outward when the lock 1036 is unlocked. This is done by pulling on the door on the drawer of the depository head 1034. In response to pulling on the door, the drawer 1118 of the depository may be pulled outward so as to enable deposit items to be placed within an interior area of the drawer. Thereafter, moving the drawer inward causes the deposited items to move from the drawer and downward into the input area on the conveyor below the top wall of the safe. The exemplary embodiment of the depository head and safe structure may include features like those described in U.S. patent application Ser. No. 12/583,333 filed Aug. 17, 2009, the disclosure of which is incorporated herein in its entirety. Of course these features are exemplary, and in other embodiments other features may be used.

Figure 47:
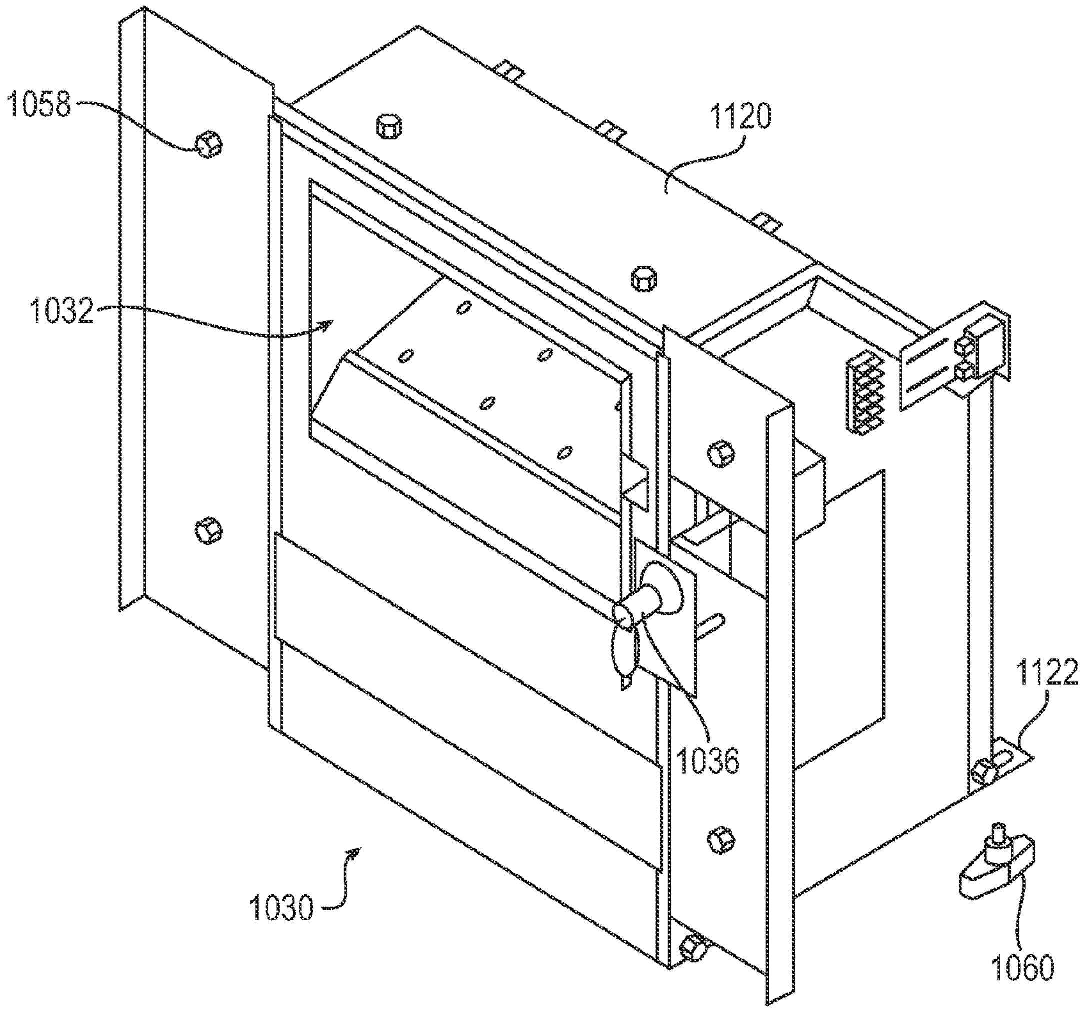
FIG. 47 is an isometric view showing an exemplary depository head used with the safe.
Figure 48:
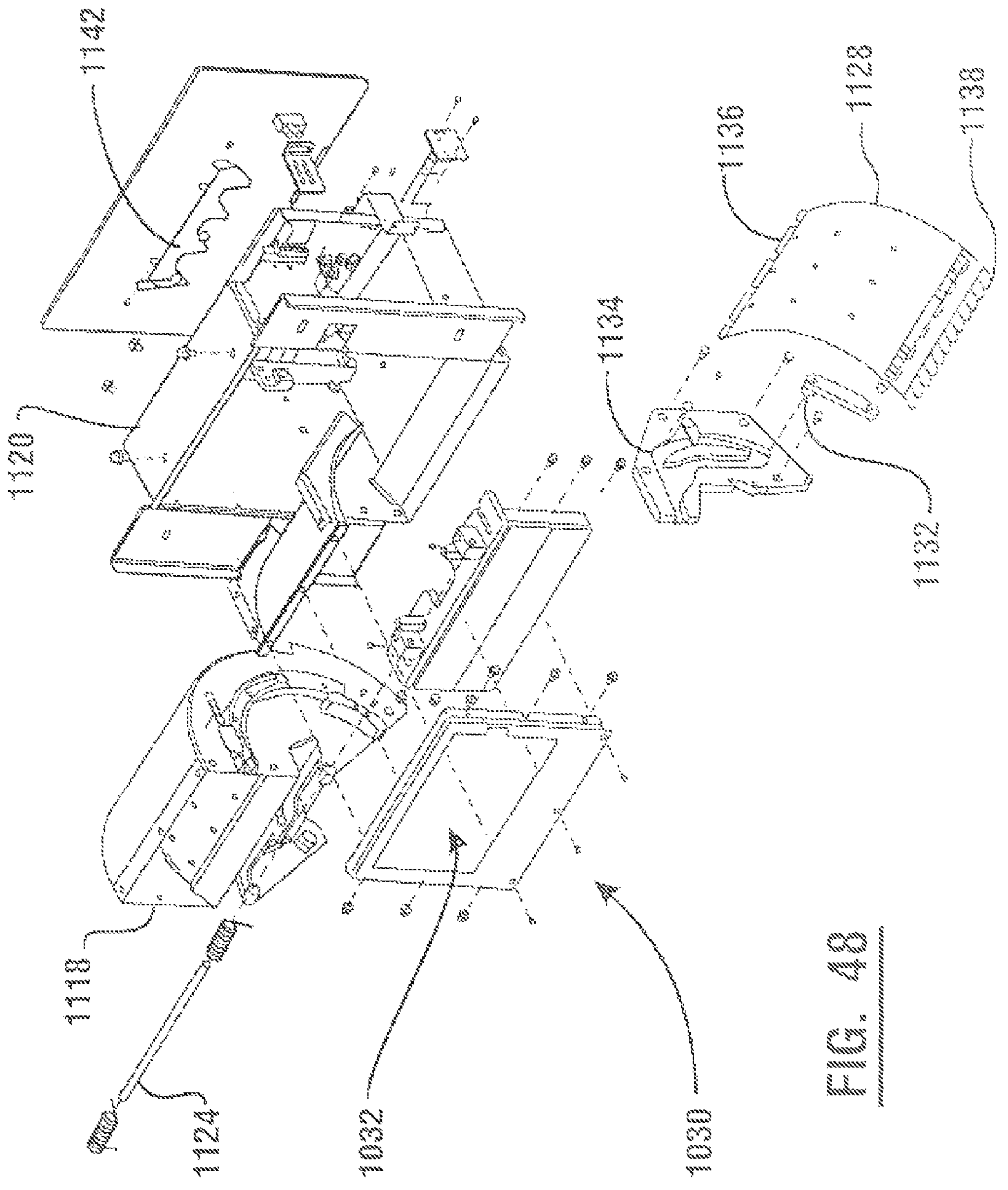
FIG. 48 is an isometric exploded view of the depository head.
Figure 49:
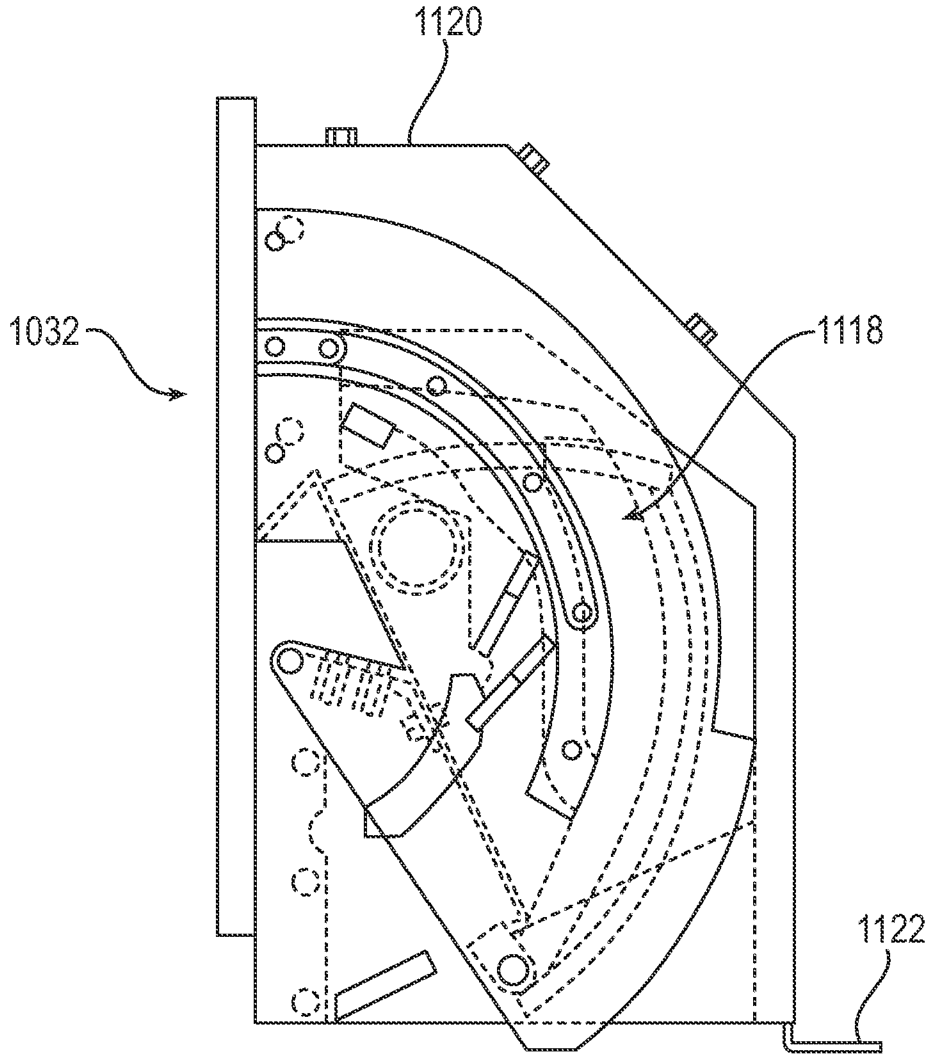
FIG. 49 is a side view of the depository head.

The exemplary depository head includes a head housing 1120. The head housing 1120 is sized to be installed in the depository head enclosure 1028 of the safe. In the exemplary embodiment, fasteners 1058 and 1060 are used to engage and hold the head housing 1120 to the safe. As best shown in FIGS. 47 and 49, the exemplary embodiment of the depository head housing includes a pair of disposed head holder brackets 1122. Head holder brackets 1122 include apertures therein that are sized to accept fasteners 1060 therethrough.

In the exemplary embodiment, when the depository head is installed in the head enclosure of the safe, the head holder brackets 1122 extend below the inside surface of the top wall of the safe. The releasable head holder fasteners extend upwards through the apertures in the head holder brackets 1122 and engage the top wall of the safe. Further as can be appreciated, in the operative condition the area of the head holder fasteners 1060 is covered by the chest of the automated banking machine. This makes it difficult for a criminal to remove the depository head from the head enclosure without gaining access to the interior area of the safe. Thus a mode of attack where a criminal attempts to remove the depository head from the head enclosure of the safe may be resisted.

In the exemplary embodiment, when a servicer needs to service the depository head in a way that requires removal thereof, a servicer may open the safe door and gain access to the interior area of the safe in the manner previously described. Thereafter, in the exemplary embodiment, the servicer may remove the removable conveyor from the safe in the manner previously discussed. The servicer may also disconnect electrical connectors in the safe that are connected to sensors, alarms, and the like. With the conveyor removed, the servicer may thereafter remove the head holder fasteners 1060 so as to release the head holder brackets from engagement with the inside surface of the top wall of the chest. After removing fasteners 1058 which hold the head housing 1120 to the head enclosure 1028, the head housing may thereafter be rotated to move the head holder brackets out of engagement with the top wall of the safe. The head may then be moved outward and upward until it is removed from the head enclosure 1028. With the depository head removed, servicing may be conducted on the head to repair or adjust parts as appropriate.

Once components of the depository head are repaired, replaced or adjusted as appropriate, the safe may be placed back in service by the servicer reinstalling the depository head within the head enclosure. This will include moving the head downward and inward so that the head holder brackets 1122 again extend in a position below the lower surface of the top wall of the safe. The head is rotated to the position so the head holder brackets abut the inside surface of the top wall of the safe. The head holder fasteners 1060 can be then reinserted, as can the fasteners 1058. Electrical connectors or other appropriate connectors to the depository head can be reconnected. The fasteners outside the safe that hold the head in place are reinstalled. The conveyor assembly is then reinstalled in the manner previously discussed. After the safe door is closed and locked, the safe may then be placed back in the operative condition. Of course these approaches are exemplary, and in other embodiments other approaches may be used.

Figure 38:
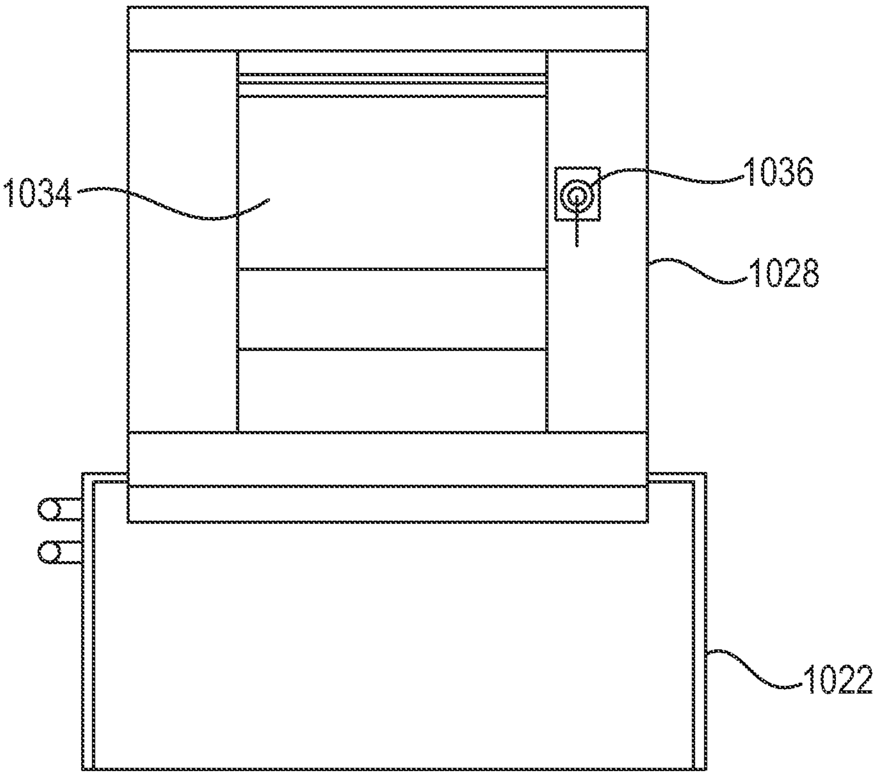
FIG. 38 is a front plan view of the exemplary safe.

As shown in FIG. 38, depository head drawer 1118 is rotatable about a support shaft 1124. Drawer 1118 includes an interior area 1126 (See FIG. 51) that becomes accessible from outside the depository head when the drawer has been moved sufficiently outward. When the drawer has been fully extended, the interior area is sufficiently accessible so that deposited items such as deposit bags, large stacks of sheets, or other items can be placed therein for deposit. However, in another mode of operation of the depository as later discussed, when the depository drawer is moved outward a limited amount, certain small sized items such as envelopes, individual sheets, or other smaller items, may also be placed within the interior area.

The exemplary depository drawer has movably mounted thereon a floor plate 1128. The floor plate 1128 is rotatably mounted on a shaft about an axis 1130. Floor plate 1128 is moved relative to the drawer by a cam arm 1132. Cam arm 1132 includes a cam follower thereon that engages a floor plate cam 1134. The cam follower is constrained to move in a recess in the floor plate cam 1134. Further in the exemplary embodiment, a flipper member is positioned on the floor plate cam so that the cam arm is constrained to move in only one direction relative to the floor plate cam. This is useful, as later discussed, as it enables the movement of the floor plate relative to the interior area to be different when the drawer is being moved outward than when the drawer is being moved inward.

In the exemplary embodiment, the floor plate includes projections 1136 thereon including at a first end thereof. The purpose of the projections is to engage with recesses in adjacent wall structures, so as to reduce the chance that items might be caught in the interior area without falling into the safe. Further, such projections on the end of the floor plate may be useful to prevent criminals from trying to apply adhesives such as double-stick tape to interior surfaces of the interior area so that deposited items might become stuck thereon and later retrieved by criminals. The exemplary floor plate further includes projections 1138 on an opposed interior end thereof. The purposes of projections 1138 in the exemplary embodiment is to prevent efforts toward "fishing" of the depository. The projections 1138 may operate to catch lines, tools, or other mechanisms that criminals may attempt to insert into the safe in order to remove materials therefrom. Of course these structures are exemplary, and in other embodiments other approaches may be used.

Figure 50:
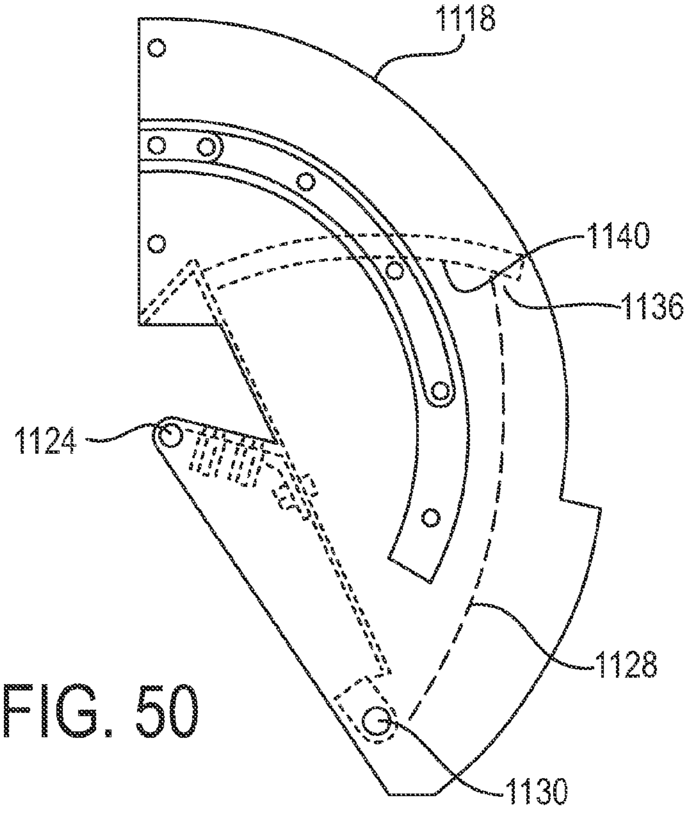
FIG. 50 is a side view of the drawer of the depository head in an inward position.
Figure 51:
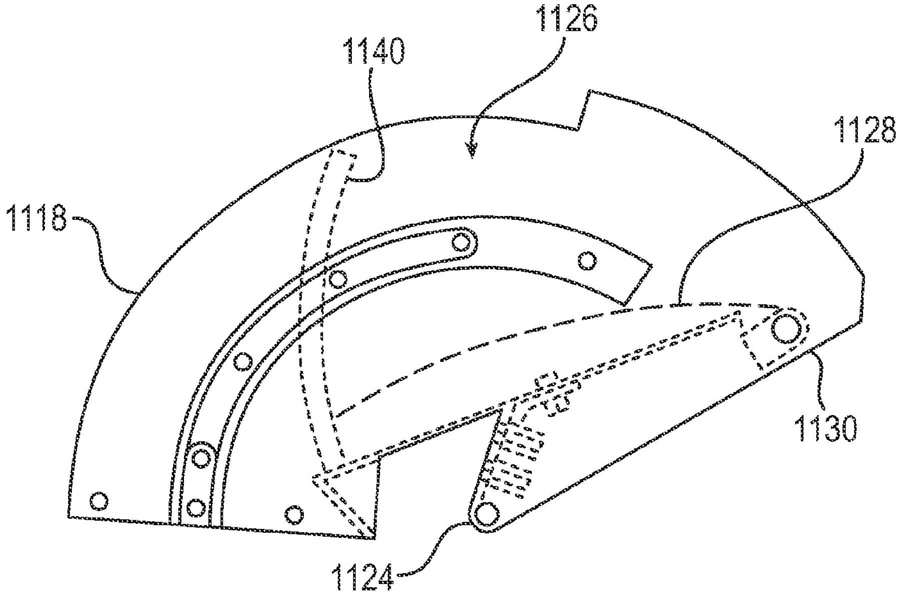
FIG. 51 is a side view of the drawer similar to FIG. 50 but with the drawer in an outwardly extended position.

The operation of the depository drawer 1118 is schematically shown in FIGS. 50 and 51. In the retracted position of the drawer, the floor plate 1128 is moved radially outward relative to the drawer. In this position, any items that had been deposited in the interior area of the drawer are moved to the near-vertical position in supporting connection with the floor plate. As a result, such items drop from the depository head into the input area of the safe. As the drawer 1118 is moved outward, it is rotated generally counterclockwise in the position shown, about shaft 1124. As the drawer is rotated, the floor plate 1128 moves responsive to the floor plate cam 1134 to the position shown in FIG. 51. This causes the floor plate to move relative to an end plate 1140 that bounds the interior area 1126. The relative movement of the floor plate opens the interior area such that deposited items may be placed therein through the opening 1032. Further as previously discussed in the exemplary embodiment, the end plate 1140 includes interengaging recesses that conform with the projections 1136 on the floor plate 1128.

As can be appreciated, once a deposited item has been placed in the interior area, the drawer 1118 is moved clockwise from the position shown in FIG. 51. As the drawer is moved in the inward direction, the floor plate 1128 moves outward along end plate 1140 such that any deposit item placed in the interior area falls downward into the input area.

In the exemplary embodiment, the floor plate cam 1134 provides for the coordinated movement of the floor plate 1128 relative to the end plate to be asymmetrical when the drawer is moved outward versus inward. In the exemplary embodiment, a rake 1142 is positioned so as to be in close adjacent proximity to the floor plate 1128 during a substantial portion of the time that the depository drawer 1118 is being moved outward. In the exemplary embodiment, the rake 1142 is in pivoting supporting connection with the housing of the depository head. Further in an exemplary embodiment, the rake 1142 is pivotally mounted so that the rake may move in a counterclockwise direction as shown in FIGS. 52 and 53, but is prevented from moving in a clockwise direction.

Figure 52:
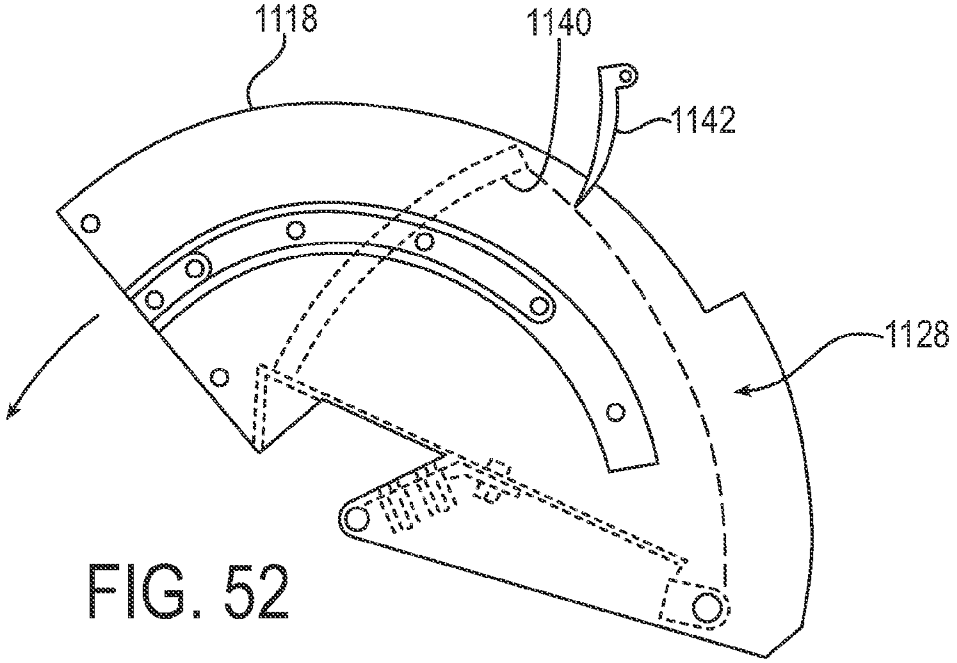
FIG. 52 is a side view of the drawer shown in a condition with the drawer moving outward.

In the exemplary embodiment as shown in FIG. 52, as the drawer is being moved outward, the floor plate is caused to be positioned by operation of the floor plate cam, in close proximate relation to the rake as the drawer moves outward. This positioning causes the rake to engage and dislodge items adhered to the floor plate. Thus, for example, if a criminal has attempted to use an adhesive material to hold deposited items in engagement with the floor plate, the rake will operate to engage and dislodge such items from the floor plate. For example in some exemplary embodiments, the projections, tines, or other structures of the rake may engage in recesses between projections that extend along the floor plate. This interengaging action may be sufficient to release any adhered items. In still other embodiments, the rake may include projections, tines or other structures (all of which are referred to herein as projections) that actually engage and scrape along the floor plate. Various approaches may be taken to utilize the principles of the rake to disengage items adhered to the floor plate.

Figure 53:
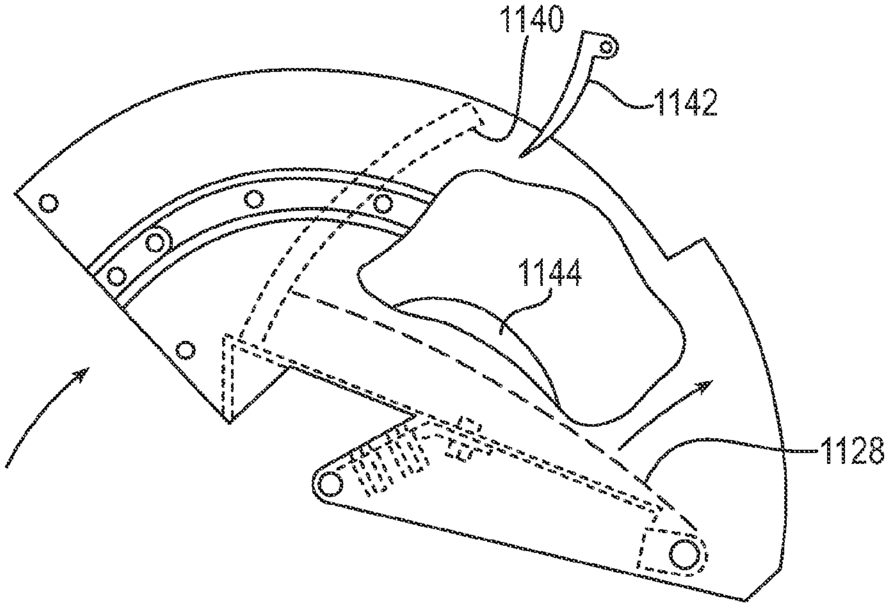
FIG. 53 is a side view of the drawer shown in a condition with the drawer moving inward.

As represented in FIG. 53, when the depository door is being moved inward with a deposited item 1144 within the interior area, the floor plate 1128 is substantially disposed further from the rake 1142 than when the drawer is moving outward. This enables the deposited item to move without engaging the rake. However, in the event that a deposited item would engage the rake, the ability of the rake to pivot in a counterclockwise direction as shown would enable the deposited item to pass. As the depository drawer 1118 moves further inward, the floor plate 1128 is thus moved outward relative to the end plate, after the deposited item has moved past the rake due to operation of the irregular floor plate cam. As a result, the exemplary embodiment enables the rake to reduce the risk that criminals may compromise the security of the depository by adhering items to interior surfaces thereof. Of course these approaches are exemplary, and in other embodiments other approaches and structures may be used to accomplish similar results.

Figure 54:
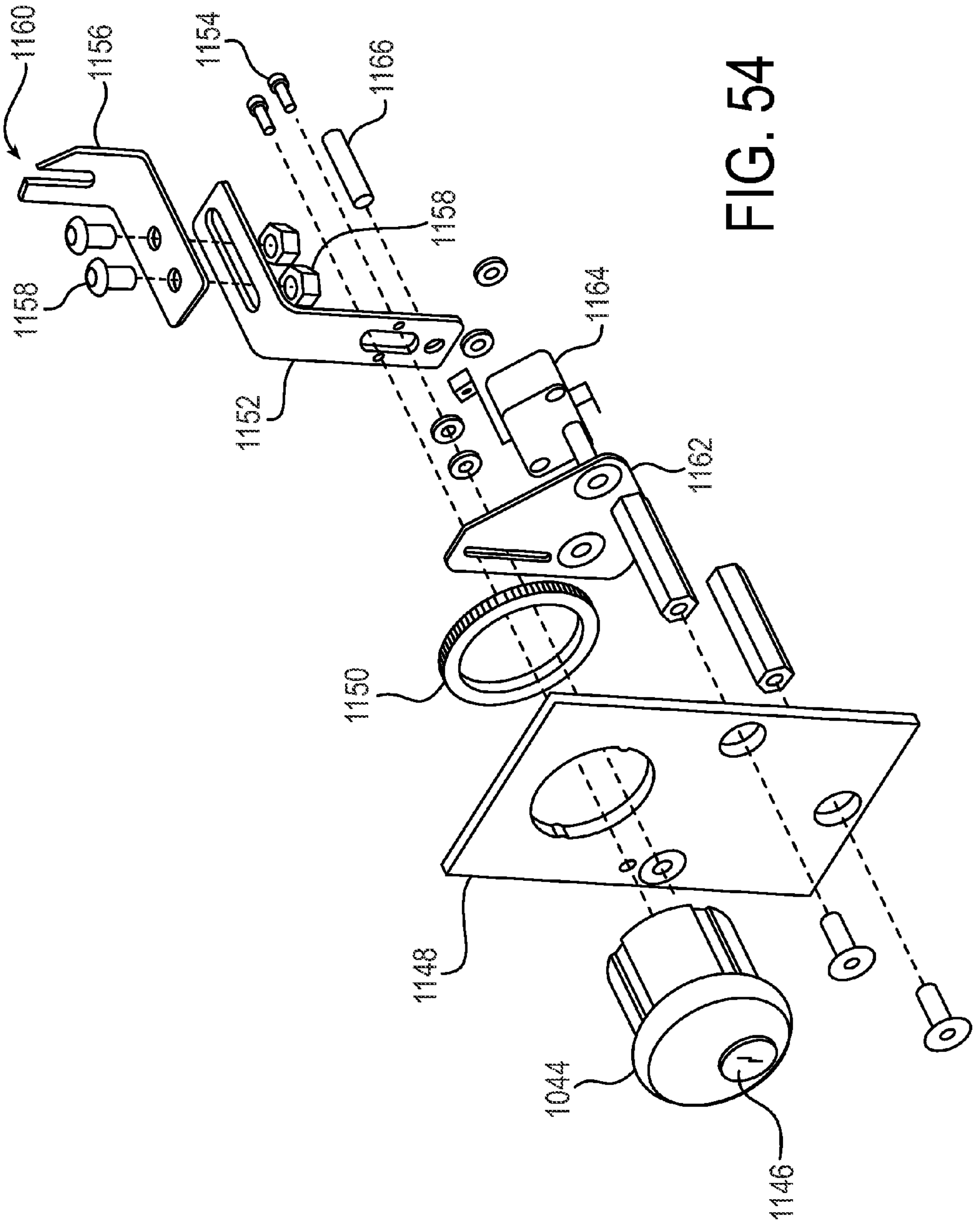
FIG. 54 is an isometric view of an exemplary lock used in connection with the depository head.

FIG. 54 shows an exemplary lock structure that may be used in connection with exemplary embodiments of the depository head. The exemplary structure includes a lock 1044 which includes a lock cylinder 1146. Lock cylinder 1146 is enabled to be rotated by an appropriate key. It should be understood that although the exemplary lock is discussed in connection with being actuated by a physical key, other locks used with other embodiments may include electronic keys, radio frequency keys, or other types of access mechanisms that are suitable for opening a lock.

In the exemplary embodiment, the lock is mounted to a lock plate 1148 that is in supporting connection with the depository head. A retainer wing 1150 is operative to hold the lock in engagement with the lock plate.

The lock cylinder 1146 is in operative connection with a rotating bracket 1152. The rotating bracket 1152 is connected to the lock cylinder through suitable fasteners 1154. The rotating bracket is connected to a fork member 1156 through fasteners 1158. The fork member includes a recess 1160. Recess 1160 is sized for accepting a pin therein for purposes that are later discussed. The exemplary embodiment further includes a switch holding bracket 1162. Bracket 1162 operates to support a switch 1164. Switch 1164 is operative to sense movement of an indicating pin 1166. Indicating pin 1166 is operatively attached to rotating bracket 1152 and enables switch 1164 to determine the condition of the lock. Thus control circuitry may operate in the manner of the incorporated disclosure to detect when the lock has been moved to a position enabling opening of the depository drawer. Switch 1164 may also be operative to detect tampering with the lock, or other attempts to compromise the depository. Of course these approaches are exemplary, and in other embodiments other approaches may be used.

Figure 55:
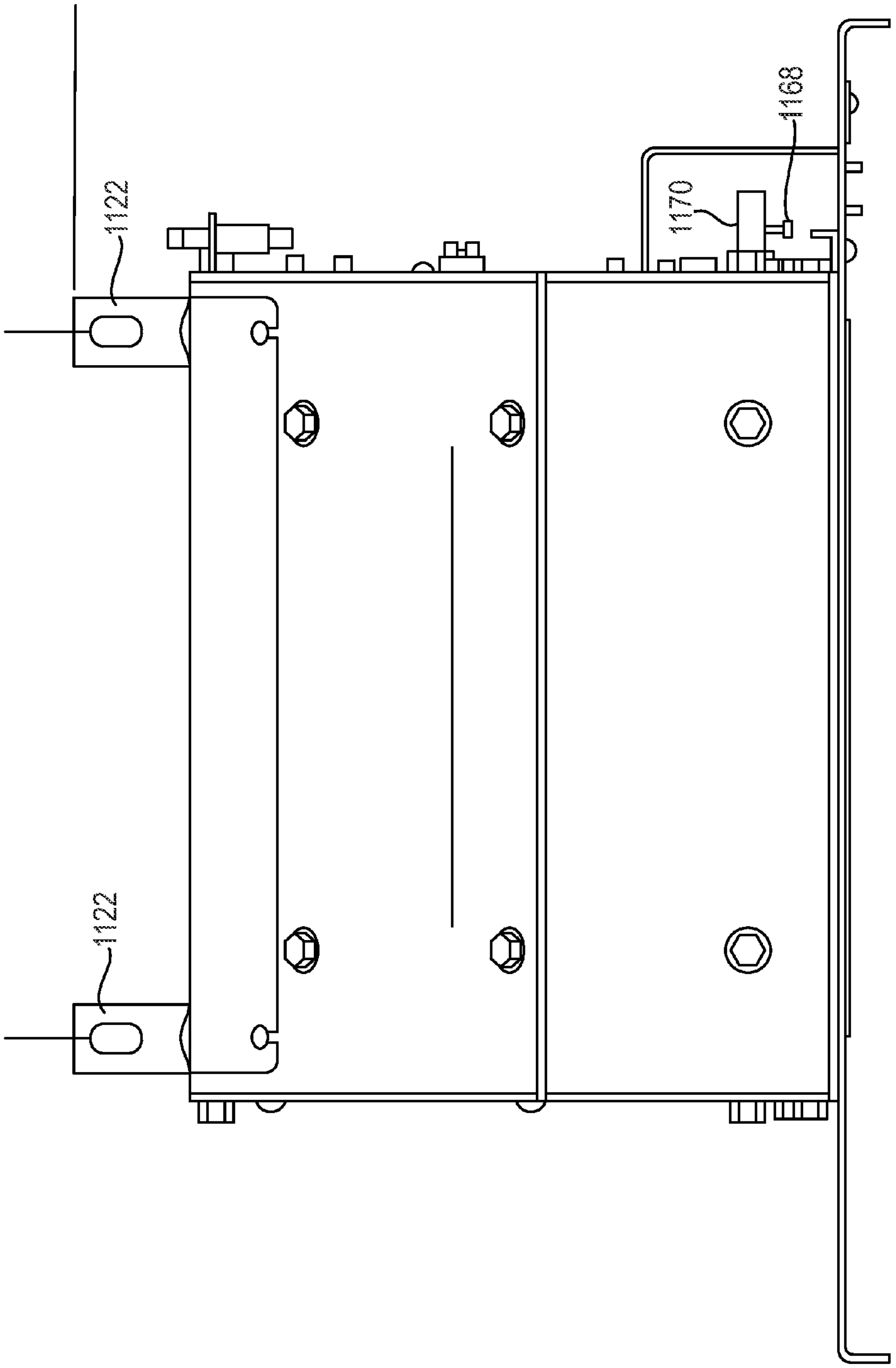
FIG. 55 is a top plan view showing the exemplary depository head.

In the exemplary embodiment, recess 1160 is sized to accept a pin 1168. As best shown in FIG. 55, pin 1168 is operatively attached to a draw bar 1170. Draw bar 1170 is biased by a spring (not separately shown) in an inward direction. In the exemplary embodiment, when the lock is operated to open the depository drawer, rotation of the lock cylinder to cause the pin 1168 to be moved outward in engagement with the recess 1160. Such outward movement of the pin also outwardly moves the draw bar 1170 against the biasing force. This movement of the drawer bar enables the drawer to be moved manually outward so that deposit items may be placed therein.

Figure 56:
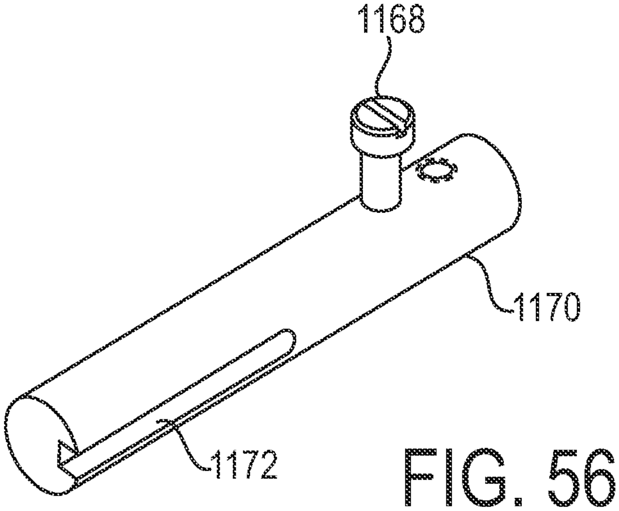
FIG. 56 is an isometric view showing a draw bar and pin associated with a locking mechanism for the drawer of the depository head.
Figure 57:
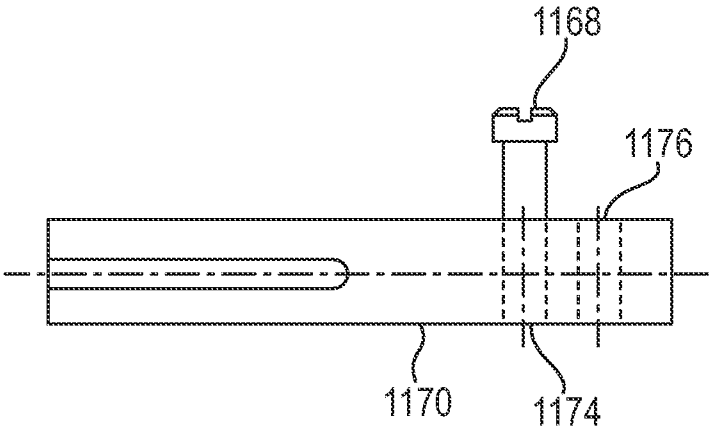
FIG. 57 is a bottom view of the draw bar shown in FIG. 56.

FIGS. 56 and 57 show the exemplary draw bar and pin in detail. The exemplary draw bar includes a slot 1172. The slot enables movement of the draw bar in the inward and outward direction while maintaining the rotational position thereof. This assures that the pin remains positioned in the recess of the fork member 1156.

Further in the exemplary embodiment, the draw bar includes two threaded apertures 1174 and 1176. The threaded apertures, in different longitudinal locations on the draw bar, enable the pin, which is threadably engaged therein, to be relatively positioned with respect to the draw bar.

In the exemplary embodiment, this ability to relatively position the pin with respect to the draw bar enables the extent that the draw bar extends inwardly when the lock is in a locked position to vary responsive to the position of the pin. In the exemplary embodiment, this enables selectively configuring the depository to operate in different selected modes of operation. In one mode of operation corresponding to the pin 1168 being positioned in aperture 1174, persons wishing to insert relatively thin deposit envelopes, individual sheets, or other small articles are enabled to do so even without unlocking the lock 1036. This may be a useful mode of operation, as it enables persons who do not have a key to make deposits into the safe. This may be useful, for example, in situations where consumers who do not have a depository key may wish to make envelope deposits into the safe. In this mode of operation, only persons who have a depository key are enabled to open the drawer of the depository head a sufficient degree to deposit a larger item such as a deposit bag or stacks of sheets In an alternative mode of operation, with the pin positioned in aperture 1176, the depository drawer will not open sufficiently to allow any form of deposits therein unless the person wishing to make the deposit uses a key to unlock the depository lock 1036. This ability to selectively control the extent to which the depository drawer can be opened by persons who do not possess a key is accomplished in the exemplary embodiment by the use of a stepped latch 1178, shown in FIG. 58. The stepped latch of the exemplary embodiment is attached in operative connection to the depository drawer 1118. The stepped latch 1178 includes an elongated recess 1180 therein. Recess 1180 is sized to accept the inward end of draw bar 1170 therein.

Figure 58:
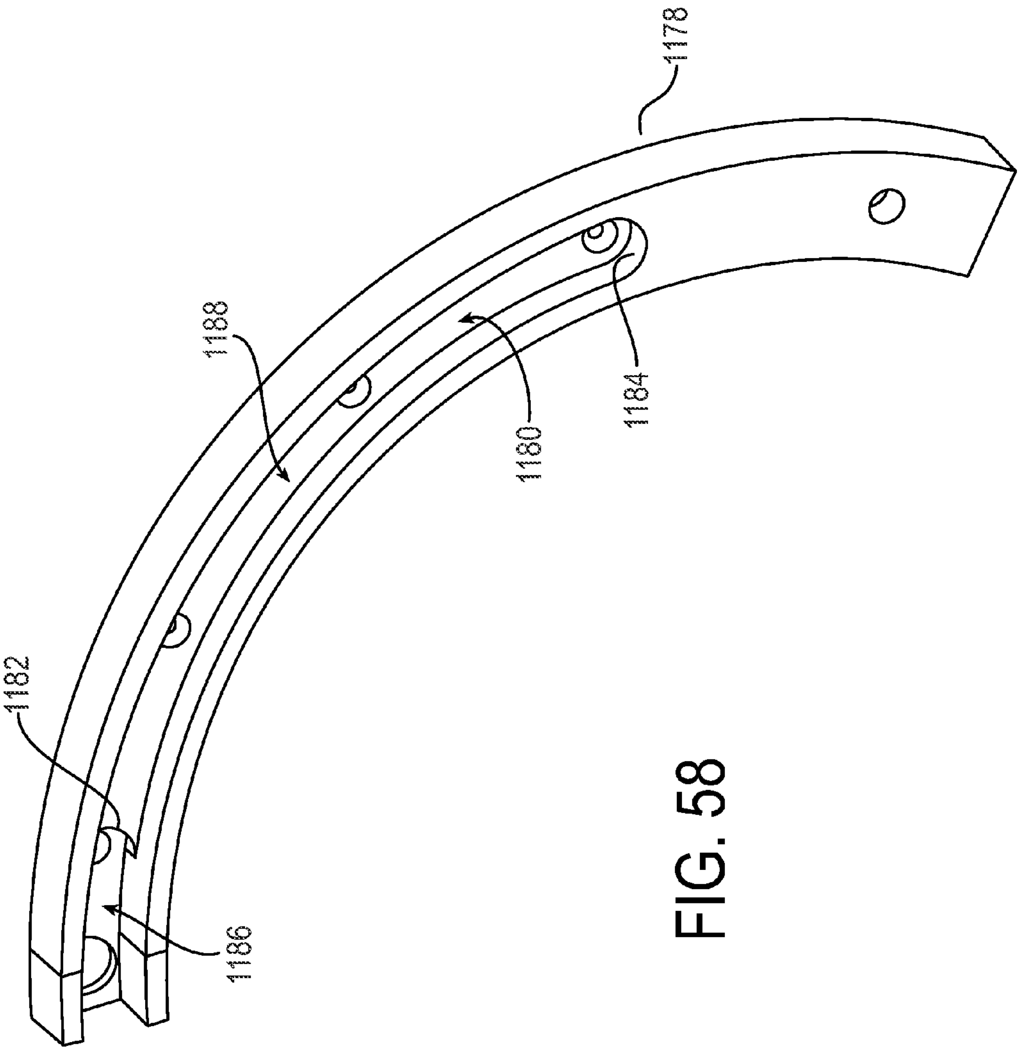
FIG. 58 is an isometric view of a stepped latch of an exemplary embodiment for controlling movement of the drawer.

In the exemplary embodiment, recess 1180 includes therein a first step 1182. As can be appreciated, the depth of the recess to the left of step 1182 as shown in FIG. 58 is deeper than the depth of the recess 1180 to the right of step 1182. Recess 1180 is also bounded by a further step 1184. Step 1184 bounds the recess and the shallower portion thereof that extends between step 1182 and step 1184.

In the exemplary embodiment, when the depository is to be operated such that only persons who have a key or otherwise have been verified as being authorized to make deposits thereto are allowed to place any form of deposits into the depository drawer, the pin 1168 is positioned in aperture 1176. In this position in the locked position of the lock, the draw bar extends inwardly in the slot in the area indicated 1186. When the draw bar extends in area 1186, the drawer cannot be substantially moved outward. It can only be moved a small distance, because of the engagement of the draw bar with step 1182. In this mode of operation, persons who are enabled to unlock the lock can withdraw the draw bar entirely from the slot, which enables the drawer to be moved outward to the maximum extent possible for the insertion of large deposit items such as deposit bags therein. Returning the drawer inward to the closed position and with the lock returned towards the locking position, the draw bar again extends so as to prevent outward movement of the drawer through engaging with step 1182.

Alternatively, when the depository is configured so that persons who do not have a key or otherwise have a means to access the depository can provide small items such as envelopes and sheets therein, the pin 1168 is positioned in aperture 1174. In this position, the draw bar does not extend as far into the slot, and is enabled to move in the area indicated 1188 of the slot even when the lock is locked. For this reason, the drawer is enabled to be moved outward with the lock in the locked condition, until the draw bar engages step 1184. In the exemplary embodiment, when the draw bar engages step 1184, and the drawer open to provide access to the interior area 1126 only to the extent that enables small items such as envelopes or individual sheets to be placed therein.

Depository users who have a key or other capability for unlocking the lock can cause the draw bar to be moved out of the slot 1180 so that the drawer can be opened fully, and larger deposit items may be placed in the interior area of the drawer.

This capability of selectively positioning the pin relative to the draw bar enables readily changing the mode of the exemplary depository, from one that can be used only by commercial banking customers who have keys or other access mechanisms, to one that can also be used by consumers for deposit envelopes or other smaller items. It should be understood, however, that the mechanism used for selectively positioning and controlling the ability to move the drawer is exemplary, and in other embodiments other mechanisms utilizing similar principles for selectively limiting movement of the drawer and/or the floor plate may be used.

Further it should be understood that although the depository has generally been discussed in connection with the use of the depository by persons who accomplish the opening of the drawer thereof using keys or similar devices, in some embodiments the depository may be configured such that inputs through the consumer interface of the automated banking machine enable opening of the depository drawer. Further in still other embodiments, inputs may be required both through the consumer interface of the automated banking machine as well as via a separate lock mechanism on the depository, to open the depository drawer. Various types of approaches and unlocking mechanisms and methodologies may be used, depending on the security requirements for the particular machine.

Figure 59:
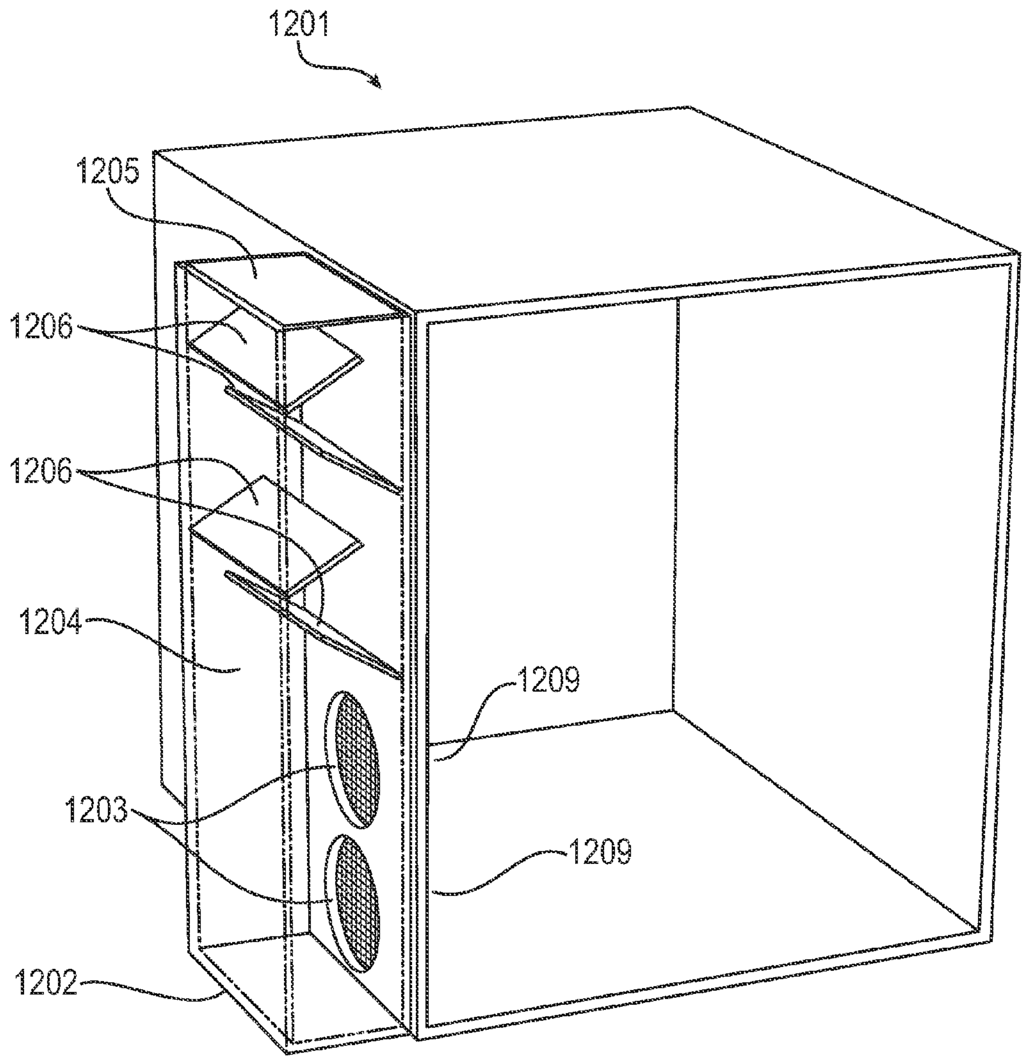
FIG. 59 is a phantom view of an example embodiment of a blast accessory fitted to a chest.
Figure 60:
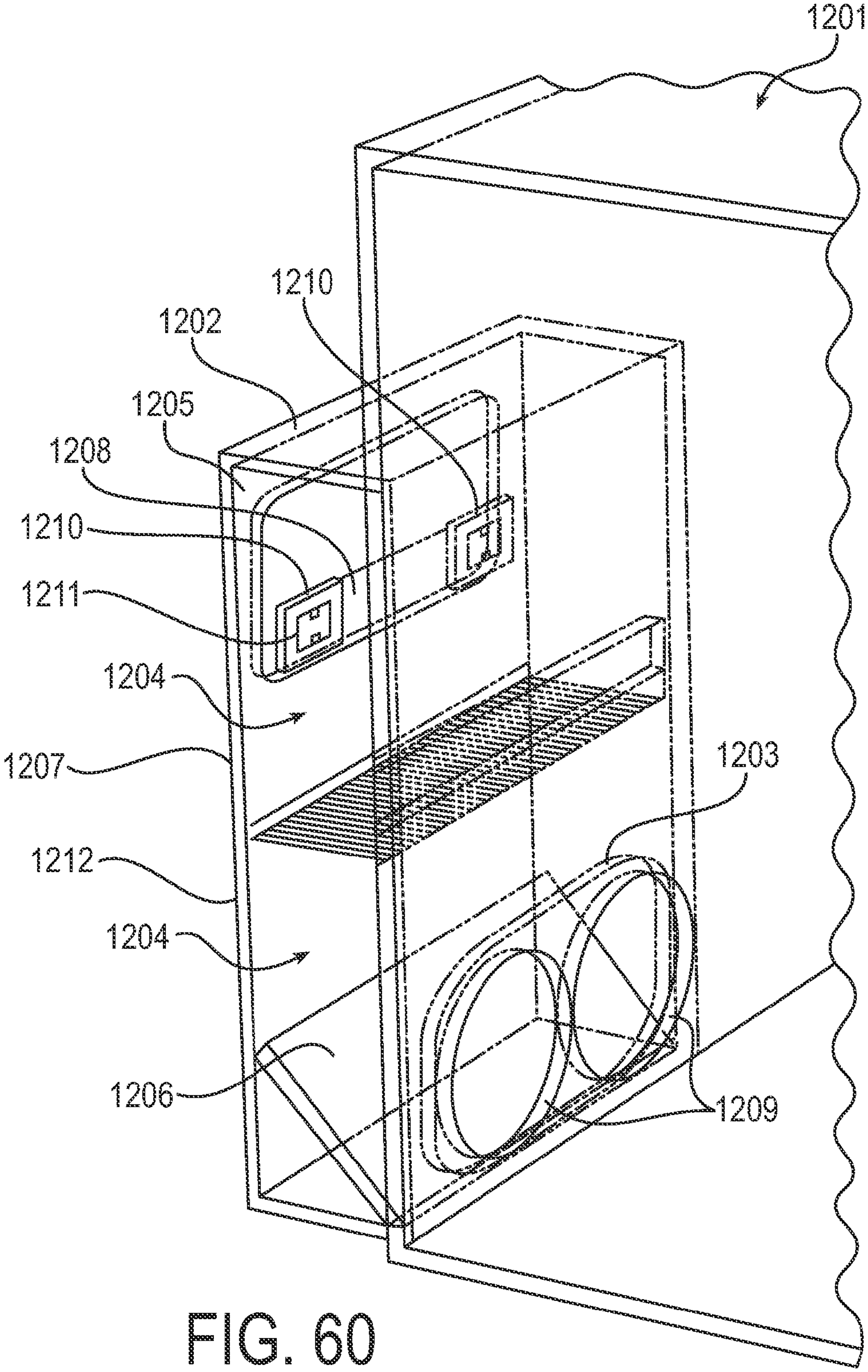
FIG. 60 is a side view of a second example embodiment of a blast accessory.
Figure 61:
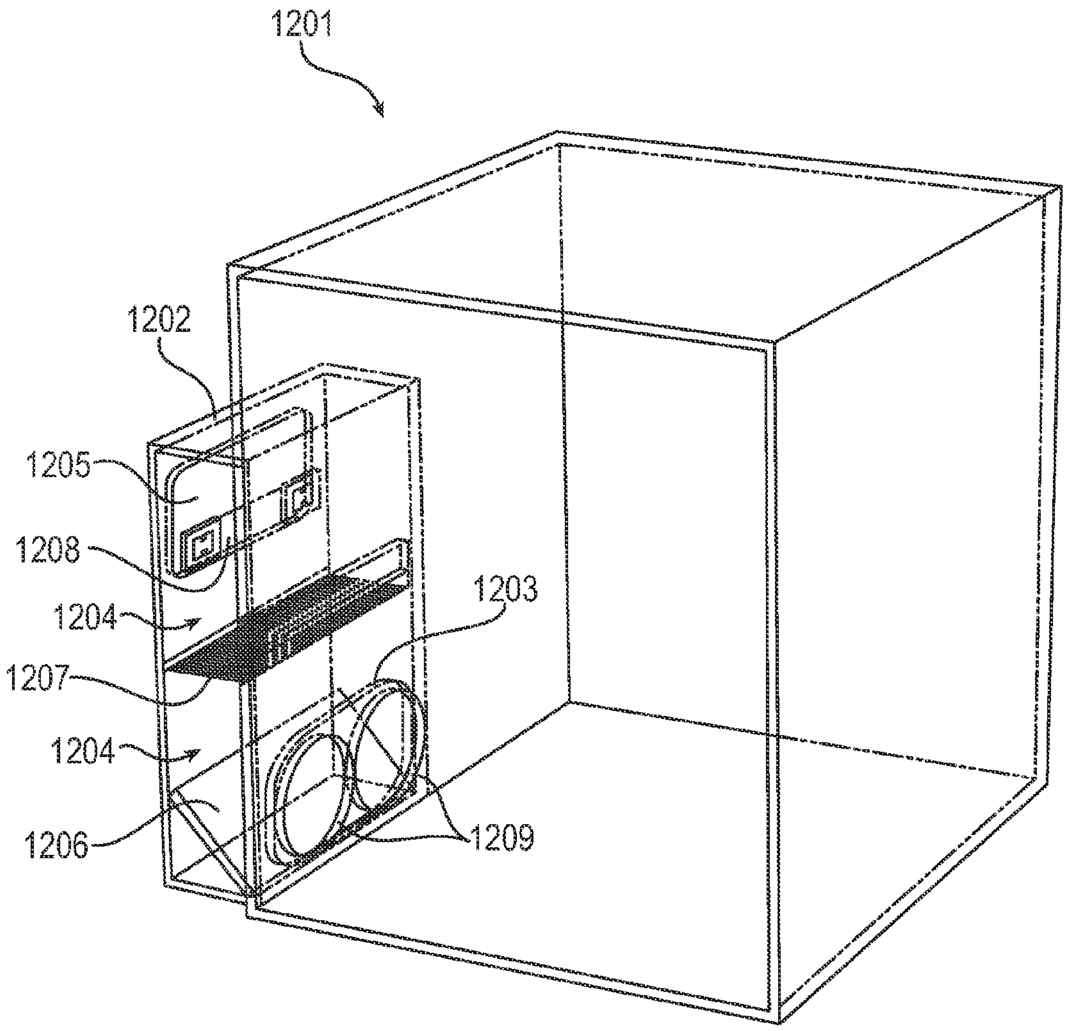
FIG. 61 is a side perspective view in phantom of the second example embodiment of a blast accessory.
Figure 62:
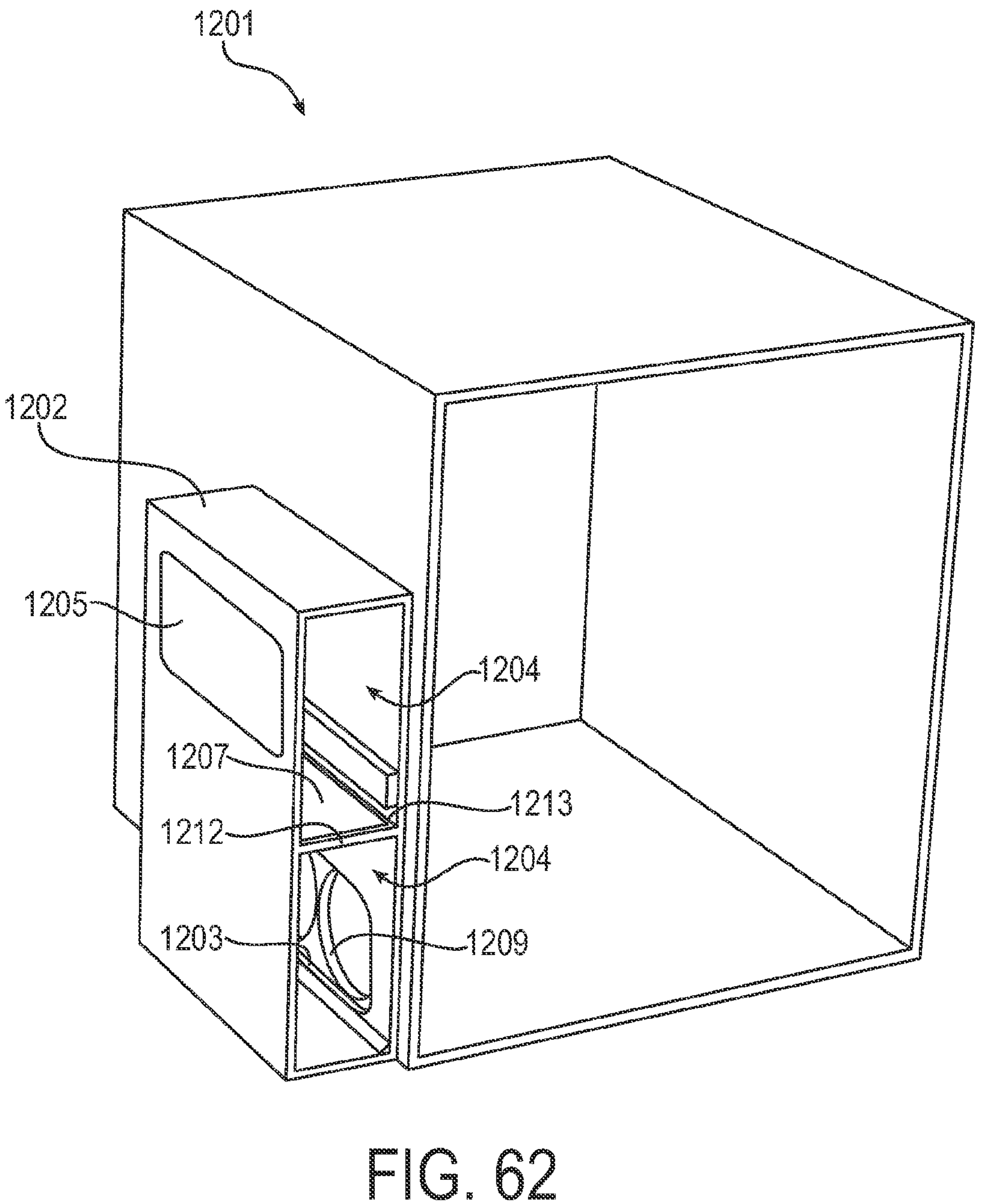
FIG. 62 is an exterior perspective view of the second example embodiment of a blast accessory.
Figure 63:
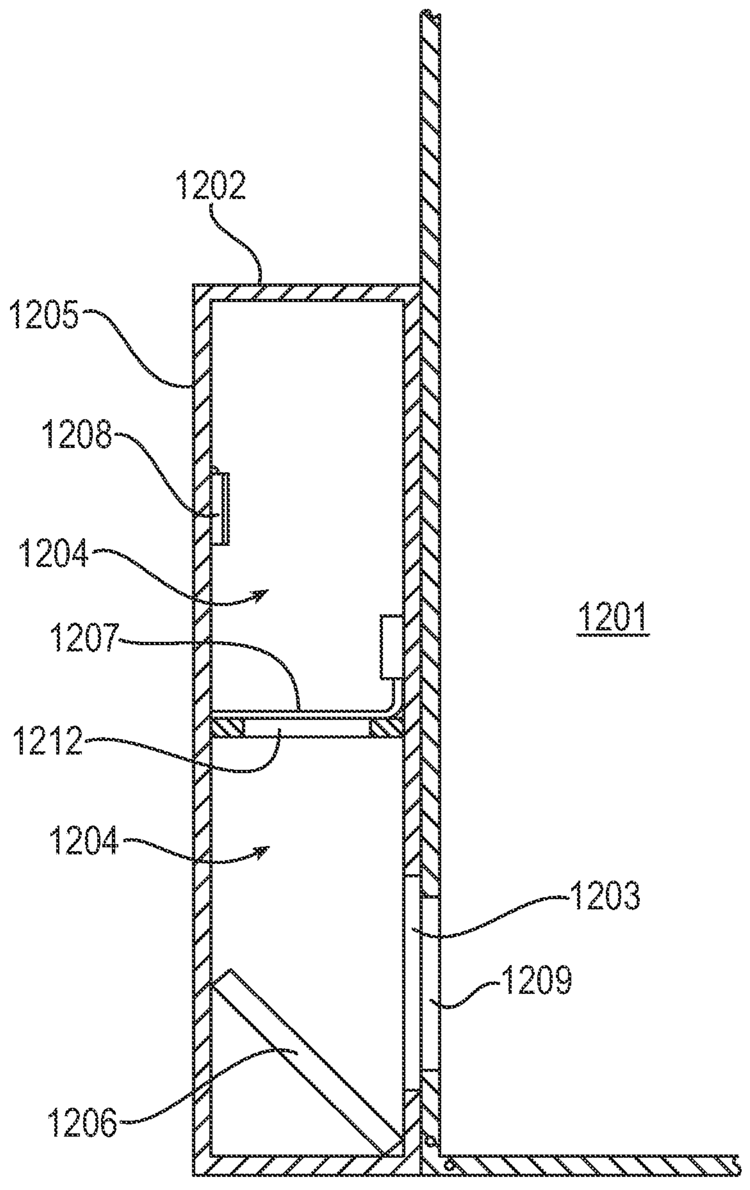
FIG. 63 is a side view of the second example embodiment of a blast accessory.

Referring now to FIG. 59, an example embodiment of a blast accessory is shown mounted to a chest body 1201 (which chest body may correspond to a chest/safe body of an automated banking machine such as previously described). The blast resistant accessory comprises an auxiliary vent casing 1202 (also referred to herein as an auxiliary casing) which is sized and configured to be fitted to the side of the chest body 1201, with the vent casing being made up of robust materials commensurate with the make-up of the chest body 1201. The auxiliary vent casing may be a cuboid construction adapted to provide an avenue for redirecting explosive gasses, introduced into and ignited from the chest body 1201. The auxiliary vent casing provides security to the chest body 1201 in terms of extending the interior of the chest body, whilst preventing physical access to the interior of the chest from the auxiliary vent casing itself.

The auxiliary vent casing is provided with one or a plurality of vent holes 1203, which are adapted to communicate with the interior of the chest by way of corresponding vents 1209, provided in the side of the chest body 1201. In this manner, the corresponding vent holes of the vent casing and the chest body, provide a pathway to conduit the explosive gasses from the otherwise sealed interior of the chest body 1201 through to the interior chamber 1204, provided by the auxiliary vent casing 1202. The auxiliary vent casing is also provided with a sacrificial exterior vent door 1205. The sacrificial exterior vent door in the case of the embodiment detailed in FIG. 59, is a lightweight sealed top 1205, which is adapted to prevent ready access into the interior chamber 1204 of the auxiliary vent casing 1202 and subsequently access into the chest via the vent holes, but operative to burst upon application of a blast to the interior of the chest body and/or in the auxiliary vent casing, before damage can be done to the chest body 1201 or the door of the chest.

The interior chamber 1204 of the auxiliary vent casing 1202, may be provided with a plurality of baffles 1206. The baffles serve to disperse and control the exit of combusted gasses, during their travel through the pathway from the chest body 1201 through the mating vents into the interior chamber 1204, via the baffles 1206 to finally burst the sacrificial exterior vent door 1205 and therein escape so as to disperse the potentially damaging explosion that would otherwise occur within the chest body 1201.

Referring to FIGS. 60-63, a second example embodiment is shown where the auxiliary casing 1202 is fitted in an analogous manner to a chest body 1201 as shown in the previous embodiment shown in FIG. 59. In this particular embodiment, the auxiliary casing sacrificial exterior vent door 1205 is provided by way of a highly secure locking vent arrangement with the sacrificial exterior vent 1205, being provided in the manner of a heavyweight door provided in the side of the auxiliary vent casing 1202. The exterior vent door includes lock including a pair of locking tabs 1210, which protrude from the back of the door and cooperate with a sliding bolt 1208. The sliding bolt 1208 is adapted to move vertically between a first locking position, engaging the lock tabs and by virtue of the sliding bolt being captive within the auxiliary vent casing, thereby preventing the exterior vent door from deploying. The sliding bolt can move to a second position; in a vertical upward direction by virtue of the guide slots 1211, which allow the sliding bolt to move between a first and a second position. Once the sliding bolt has moved vertically upward to the second position, the lock tabs are disengaged from the sliding bolt, thereby allowing the exterior vent door to be opened/deployed.

The sliding bolt is caused to move in the upward, unlocking orientation by the action of a burst gate 1207, positioned between the sliding bolt and the lower portion of the interior chamber 1204, communicating directly with the vent holes 1203. The burst gate may rest on an intermediary platform 1212, traversing the interior chamber 1204. The burst gate may be effectively hinged by cooperation of a pivot edge 1213, with the interior edge of the auxiliary casing, with a lower portion of the sliding bolt resting on the surface of the burst gate. In this manner, once an explosive incident occurs within the chest and is relayed to the interior chamber 1204 of the auxiliary casing 1202, the pressure of the blast causes the burst gate to readily rotate about the pivot edge, thereby lifting the sliding bolt and subsequently opening/deploying the exterior vent door, with the passage of explosive gasses immediately deploying through the exterior vent door and dissipating the blast.

Figure 64:
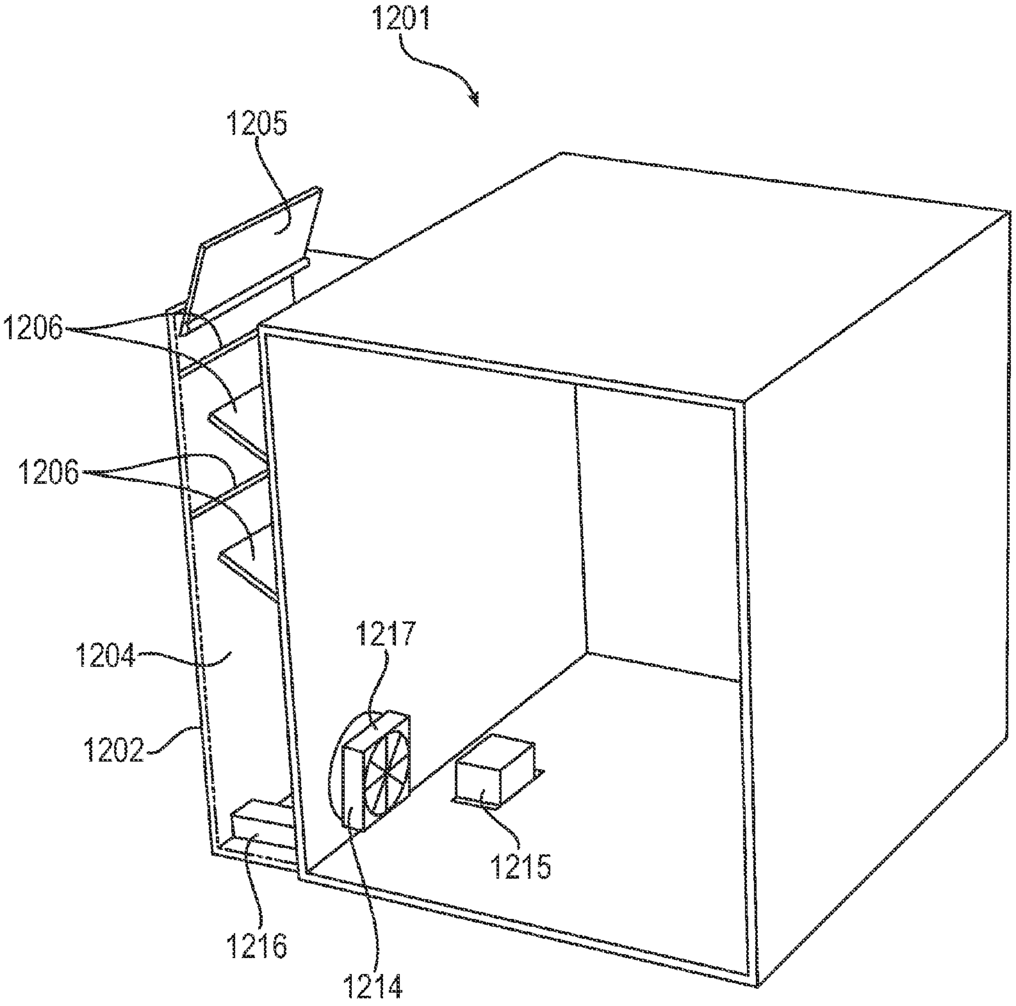
FIG. 64 is an exterior perspective view of a third example embodiment of a blast accessory.

In a further embodiment shown in FIG. 64, the accessory may include a fan system 1214 positioned adjacent at one of the vent holes communicating the interior of the chest with the interior chamber of the auxiliary casing, so as to draw explosive gasses from the interior of the chest into the interior chamber of the auxiliary casing. Such explosive gasses may be introduced with the aim of detonating the chest and generating the blast required to enter the chest without the use of solid explosives.

Such gas disbursement features may also include a gas sensor 1215 adapted for positioning within the chest to detect the introduction of gas into the chest. The gas sensor communicates with the fan and immediately when any explosive gasses are detected (or a level of explosive gases above a predetermined threshold are detected) within the chest interior, the fan may be switched on to draw such gasses from the interior of the chest into the interior chamber of the auxiliary casing. This example embodiment may also include an ignition device 1216 positioned within the auxiliary casing so as to provide features for safely detonating such explosive gasses which are then disbursed in a controlled manner via the baffles and out to the exterior via the vent door. A suitable controller (e.g., a control circuit and/or a processor) may be incorporated to receive the gas detection signal, switch on the fan to exhaust the gasses, and then activate the ignition device to explode the gasses in a controlled manner within the auxiliary casing.

As shown in FIG. 64, a spark arresting filter 1217 in the form of a stainless steel mesh may be incorporated between the chest and the auxiliary casing and in particular, forms a filter over the vent hole 1203, such that once the ignition of gas by the ignition device occurs, the filter prevents the return of any explosive gasses or any form of flashback into the body of the chest or automated banking machine. Such a spark arresting filer may ensure that any residual gas-remaining in the body of the chest is not inadvertently ignited by the ignition device. In addition, the mesh may be formed of flame resistant stainless steel or other nonflammable material.

In this manner, the accessory also provides features for protecting a chest from blasts generated either by solid explosives or the introduction of explosive gasses. The auxiliary vent casing and provision of a lockable exterior vent door provides the blast resistant accessory of this embodiment with a high level of security equal to or greater than that of the chest itself. Accordingly without access to the interior of the blast resistance accessory, the exterior vent door remains locked and closed preventing potential access to the chest.

In use, the blast resistant accessory provides a ready and cost effective method of retro-fitting a protective device to a chest where the auxiliary vent casing and internals can be fitted to the side of a chest body 1201, once the chest vents 1209 have been formed in the side of a chest. The blast resistant accessory, occupies minimal additional space to the chest and is effectively tamper proof in its own right but allows a dissipating pathway for explosive gasses in the event that the chest in question is attacked with an ignited gas.

In the example embodiments illustrated in FIGS. 59-64, the auxiliary casing has been described as corresponding to an accessory that is mounted to a safe. In these embodiments the auxiliary casing and the chest may be comprised of steel and/or other metal(s) which enable the auxiliary casing to be welded to a side of a chest. Also it should be appreciated that example embodiments of the auxiliary casing may be bolted to a side of a chest. Such an auxiliary casing may include bolt holes for receiving bolts and/or may include projections that extend from a side of the auxiliary casing. An existing chest without the auxiliary casing, may be modified to accept an auxiliary casing. This may be done for example by drilling/cutting the previously described vent hole in the side of the chest as well as a plurality of bolt holes which match the positions of the bolt holes (or projections) of the auxiliary casing in order for the vent holes of the auxiliary casing and chest to be substantially aligned when the auxiliary casing and chest are mounted together. The bolts or projections of the auxiliary casing may then extend through the bolt holes of the chest and be secured in the interior area of the chest via nuts or other fasteners.

Figure 65:
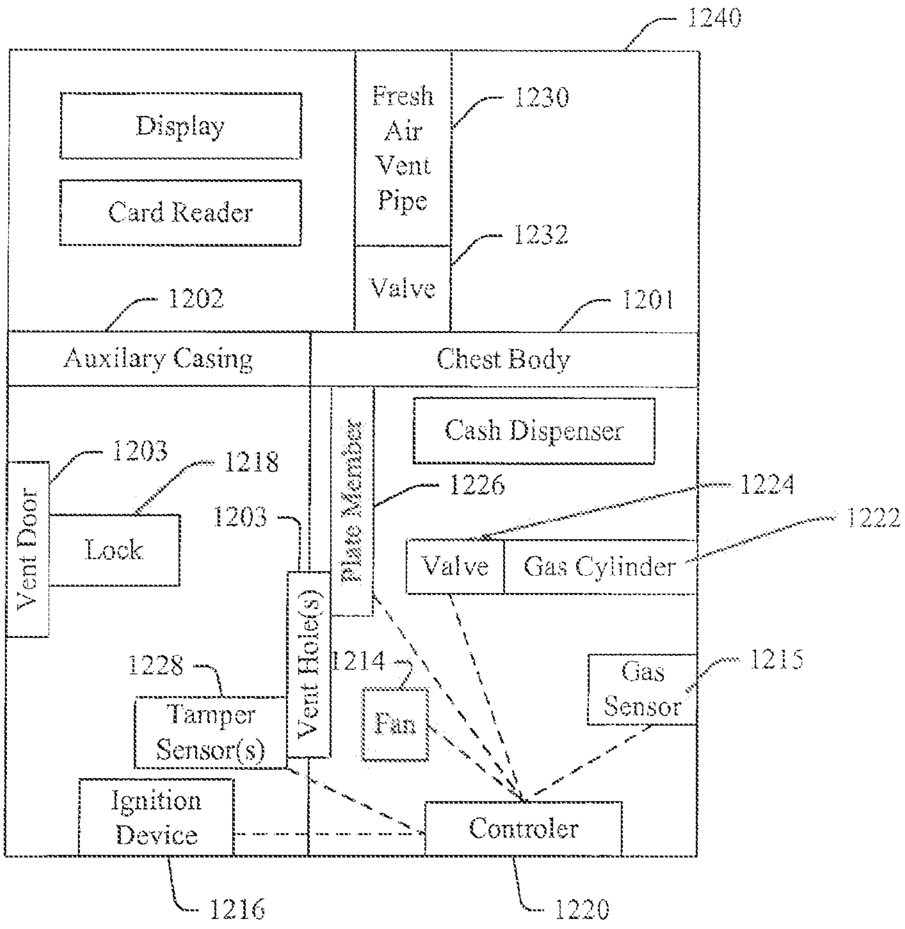
FIG. 65 is an schematic view of an example embodiment of a blast accessory mounted to a chest.

In addition, as schematically illustrated in FIG. 65, a preexisting chest may also be modified to include the previously described fan 1214, and gas sensor 1215 in the interior area of the chest body 1201. The fan and gas sensor may be powered via electrical power connections within the chest and may be connected to a controller 1220 mounted in the chest, auxiliary casing 1202, or other portions of the automated banking machine 1240, which controller is configured to operate the fan (and ignition device 1216) responsive to signals from the gas sensor. Also, it should be appreciated that the fan may be located in the auxiliary casing and may be positioned to draw gases through the vent holes 1203 from the interior area of the chest body into the interior chamber of the auxiliary casing.

In addition, it should be appreciated that example embodiments may be operative to replace the explosive gases being removed from the interior area of the chest body with gases that do not include the explosive gases. For example, the chest may be further modified to include a vent capable of drawing in fresh air from outside the automated banking machine. For example a portion of the chest may include a vent hole connected via a conduit such as a ventilation pipe 1230. Such a ventilation pipe may extend through the housing of the automated banking machine to an external vent hole or grill mounted on the exterior portion of the housing of the automated banking machine. When the fan operates to draw explosive gases out of the interior area of the chest (and into the auxiliary casing), replacement fresh air will be draw into the interior area of the chest body from outside the automated banking machine 1210 via the ventilation pipe 1230.

In this described example, the automated banking machine may include a valve 1232, which is operative to open and close the ventilation pipe. The default configuration of the valve may be to keep the ventilation pipe closed in order to prevent a pathway into the chest body. The previously described controller 1220 that operates the fan (or another controller) may be operative responsive to the gas sensor 1215 detecting an explosive gas in the interior area of the chest body to cause an actuator associated with the valve 1232 to open the ventilation pipe 1230 and permit fresh air to flow into the interior area of the chest body.

Also, in a further example embodiment, rather than (or in addition) to pulling fresh external air into the interior area of the chest body, the described controller (or another controller) may be operative to inject an inert gas or less explosive gases such as nitrogen, carbon dioxide, air (or other gases) into the interior area of the chest in order to replace the explosive gases. In this example embodiment, the automated banking machine may include a cylinder 1222 including a compressed gas therein (e.g., compressed nitrogen, carbon dioxide, air) mounted in the chest body, auxiliary casing, or other portion of the automated banking machine. As with the previously described ventilation pipe, the cylinder 1221 may be in operative connection with a valve 1224 capable of being actuated via the controller 1220 (or another controller) to open the valve and release gases from the cylinder into the interior area of the chest body, responsive to signals from the gas sensor 1215 that are indicative of the presence of an explosive gas in the interior area of the chest body.

In example embodiments with a cylinder 1222, the previously described fan 1214 may also be operative to move the explosive gases into the auxiliary casing 1202. When the controller 1220 receives signals from the gas sensor 1215 that the levels of explosive gases have dropped below a predetermined threshold, the controller may cause the fan to stop and cause the valve associated with the compressed gas cylinder to close. Such a controller may also cause the ignition device 1216 to explode the gas in the auxiliary casing. Also after the explosive gases have been drawn out of the interior area of the chest body (and/or have been exploded), it should be appreciated that the previously described controller 1220 may continue to operate the described fan, valve, and ignition device responsive to signals from the gas sensor.

Also, it should be noted that some embodiments that include a compressed gas cylinder may not include a fan. Rather the chest and auxiliary casing may include co-operating ventilation characteristics, in which the released gases from the cylinder 1222 are operative to automatically cause at least a majority of the volume of gases inside the interior area of the chest body 1201 to move into/through the auxiliary casing 1202 to enable explosive gases to be exploded in the auxiliary casing and/or to be moved to the exterior of the automated banking machine by way of the auxiliary casing.

Example embodiments that include an auxiliary casing may also include a battery that is operative to provide power to the described controller, fan, valve actuators, gas sensors, when an external electrical power source has been removed from the automated banking machine.

Although the auxiliary casing has been previously described as corresponding to an accessory, it should also be appreciated that alternative example embodiments of the auxiliary casing may be made integral with the chest. For example, a chest of an automated banking machine may be manufactured to include two (or more) interior areas that are separated via internal walls except for one or more of vent holes which permit explosive gases to pass therethrough. In this example one of the interior area of the chest includes one or more automated banking machine devices (such as portions of a cash dispenser), whereas the second interior area includes the features previously described with respect to the auxiliary casing (e.g., the vent door, baffles, lock).

It should be understood that the described auxiliary casing may correspond to any secondary chamber that is operative to receive explosive gases introduced into a chest (or other portions of an automated banking machine) via a vent hole or other conduit, in order to minimize damage to the chest (or other portions of the automated banking machine) without compromising the security of the chest. Also, it should be appreciated that the automated banking machine may include secondary interior areas in the chest or other locations within the automated banking machine housing that may be adapted to include the previously described vent door, baffles, lock.

In addition, example embodiments of the auxiliary casing may include additional features which enhance security and minimize access to the interior area of the chest through the vent holes. For example, as schematically illustrated in FIG. 65, the auxiliary casing 1202 or chest body 1201 may further include a sliding plate member 1226 that is operative to close the vent hole(s) 1203. The previously described controller 1220 (or another controller) may be responsive at least in part to the detection of one or more tamper sensors 1228 (which are operative to detect possible tampering with the auxiliary casing, vent door, vent holes, chest) to cause (via an actuator) the sliding plate member 1226 to close the vent holes 1203. Such tamper sensors may be operative to detect the presence of tools attempting to pass through the vent hole 1203.

In an example embodiment, such tamper sensors may correspond to one or more sensors that are operative to detect vibrations, heat, sounds, and/or light that may be indicative of a hole being drilled through a wall or vent door of the auxiliary casing and/or the insertion of tools into the auxiliary casing 1202. Examples of sliding plate members and characteristics which may cause the sliding plate member to be actuated, which may be used in the example embodiments described herein are shown U.S. application Ser. No. 12/583,333 filed Aug. 17, 2009 which is hereby incorporated herein in its entirety. Also in this example, the controller 1220 (via one or more sensors) may be operative to detect whether the chest door of the chest is closed/open. Thus in cases when the chest door is open, the controller (or another controller) may be operative to prevent the sliding member from closing the vent.

In addition, in a further example embodiment the controller 1220 may be operative to actuate the plate member 1226 to cause the vent holes 1203 to be closed responsive to the gas sensor. For example, after the fan 1214 and/or cylinder 1222 is used to move explosive gases from the chest body into the auxiliary casing, the controller (based on time and/or further readings from the gas sensor) may cause the plate member to close the vent holes 1203. Once the vent holes have been closed, the controller may cause the ignition device 1216 to ignite the explosive gases in the auxiliary casing. In addition, it should be appreciated that the chest body may include additional plate members that may be actuatable via the controller 1220 to seal other holes or openings into the chest in order to prevent further explosive gases from being injected into the chest body.

In addition, it should also be noted that alternative embodiments may include other forms and arrangements for the lock 1218 that is operative to prevent the vent door from being opened from outside the auxiliary casing, but permits the vent door to be opened responsive to a blast of explosive gases inside the auxiliary casing and/or chest body. For example, the vent door may include a lock in the form of a latch that is operative to move (e.g., slide, rotate) relative a keeper or striker (connected to a wall of the auxiliary casing). The previously described burst gate may be operative to move (e.g. slide, pivot) inside the auxiliary casing (responsive to a blast) and thereby urge the latch to move (e.g., slide, rotate) to disengage from the keeper/striker and enable the vent door to open. Also, in further alternative example embodiments, the lock may include linkages between the burst gate and latch that is operative to facilitate movement of the latch and opening of the vent door.

It will be appreciated by persons skilled in the art that numerous variations and/or modifications may be made to the examples shown in the described embodiments without departing from the scope of the embodiments as broadly described. The present embodiments are, therefore, to be considered in all respects as illustrative and not restrictive.

While the exemplary embodiments include particular structures to achieve the desirable results, those having skill in the art may devise numerous other embodiments with other structures which employ the same principles described herein and which are encompassed by the subject matter as claimed.

Thus, the exemplary embodiments achieve at least some of the above stated objectives, eliminate difficulties encountered in the making and use of prior devices, solve problems, and attain the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations herein are given by way of examples and the invention is not limited to the exact details shown and described.

In the following claims, any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

What is claimed is:

1. An apparatus, comprising:

a housing, wherein the housing includes a chest, wherein the chest includes a chest body and a chest door, which chest door is selectively operable to gain access to an interior area of the chest body, wherein the chest body includes at least one vent hole therethrough;

an upper housing, wherein the upper housing is in operatively supported connection with the chest body, a blast resistant and disbursement accessory in operatively supported connection with the chest body, wherein the accessory includes an auxiliary casing, wherein the auxiliary casing includes an interior chamber that is operative to receive explosive gasses generated by a blast in at least one of the interior chamber of the auxiliary casing and the interior area of the chest body, wherein the auxiliary casing includes at least one vent hole adjacent the at least one vent hole of the chest body, wherein the auxiliary casing includes a vent door that is operative to open and dissipate explosive gasses applied to the interior area of the chest body and conduited to the interior chamber of the auxiliary casing, wherein the vent door is positioned remote from the at least one vent hole of the auxiliary casing, wherein the vent door includes a lock that is operatively configured to prevent the vent door from being opened, wherein the lock operates to enable the vent door to open in response to a blast in at least one of the interior chamber of the auxiliary casing and the interior area of the chest body; and wherein the auxiliary casing includes at least one internal baffle positioned between the at least one vent hole of the auxiliary casing and the vent door.

2. The apparatus according to claim 1, wherein the apparatus includes a fan adjacent at least one of the vent holes of the auxiliary casing and the chest body.

3. The apparatus according to claim 2, wherein the apparatus includes a gas detector that is operative to detect an explosive gas positioned within the interior area of the chest body.

4. The apparatus according to claim 3, wherein the accessory includes an ignition device positioned within the interior chamber of the auxiliary casing.

5. The apparatus according to claim 4, wherein the accessory includes a spark arresting filter positioned to cover the at least one vent hole of the auxiliary casing and prevent flashback into the interior area of the chest body.

6. The apparatus according to claim 5, wherein the apparatus includes a controller that is operative responsive at least in part to a signal from the gas detector indicative of the detection of an explosive gas within the interior area of the chest body, to cause the fan to operate to move at least a portion of the explosive gas into the interior chamber of the auxiliary casing and to cause the ignition device to explode the explosive gas within the interior chamber of the auxiliary casing.

7. The apparatus according to claim 1, wherein the lock includes a burst gate positioned between the interior chamber and the vent door, which burst gate operates as a throw bolt that releases the lock responsive at least in part to a blast conduited to the interior chamber of the auxiliary casing.

8. The apparatus according to claim 7, wherein the burst gate is operative to move from a closed position blocking a pathway between the interior chamber of the auxiliary casing and the vent door, and an open position opening the pathway between the interior chamber of the auxiliary casing and the vent door.

9. The apparatus according to claim 8, wherein the accessory includes a sliding bolt co-operating to hold the vent door in the closed position, wherein the burst gate is operative to move the sliding bolt responsive to a blast.

10. Apparatus comprising:

a housing, wherein the housing includes a chest, wherein the chest includes a chest body, an auxiliary casing, and a chest door, wherein chest door is selectively operable to gain access to a first interior area, wherein the auxiliary casing includes a second interior area, wherein the chest includes at least one vent hole between the first and second interior areas, wherein the auxiliary casing includes a vent door that is operative to open and dissipate explosive gasses applied to the first interior area and conduited to the second interior area, wherein the vent door is positioned remote from the at least one vent hole, wherein the vent door includes a lock that is operatively configured to prevent the vent door from being opened from outside the vent door, wherein the lock operates to enable the vent door to open in response to a blast in at least one of the interior chamber of the auxiliary casing and the interior area of the chest body, and wherein the auxiliary casing includes at least one internal baffle positioned between the at least one vent hole and the vent door.

11. The apparatus according to claim 10, further comprising an upper housing, wherein the upper housing is in operatively supported connection with the chest body.

12. The apparatus according to claim 11, where the chest includes a blast resistant and disbursement accessory in operatively supported connection with the chest body, wherein the accessory includes the auxiliary casing.

13. The apparatus according to claim 12, wherein the accessory is welded to the chest body.

14. The apparatus according to claim 12, wherein the accessory is bolted to the chest body.

15. The apparatus according to claim 10, wherein the chest includes a fan adjacent the at least one vent hole, wherein the chest includes a gas detector that is operative to detect an explosive gas positioned within the first interior area, wherein the auxiliary casing includes an ignition device positioned within the second interior area, wherein the auxiliary casing includes a spark arresting filter positioned to cover the at least one vent hole and prevent flashback into the first interior area, wherein the automated banking machine includes a controller that is operative responsive at least in part to a signal from the gas detector indicative of the detection of an explosive gas within the first interior area, to cause the fan to operate to move at least a portion of the explosive gas into the second interior area and to cause the ignition device to explode the explosive gas within the second interior area.

16. The apparatus according to claim 10, wherein the lock includes a burst gate positioned between the at least one vent hole and the vent door, which burst gate operates as a throw bolt that releases the lock responsive at least in part to a blast conduited to the second interior area, wherein the burst gate is operative to move from a closed position blocking a pathway between the at least one vent hole and the vent door, and an open position opening the pathway between the at least one vent hold and the vent door, wherein the lock includes a sliding bolt co-operating to hold the vent door in the closed position, wherein the burst gate is operative to move the sliding bolt responsive to a blast of explosive gases in at least one of the first and second interior areas.

17. The apparatus according to claim 10, further comprising:

a cylinder including at least one compressed gas therein, wherein the automated banking machine includes a valve in operative connection with the compressed gas cylinder, wherein the chest includes a gas detector that is operative to detect an explosive gas positioned within the first interior area, wherein the automated banking machine includes a controller that is operative responsive at least in part to a signal from the gas detector indicative of the detection of an explosive gas within the first interior area, to cause the valve to operate to release at least a portion of the at least one compressed gas from the cylinder and into the first interior area.

18. The apparatus according to claim 10, wherein the chest includes a plate member that is operative to slide adjacent the at least one vent hole;

wherein the apparatus further comprises:

at least one sensor that is operative to detect at least one of tampering with the chest and an explosive gas positioned within the first interior area; and a controller that is operative responsive at least in part to a signal from the at least one sensor to cause the plate member to move and close the at least one vent hole.

19. An apparatus comprising:

a housing, wherein the housing includes a chest, wherein the chest includes a chest body, an auxiliary casing, and a chest door, wherein chest door is selectively openable to gain access to a first interior area, wherein the auxiliary casing includes a second interior area, wherein the chest includes at least one vent hole between the first and second interior areas, wherein the auxiliary casing includes a vent door that is operative to open and dissipate explosive gasses applied to the first interior area and conduited to the second interior area, wherein the vent door is positioned remote from the at least one vent hole, wherein the vent door includes a lock that is operatively configured to prevent the vent door from being opened from outside the vent door, wherein the lock operates to enable the vent door to open in response to a blast in at least one of the interior chamber of the auxiliary casing and the interior area of the chest body, and wherein the chest includes a fan adjacent the at least one vent hole, wherein the chest includes a gas detector that is operative to detect an explosive gas positioned within the first interior area, wherein the auxiliary casing includes an ignition device positioned within the second interior area, wherein the auxiliary casing includes a spark arresting filter positioned to cover the at least one vent hole and prevent flashback into the first interior area; and a controller that is operative responsive at least in part to a signal from the gas detector indicative of the detection of an explosive gas within the first interior area, to cause the fan to operate to move at least a portion of the explosive gas into the second interior area and to cause the ignition device to explode the explosive gas within the second interior area.

20. An apparatus comprising:

a housing, wherein the housing includes a chest, wherein the chest includes a chest body, an auxiliary casing, and a chest door, wherein chest door is selectively openable to gain access to a first interior area, wherein the auxiliary casing includes a second interior area, wherein the chest includes at least one vent hole between the first and second interior areas, wherein the auxiliary casing includes a vent door that is operative to open and dissipate explosive gasses applied to the first interior area and conduited to the second interior area, wherein the vent door is positioned remote from the at least one vent hole, wherein the vent door includes a lock that is operatively configured to prevent the vent door from being opened from outside the vent door, wherein the lock operates to enable the vent door to open in response to a blast in at least one of the interior chamber of the auxiliary casing and the interior area of the chest body, and wherein the lock includes a burst gate positioned between the at least one vent hole and the vent door, which burst gate operates as a throw bolt that releases the lock responsive at least in part to a blast conduited to the second interior area, wherein the burst gate is operative to move from a closed position blocking a pathway between the at least one vent hole and the vent door, and an open position opening the pathway between the at least one vent hold and the vent door, wherein the lock includes a sliding bolt co-operating to hold the vent door in the closed position, wherein the burst gate is operative to move the sliding bolt responsive to a blast of explosive gases in at least one of the first and second interior areas.

21. An apparatus comprising:

a housing, wherein the housing includes a chest, wherein the chest includes a chest body, an auxiliary casing, and a chest door, wherein chest door is selectively openable to gain access to a first interior area, wherein the auxiliary casing includes a second interior area, wherein the chest includes at least one vent hole between the first and second interior areas, wherein the auxiliary casing includes a vent door that is operative to open and dissipate explosive gasses applied to the first interior area and conduited to the second interior area, wherein the vent door is positioned remote from the at least one vent hole, wherein the vent door includes a lock that is operatively configured to prevent the vent door from being opened from outside the vent door, wherein the lock operates to enable the vent door to open in response to a blast in at least one of the interior chamber of the auxiliary casing and the interior area of the chest body, and a cylinder including at least one compressed gas therein, a valve in operative connection with the compressed gas cylinder, wherein the chest includes a gas detector that is operative to detect an explosive gas positioned within the first interior area, a controller that is operative responsive at least in part to a signal from the gas detector indicative of the detection of an explosive gas within the first interior area, to cause the valve to operate to release at least a portion of the at least one compressed gas from the cylinder and into the first interior area.

22. An apparatus comprising:

a housing, wherein the housing includes a chest, wherein the chest includes a chest body, an auxiliary casing, and a chest door, wherein chest door is selectively openable to gain access to a first interior area, wherein the auxiliary casing includes a second interior area, wherein the chest includes at least one vent hole between the first and second interior areas, wherein the auxiliary casing includes a vent door that is operative to open and dissipate explosive gasses applied to the first interior area and conduited to the second interior area, \wherein the vent door is positioned remote from the at least one vent hole, wherein the vent door includes a lock that is operatively configured to prevent the vent door from being opened from outside the vent door, wherein the lock operates to enable the vent door to open in response to a blast in at least one of the interior chamber of the auxiliary casing and the interior area of the chest body, and wherein the chest includes a plate member that is operative to slide adjacent the at least one vent hole;

at least one sensor that is operative to detect at least one of tampering with the chest and an explosive gas positioned within the first interior area, a controller that is operative responsive at least in part to a signal from the at least one sensor to cause the plate member to move and close the at least one vent hole.

23. Apparatus comprising:

a housing, wherein the housing includes a chest, wherein the chest includes a chest body and a chest door, which chest door is selectively openable to gain access to an interior area of the chest body, wherein the chest body includes at least one vent hole therethrough;

an upper housing, wherein the upper housing is in operatively supported connection with the chest body, a blast resistant and disbursement accessory in operatively supported connection with the chest body, wherein the accessory includes an auxiliary casing, wherein the auxiliary casing includes an interior chamber that is operative to receive explosive gasses generated by a blast in at least one of the interior chamber of the auxiliary casing and the interior area of the chest body, wherein the auxiliary casing includes at least one vent hole adjacent the at least one vent hole of the chest body, wherein the auxiliary casing includes a vent door that is operative to open and dissipate explosive gasses applied to the interior area of the chest body and conduited to the interior chamber of the auxiliary casing, wherein the vent door is positioned remote from the at least one vent hole of the auxiliary casing, wherein the vent door includes a lock that is operatively configured to prevent the vent door from being opened, wherein the lock operates to enable the vent door to open in response to a blast in at least one of the interior chamber of the auxiliary casing and the interior area of the chest body; and wherein the lock includes a burst gate positioned between the interior chamber and the vent door, which burst gate operates as a throw bolt that releases the lock responsive at least in part to a blast conduited to the interior chamber of the auxiliary casing.

24. The apparatus according to claim 23, wherein the burst gate is operative to move from a closed position blocking a pathway between the interior chamber of the auxiliary casing and the vent door, and an open position opening the pathway between the interior chamber of the auxiliary casing and the vent door.

25. The apparatus according to claim 24, wherein the accessory includes a sliding bolt co-operating to hold the vent door in the closed position, wherein the burst gate is operative to move the sliding bolt responsive to a blast.

* * * * *